US011996684B1

(12) United States Patent
Wade

(10) Patent No.: US 11,996,684 B1
(45) Date of Patent: May 28, 2024

(54) JUNCTION BOX WITH INTEGRAL FLASHING

(71) Applicant: Easy Solar Products, Inc., Holladay, UT (US)

(72) Inventor: Benjamin Wade, Holladay, UT (US)

(73) Assignee: Easy Solar Products, Inc., Holladay, UT (US)

( * ) Notice: Subject to any disclaimer, the term of this patent is extended or adjusted under 35 U.S.C. 154(b) by 0 days.

(21) Appl. No.: 18/430,198

(22) Filed: Feb. 1, 2024

Related U.S. Application Data

(63) Continuation of application No. 18/212,669, filed on Jun. 21, 2023, which is a continuation-in-part of application No. 17/966,493, filed on Oct. 14, 2022, now Pat. No. 11,695,261, which is a continuation of application No. 16/709,682, filed on Dec. 10, 2019, now Pat. No. 11,515,693, which is a continuation-in-part of application No. 16/259,887, filed on Jan. 28, 2019, now Pat. No. 10,505,354, which is a continuation-in-part of application No. 15/963,707, filed on Apr. 26, 2018, now Pat. No. 10,230,227.

(51) Int. Cl.
*H02G 3/14* (2006.01)
*H02G 3/08* (2006.01)
*H02G 3/22* (2006.01)

(52) U.S. Cl.
CPC ............... *H02G 3/088* (2013.01); *H02G 3/14* (2013.01); *H02G 3/22* (2013.01)

(58) Field of Classification Search
CPC ............. H02G 3/088; H02G 3/14; H02G 3/22
USPC ................................................ 174/50
See application file for complete search history.

(56) References Cited

U.S. PATENT DOCUMENTS

| | | | |
|---|---|---|---|
| 3,910,448 A | 10/1975 | Evans et al. | |
| 4,115,779 A * | 9/1978 | Dantzler | H01Q 1/084 343/882 |
| 4,733,015 A | 3/1988 | Barnes | |
| 5,661,264 A | 8/1997 | Reiker | |
| 6,023,247 A | 2/2000 | Rodeffer | |

(Continued)

FOREIGN PATENT DOCUMENTS

| | | |
|---|---|---|
| GB | 2375439 A | 11/2002 |
| JP | H06165343 A | 6/1994 |

(Continued)

OTHER PUBLICATIONS

U.S. Appl. No. 18/525,442, filed Nov. 30, 2023, Non-Final Office Action received on Mar. 7, 2024, pp. 1-21.

(Continued)

*Primary Examiner* — Timothy J Thompson
*Assistant Examiner* — Michael F McAllister
(74) *Attorney, Agent, or Firm* — Kunzler Bean & Adamson; Bruce R. Needham

(57) ABSTRACT

A junction box includes an enclosable housing that includes a bottom with a bottom interior surface and a bottom exterior surface. The housing is configured to mount to a roof of a structure with a slope. The junction box includes a central area of the bottom configured for penetrations into the roof. The junction box includes a flashing integral to the bottom of the housing and extending away from the bottom in a direction away from the housing.

21 Claims, 31 Drawing Sheets

(56) References Cited

U.S. PATENT DOCUMENTS

| | | |
|---|---|---|
| 6,271,467 B1 | 8/2001 | Book et al. |
| 6,526,701 B2 | 3/2003 | Stearns et al. |
| 6,942,189 B2 * | 9/2005 | Capozzi .................. H01Q 1/02 |
| | | 248/185.1 |
| 7,109,415 B2 | 9/2006 | Neitzel et al. |
| 7,154,040 B1 | 12/2006 | Tompkins |
| 7,353,961 B2 | 4/2008 | Hull et al. |
| 7,626,118 B1 * | 12/2009 | Capozzi .................. H02G 3/088 |
| | | 174/64 |
| 8,471,145 B2 | 6/2013 | Suzuki |
| 8,479,455 B2 * | 7/2013 | Schaefer ................ H02G 3/088 |
| | | 52/220.8 |
| 9,153,950 B2 * | 10/2015 | Yamanaka .............. E04D 13/00 |
| 9,496,697 B1 * | 11/2016 | Wentworth ............. H02G 3/088 |
| 9,742,173 B2 | 8/2017 | Wentworth |
| 9,819,166 B1 * | 11/2017 | Capozzi .................. H02G 3/14 |
| 9,853,595 B1 * | 12/2017 | Okado .................... F24S 25/61 |
| 9,935,356 B2 * | 4/2018 | Wentworth .......... H01Q 1/1221 |
| 9,966,745 B2 | 5/2018 | Wentworth |
| 10,297,997 B1 * | 5/2019 | Wiese ...................... H02G 3/14 |
| 10,594,121 B2 | 3/2020 | Yang et al. |
| 10,804,685 B2 | 10/2020 | Yang et al. |
| D926,703 S | 8/2021 | Yang et al. |
| 11,349,288 B2 | 5/2022 | Yang et al. |
| 2003/0207614 A1 | 11/2003 | Newton |
| 2005/0054244 A1 | 3/2005 | Werner et al. |
| 2007/0215614 A1 | 9/2007 | Matsui |
| 2017/0110863 A1 | 4/2017 | Wentworth |
| 2017/0346267 A1 | 11/2017 | Wentworth |
| 2019/0158018 A1 | 5/2019 | Träger et al. |

FOREIGN PATENT DOCUMENTS

| | | |
|---|---|---|
| JP | 2004300865 A | 10/2004 |
| JP | 2016201520 A | 12/2016 |
| WO | 2017066064 A1 | 4/2017 |

OTHER PUBLICATIONS

U.S. Appl. No. 18/393,289, filed Dec. 21, 2023, Notice of Allowance received on Mar. 20, 2024, pp. 1-21.

U.S. Appl. No. 18/412,357, filed Jan. 12, 2024, Notice of Allowance received on Mar. 27, 2024, pp. 1-21.

U.S. Appl. No. 18/412,382, filed Jan. 12, 2024, Ex parte Quayle Office Action.

PCT/US2023/035228, "Notification of Transmittal of the International Search Report and the Written Opinion of the International Searching Authority, or the Declaration", dated Jan. 23, 2024, pp. 1-15.

* cited by examiner

Top View

Section A-A

JUNCTION BOX WITH INTEGRAL FLASHING

CROSS-REFERENCES TO RELATED APPLICATIONS

This patent application is a continuation of U.S. patent application Ser. No. 18/212,669 titled "JUNCTION BOX WITH COMPRESSED SEALANT," filed on 21 Jun. 2023 for Alexander Bornemann, et al., which is a continuation-in-part of U.S. patent application Ser. No. 17/966,493, filed on 14 Oct. 2022, titled "GROOVE INDICATED JUNCTION BOX," now U.S. Pat. No. 11,695,261, which is a continuation of U.S. patent application Ser. No. 16/709,682, filed on 10 Dec. 2019, now U.S. Pat. No. 11,515,693, titled "GROOVE INDICATED JUNCTION BOX," which is a continuation-in-part of U.S. patent application Ser. No. 16/259,887 filed 28 Jan. 2019, now U.S. Pat. No. 10,505,354, titled "JUNCTION BOX," which is a continuation-in-part of U.S. patent application Ser. No. 15/963,707 filed 26 Apr. 2018, now U.S. Pat. No. 10,230,227, titled "OUTDOOR JUNCTION BOX." The foregoing applications are incorporated in the present disclosure by reference in their entirety.

FIELD

The embodiments described in the present disclosure are related to junction boxes, in particular some embodiments are related to junction boxes.

BACKGROUND

Junction boxes may be used to receive, route, and connect portions of utility systems. For instance, junction boxes may receive electrical cables from multiple electrical components. The electrical cables may be electrically coupled to one another within the junction boxes. Such electrical coupling may electrically couple the multiple electrical components. The junction boxes may be covered or otherwise closed, which may reduce interaction with the electrical cables coupled therein.

Junction boxes used in interior spaces are generally comprised of metals or plastics. These junction boxes are poorly suited for use in locations in which they are exposed to outdoor environmental conditions. For instance, the junction boxes comprised of metals or plastics may rust or deteriorate due to exposure to water and heat.

Some junction boxes may be configured for exterior or outdoor use. The exterior junction boxes may be used to connect and/or route cables from one or more external devices. The external junction boxes may be attached to an exterior surface of a structure and may be at least partially environmentally sealed. However, existing outdoor junction boxes suffer from several deficiencies. For instance, existing outdoor junction boxes are poorly integrated with the exterior surfaces, which may result in concentration of snow and water on the existing junction box. Additionally, installation of the existing outdoor junction boxes may be difficult, which may result in poorly attached outdoor junction boxes.

The subject matter claimed herein is not limited to embodiments that solve any disadvantages or that operate only in environments such as those described above. Rather, this background is only provided to illustrate one example technology area where some embodiments described herein may be practiced.

SUMMARY

In an example embodiment, a junction box may include a flashing. The flashing may define a first groove. The first groove may be disposed relative to a first center axis on a first plane. The junction box may also include a housing. The housing may include a bottom portion. The bottom portion may define a second groove. The second groove may be disposed relative to a second center axis. The second center axis may be coincident with the first center axis in a direction that is substantially parallel to the first plane of the first groove. In addition, the second groove may be located on a second plane that is substantially parallel to the first plane of the first groove. Further, the second groove may be configured to indicate a suitable hole position in the bottom portion.

In another example embodiment, a junction box may include a first flashing. The first flashing may define a first groove. The first groove may be disposed relative to a first center axis on a first plane. The junction box may also include a housing. The housing may be attached to the first flashing. In addition, the housing may be positioned at least a first distance from a plurality of edges of the first flashing. The housing may include a plurality of sidewalls. The housing may also include a bottom portion. The bottom portion may be attached to the plurality of sidewalls. In addition, the bottom portion may define a second groove. The second groove may be disposed relative to a second center axis. The second center axis may be coincident with the first center axis in a direction that is substantially parallel to the first plane of the first groove. In addition, the second groove may be located on a second plane that is substantially parallel to the first plane of the first groove. Further, the second groove may be configured to indicate a suitable hole position in the bottom portion. The junction box may also include an extension housing. The extension housing may be configured to attach to an upper surface of the housing. The extension housing may include a plurality of extension sidewalls. In addition, the extension housing may include a drip edge. The drip edge may be configured to overhang where the housing and the extension housing are attached. Further, the junction box may include a second flashing. The second flashing may be positioned between at least a portion of the drip edge and the housing.

In another example embodiment, a junction box may include a housing. The housing may include a plurality of sidewalls. The housing may also include an external portion. The external portion may be attached to the plurality of sidewalls. The external portion may also define a first groove that is disposed relative to a first center axis on a first plane. In addition, the housing may include a bottom portion. The bottom portion may be attached to the plurality of sidewalls. The bottom portion may also define a second groove that is disposed relative to a second center axis. In addition, the external portion may define a notch. The notch may be configured to mate with a shingle on an exterior surface of a structure. The second center axis may be coincident with the first center axis in a direction that is substantially parallel to the first plane of the first groove. In addition, the second groove may be located on a second plane that is substantially parallel to the first plane of the first groove. Further, the second groove may be configured to indicate a suitable hole position in the bottom portion.

A junction box with a housing with anchor openings positioned for anchors to compress a sealant includes an enclosable housing that includes a bottom with a bottom interior surface and a bottom exterior surface opposing the bottom interior surface. The housing is configured to mount to a roof of a structure with a slope. The junction box includes a sealant disposed on the bottom exterior surface. The sealant surrounds a central area of the bottom. The central area is configured for penetrations into the roof and the sealant surrounds at least an upper portion and side portions of the central area. The upper portion is oriented toward an upper side of the bottom with respect to the slope of the roof. The junction box includes a plurality of anchor openings in the bottom. Each anchor opening is configured for an anchor where securing an anchor through an anchor opening of the plurality of anchor openings contributes to securing the housing to the roof and applies a force directed toward the roof that compresses a portion of the sealant adjacent to and/or surrounding the anchor opening.

Another junction box with a housing with anchor openings positioned for anchors to compress a sealant includes an enclosable housing that includes a bottom with a bottom interior surface and a bottom exterior surface opposing the bottom interior surface. The housing configured to mount to a roof of a structure with a slope. The junction box includes a sealant disposed on the bottom exterior surface. The sealant surrounds a central area of the bottom. The sealant surrounds at least an upper portion and side portions of the central area where the upper portion is oriented toward an upper side of the bottom with respect to the slope of the roof. The junction box includes a plurality of anchor openings in the bottom. Each anchor opening is configured for an anchor. Securing an anchor through an anchor opening of the plurality of anchor openings contributes to securing the housing to the roof and applies a force directed toward the roof that compresses a portion of the sealant adjacent to and/or surrounding the anchor opening. The junction box includes a compression ring positioned along the plurality of anchor openings. The compression ring is configured to stiffen the bottom of the housing. A lower portion opposite the upper portion of the central area is free from the sealant. The lower portion is oriented at a lowest part of the bottom with respect to the slope of the roof.

Another junction box with a housing with anchor openings positioned for anchors to compress a sealant includes an enclosable housing that includes a bottom with a bottom interior surface and a bottom exterior surface opposing the bottom interior surface. The housing is configured to mount to a roof of a structure with a slope. The junction box includes a drill zone surrounding a central area of the bottom and marked on the bottom and a sealant disposed on the bottom exterior surface. The sealant surrounds at least an upper portion and side portions of the drill zone and the upper portion is oriented toward an upper side of the bottom with respect to the slope of the roof. The junction box includes a plurality of anchor openings in the bottom. Each anchor opening is configured for an anchor. Securing an anchor through an anchor opening of the plurality of anchor openings contributes to securing the housing to the roof and applies a force directed toward the roof that compresses a portion of the sealant adjacent to and/or surrounding the anchor opening.

Another example of a junction box includes an enclosable housing that includes a bottom with a bottom interior surface and a bottom exterior surface opposing the bottom interior surface. The housing is configured to mount to a roof of a structure with a slope. The junction box includes a central area of the bottom. The central area is configured for penetrations into the roof. The junction box includes a sealant disposed on the bottom exterior surface. The sealant surrounds the central area of the bottom and the sealant surrounds at least an upper portion and side portions of the central area. The upper portion is oriented toward an upper side of the bottom with respect to the slope of the roof. The junction box includes a plurality of anchor openings in the bottom located between the central area and the sealant. Each anchor opening is configured for an anchor. Securing an anchor through an anchor opening of the plurality of anchor openings contributes to securing the housing to the roof.

Another example of a junction box includes an enclosable housing that includes a bottom with a bottom interior surface and a bottom exterior surface opposing the bottom interior surface. The housing is configured to mount to a roof of a structure with a slope. The junction box includes a central area of the bottom. The central area is configured for penetrations into the roof. A perimeter of the central area includes an indicia on the bottom interior surface marking the central area. The junction box includes a sealant disposed on the bottom exterior surface. The sealant surrounds the central area of the bottom and the sealant surrounds at least an upper portion and side portions of the central area. The upper portion is oriented toward an upper side of the bottom with respect to the slope of the roof. The junction box includes a plurality of anchor openings in the bottom located between the central area and the sealant. Each anchor opening is configured for an anchor. Securing an anchor through an anchor opening of the plurality of anchor openings contributes to securing the housing to the roof. Each anchor opening includes a boss. Each boss extends away from the bottom interior surface and surrounds a portion of each anchor above the bottom interior surface of the bottom.

Yet another example of a junction box includes an enclosable housing that includes a bottom with a bottom interior surface and a bottom exterior surface opposing the bottom interior surface. The housing is configured to mount to a roof of a structure with a slope. The junction box includes a central area of the bottom. The central area is configured for penetrations into the roof. A perimeter of the central area includes an indicia on the bottom interior surface marking the central area. The junction box includes a sealant disposed on the bottom exterior surface. The sealant surrounds the central area of the bottom and the sealant surrounds at least an upper portion and side portions of the central area. The upper portion is oriented toward an upper side of the bottom with respect to the slope of the roof. The junction box includes a plurality of anchor openings in the bottom located between the central area and the sealant. Each anchor opening is configured for an anchor. Securing an anchor through an anchor opening of the plurality of anchor openings contributes to securing the housing to the roof. Each anchor opening includes a boss. Each boss extends away from the bottom interior surface and surrounds a portion of each anchor above the bottom interior surface of the bottom. The junction box incudes a flashing attached to the bottom of the housing and extending away from the bottom in a same plane as the bottom. An upper side of the housing is rounded and/or pointed in a direction towards an apex of the slope of a roof.

Another junction box includes an enclosable housing that includes a bottom with a bottom interior surface and a bottom exterior surface. The housing is configured to mount to a roof of a structure with a slope. The junction box includes a central area of the bottom configured for penetrations into the roof. The junction box includes a flashing integral to the bottom of the housing and extending away from the bottom in a direction away from the housing.

These example embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE DRAWINGS

These and other features, aspects, and advantages of the present disclosure are better understood when the following Detailed Description is read with reference to the accompanying drawings.

DETAILED DESCRIPTION

Figure 1:
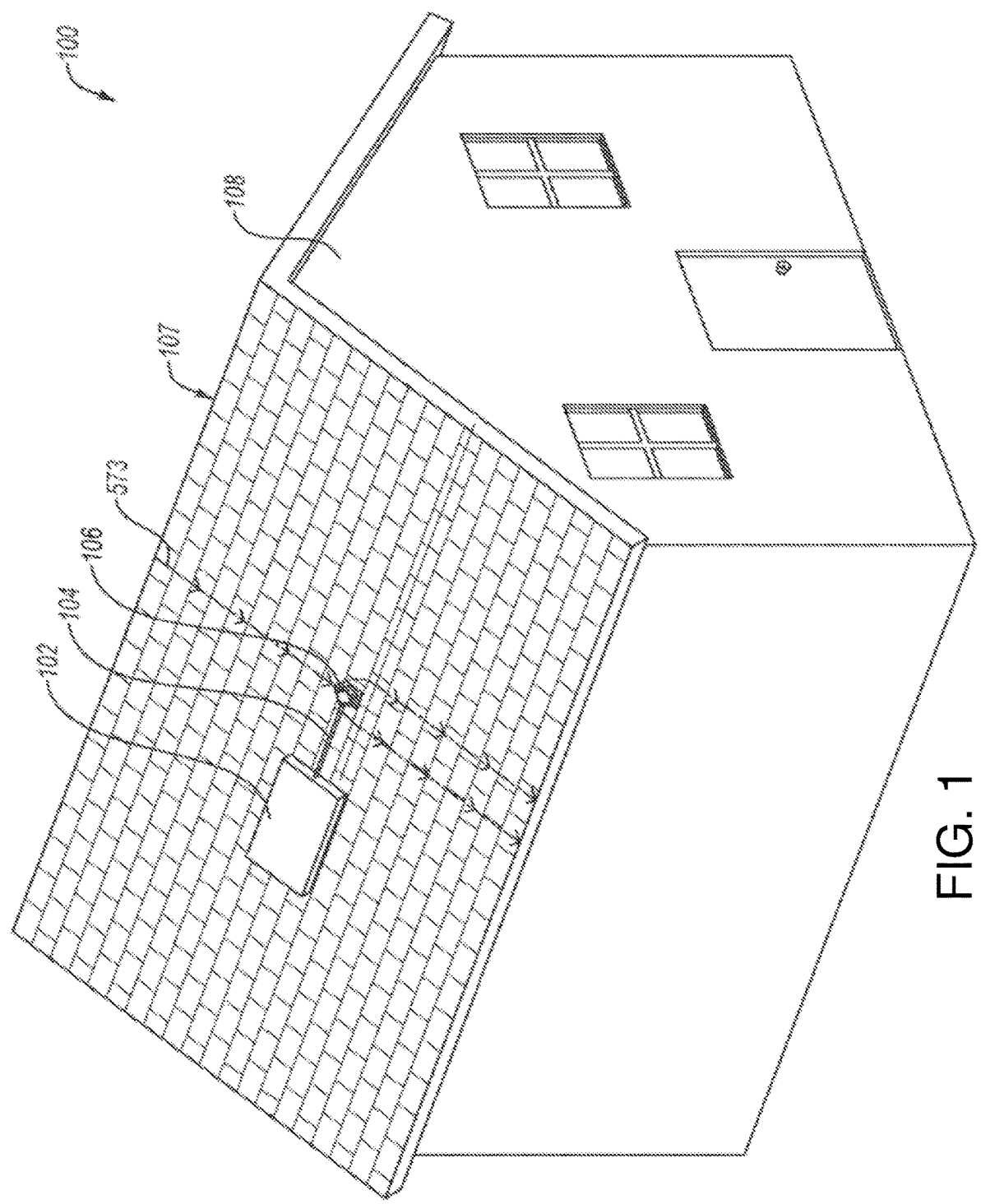
FIG. 1 illustrates an operating environment in which an example junction box may be implemented.

A junction box may be used for routing cables, wires, and/or other devices coupled to an external device located on an exterior surface of a structure to an interior space of the structure. For example, the cables, wires, and/or other devices may be coupled to a solar panel located on a roof of a house. Other devices may include coaxial cables, registered jack 45 ("RJ45") cables, and any other appropriate device. The cables, wires, and/or other devices may be routed from the external device to electrical connections located in the interior space of the structure using the junction box.

Some junction boxes may include knock-outs and/or holes. The knock-outs are portions of the junction box configured to easily detach to create an opening. The knock-outs and/or the holes are located at pre-determined locations in a housing of the junction box. The openings left when the knock-outs are removed and/or the holes may enable the cables, wires, and/or other devices to be routed into the housing of the junction box. Connectors may be fitted to the housing to seal the openings and holes through which the cables, wires, and/or other devices are routed.

Additionally, in some junction boxes, a lid may overlap a bottom piece of the housing. In particular, the lid, when attached to the housing, may extend beyond sidewalls of the bottom piece, which may define a space between the lid and the bottom portion that is substantially unsealed. Accordingly, environmental items such as water and dirt may enter the housing through the space, which may result in damage to the cables, wires, and/or other devices in the junction box. Additionally, portions of the environmental items may enter an interior structure adjacent to the exterior surface to which the junction box is attached.

Housings of some junction boxes may include a substantially square or rectangular shape. When these junction boxes are installed, surfaces of the housing are positioned at an angle substantially perpendicular to a flow of fluid on the exterior surface of the structure (e.g., substantially parallel to an apex of the exterior surface). Accordingly, fluids (e.g., rain, snow, and/or melting snow) may pool against the surface of the housing, which may reduce a life of the junction box.

Attachment features of junction boxes may limit placement relative to exterior surfaces. For example, some junction boxes may include a pipe or conduit that extends from a bottom surface of the junction box. To check placement and fit of the junction box, a hole in the exterior surface of the structure is created prior to placement of the junction box. Additionally, the pipe or the conduit extending from the bottom surface may be fixed relative to the junction box, which may cause a problem routing the cables or wires, into the interior space of the structure. For instance, if placement of the junction box causes the pipe or the conduit to be adjacent to a rafter or other structural support.

Some junction boxes may include conductive material (e.g., metal). These junction boxes must be electrically grounded to pass inspection in at least some jurisdictions. The junction box may be grounded using a ground of the structure and/or a ground of the external device. Grounding the junction box may increase a number of connections to these junction boxes, time involved in installation of these junction boxes, and/or a number of pieces of equipment used for installation of these junction boxes. Some junction boxes may include a lid or another portion that may be selectively attached to the housing. These lids may be small or include parts that are small and thus may be easily dropped and lost, which may introduce problems passing inspection and/or cost additional expense to replace the lost lids or included parts.

Installation of junction boxes on the exterior surface of a structure may be difficult and dangerous. Junction boxes that include features that reduce time, a number of tools, and/or a number of pieces of equipment used to install the junction boxes (collectively, resources/complexity) may reduce risks and costs associated with installation of the junction boxes. Reductions in the resources/complexity may be achieved by using a junction box that includes more suitable locations for routing cables, wires, and/or other devices from the external device while environmentally sealing a housing of the junction box (e.g., sealed to substantially prevent contaminants such as dirt, water, snow, or other environmental elements from entering an internal volume of the housing). Additionally, reduction of the resources/complexity may also be achieved by using a junction box that includes surfaces of the housing that shed fluids, that retain removable pieces (e.g., a lid or other fasteners), and that are not comprised of conductive materials (e.g., does not include metal).

Accordingly, embodiments described in the present disclosure are directed to a junction box that addresses some or all of the shortcomings of the junction boxes described above. In some embodiments, a junction box may include a flashing and a housing. The flashing may be configured to be positioned between multiple layers of shingles. The flashing may cover holes that are exposed due to shingle fasteners being removed during installation of the junction box. The flashing may define a first groove. The first groove may indicate suitable placement of sealant and/or other adhesives on a first surface of the flashing. Suitable placement of the sealant and/or adhesives on the first surface of the flashing may be between a perimeter of the first groove and one or more edges of the flashing.

The junction box may include the housing, which may be attached to the flashing and positioned a distance from the edges of the flashing. The housing may include a bottom portion that defines a second groove. The second groove may indicate suitable positions for creation of a hole in a bottom portion of the housing. Cables, wires, and/or other devices may be routed into an interior space of a structure through the created hole. Additionally, in some embodiments, the second groove may indicate suitable placement of fasteners for attachment of the junction box to the exterior surface of the structure. Suitable positions for creating a hole in the bottom portion may be anywhere within the second groove.

Indicating suitable positions for the hole may permit the junction box to be attached to the exterior surface without creating holes in the exterior surface prior to placement of the junction box. The second groove may be sized so that rafters or other support structures may be adjacent to the second groove while leaving sufficient clearance for a hole to be created without drilling into the rafters or other support structures. The size and position of the second groove may permit the junction box to be positioned at a location that is functional relative to the external device rather than relative to the rafters and/or other support structures. Additionally, a size and/or a position of the second groove may correspond to the first groove.

In some embodiments, the housing may include multiple sidewalls that meet to form joints. A first joint formed by a first sidewall and a second sidewall may be oriented towards a first edge of the flashing. When installed on the structure, the first joint may be oriented towards an apex of the exterior surface (e.g., substantially parallel to a flow of a fluid on the exterior surface). The first sidewall and the second sidewall may be positioned at an angle not parallel to the first edge of the flashing. The first joint and the positioning of the first sidewall and the second sidewall may prevent and/or reduce fluid from pooling on a surface of the housing.

In some embodiments, the lid, the flashing, and the joints may define one or more areas. The areas may indicate suitable positions for creating holes in the sidewalls to route the cables, wires, and/or the other devices from the external device into the internal volume of the housing. When fastened to the sidewalls, the connector may environmentally seal the holes in the sidewalls.

Additionally, in some embodiments, the junction box may include a gasket positioned such that when the lid is attached to the housing, the gasket is compressed between the lid and a portion of the housing to environmentally seal an internal volume defined by the lid, the sidewalls, and a bottom portion of the housing. In some embodiments, the junction box may be comprised of a single unibody piece of material that forms the housing and the flashing. In these and other embodiments, the junction box may include a non-conductive material (e.g., plastic). Thus, the junction box may not require electrical grounding\. Alternatively, the junction box may include a metallic material to permit implementation of the junction box with different exterior surfaces of the structure that permit the use of metallic materials, for example, tile exterior surfaces.

In some embodiments, the junction box may include adhesive materials (e.g., peel and stick materials) on the flashing that adhere the junction box to the exterior surface of the structure or adhere the shingles to the flashing. Including the adhesive material on the flashing may reduce resources/complexity of installing the junction box. In addition, the adhesive material may reduce equipment used to install the junction box. Further, the adhesive material may ensure that sealant is used (e.g., the adhesive material) that meets code. Additionally, the adhesive material may improve the likelihood of holes that are made in the exterior surface of the structure are sheltered from moisture such as rain, snow, dirt, etc.

In some embodiments, the lid may attach to the housing of the junction box by press fit, slide fit or snap fit. Attaching the lid to the housing by press fit, slide fit or snap fit may also reduce the resources/complexity of installing the junction box. Further, Attaching the lid to the housing by press fit, slide fit, or snap fit rather than fasteners may reduce a cost associated with the junction box.

In some embodiments, a junction box may be configured for use with tile shingles. The junction box configured for use with tile shingles may include an extension housing. The extension housing may attach to the housing and extend a height of the junction box beyond the tile shingles relative to the exterior surface of the structure. In addition, a second flashing may be positioned between the extension housing and the housing. The second flashing may conform to a surface of the tile shingles. In combination with the first flashing, the second flashing may prevent moisture from entering the structure via the holes made in the tile shingles and the exterior surface of the structure.

Another junction box with a housing with anchor openings positioned for anchors to compress a sealant includes an enclosable housing that includes a bottom with a bottom interior surface and a bottom exterior surface opposing the bottom interior surface. The housing is configured to mount to a roof of a structure with a slope. The junction box includes a sealant disposed on the bottom exterior surface. The sealant surrounds a central area of the bottom. The central area is configured for penetrations into the roof and the sealant surrounds at least an upper portion and side portions of the central area. The upper portion is oriented toward an upper side of the bottom with respect to the slope of the roof. The junction box includes a plurality of anchor openings in the bottom. Each anchor opening is configured for an anchor where securing an anchor through an anchor opening of the plurality of anchor openings contributes to securing the housing to the roof and applies a force directed toward the roof that compresses a portion of the sealant adjacent to and/or surrounding the anchor opening.

In some embodiments, the plurality of anchor openings are positioned to cause at least a portion of the sealant in a continuous band around the side portions and the upper portion of the central area when the plurality of anchor openings each have an anchor secured to the roof. In other embodiments, a lower portion opposite the upper portion of the central area is free from the sealant where the lower portion is oriented at a lowest part of the bottom with respect to the slope of the roof. In other embodiments, the sealant is positioned in a band passing between and around each of the plurality of anchor openings. In a further embodiments, the sealant extends past the anchor openings in a direction away from the central area.

In some embodiments, the sealant is positioned between the anchor openings and the central area. In some embodiments, the junction box includes an additional sealant positioned between the plurality of anchor openings and an side and upper edges of the housing. In other embodiments, the junction includes a drill zone marking on the bottom interior along a perimeter of the central area and/or within the central area. In other embodiments, the junction box includes a compression ring positioned along the plurality of anchor openings. The compression ring is configured to stiffen the bottom of the housing. Anchors positioned through the plurality of anchor openings and secured to the roof provide a force between anchor openings of the plurality of anchor openings sufficient to compress the sealant to create a seal to the roof continuously along the compression ring. In other embodiments, the compression ring includes a thickened portion of material of the bottom of the housing. In other embodiments, the compression ring is separate from the bottom of the housing and includes anchor openings positioned to align with the plurality of anchor openings in the bottom of the housing, the compression ring positioned on the bottom interior surface.

In some embodiments, the junction box includes a recess in the bottom exterior surface where the sealant is positioned in the recess. In other embodiments, the sealant includes a compressible portion and/or a sealing portion. The compressible portion is positioned between the bottom exterior surface and the sealing portion. The sealing portion includes a material that conforms to uneven surfaces of the roof adjacent to the sealant. In other embodiments, the junction box includes an inner ridge and/or an outer ridge disposed on the bottom exterior surface. The inner ridge is located interior to an edge of the sealant towards the central area and the outer ridge is located in a zone between an exterior edge of the sealant and an exterior edge of the housing. The inner ridge and the outer ridge run a length of the sealant and the anchors securing the housing to the roof compress the sealant enough so that the inner ridge and/or the outer ridge contact the roof.

Another junction box with a housing with anchor openings positioned for anchors to compress a sealant includes an enclosable housing that includes a bottom with a bottom interior surface and a bottom exterior surface opposing the bottom interior surface. The housing configured to mount to a roof of a structure with a slope. The junction box includes a sealant disposed on the bottom exterior surface. The sealant surrounds a central area of the bottom. The sealant surrounds at least an upper portion and side portions of the central area where the upper portion is oriented toward an upper side of the bottom with respect to the slope of the roof. The junction box includes a plurality of anchor openings in the bottom. Each anchor opening is configured for an anchor. Securing an anchor through an anchor opening of the plurality of anchor openings contributes to securing the housing to the roof and applies a force directed toward the roof that compresses a portion of the sealant adjacent to and/or surrounding the anchor opening. The junction box includes a compression ring positioned along the plurality of anchor openings. The compression ring is configured to stiffen the bottom of the housing. A lower portion opposite the upper portion of the central area is free from the sealant. The lower portion is oriented at a lowest part of the bottom with respect to the slope of the roof.

In some embodiments, the compression ring is a thickened portion of material of the bottom of the housing. In other embodiments, the compression ring is separate from the bottom of the housing and includes anchor openings positioned to align with the plurality of anchor openings in the bottom of the housing. The compression ring is positioned on the bottom interior surface. In other embodiments, the junction box includes a drill zone marking on the bottom interior along a perimeter of the central area and/or within the central area. In other embodiments, the junction box includes an inner ridge and/or an outer ridge disposed on the bottom exterior surface. The inner ridge is located interior to an edge of the sealant towards the central area and the outer ridge is located in a zone between an exterior edge of the sealant and an exterior edge of the housing. The inner ridge and the outer ridge run a length of the sealant and the anchors securing the housing to the roof compress the sealant enough so that the inner ridge and/or the outer ridge contact the roof.

A junction box with a housing with anchor openings positioned for anchors to compress a sealant includes an enclosable housing that includes a bottom with a bottom interior surface and a bottom exterior surface opposing the bottom interior surface. The housing is configured to mount to a roof of a structure with a slope. The junction box includes a drill zone surrounding a central area of the bottom and marked on the bottom and a sealant disposed on the bottom exterior surface. The sealant surrounds at least an upper portion and side portions of the drill zone and the upper portion is oriented toward an upper side of the bottom with respect to the slope of the roof. The junction box includes a plurality of anchor openings in the bottom. Each anchor opening is configured for an anchor. Securing an anchor through an anchor opening of the plurality of anchor openings contributes to securing the housing to the roof and applies a force directed toward the roof that compresses a portion of the sealant adjacent to and/or surrounding the anchor opening.

Another example of a junction box includes an enclosable housing that includes a bottom with a bottom interior surface and a bottom exterior surface opposing the bottom interior surface. The housing is configured to mount to a roof of a structure with a slope. The junction box includes a central area of the bottom. The central area is configured for penetrations into the roof. The junction box includes a sealant disposed on the bottom exterior surface. The sealant surrounds the central area of the bottom and the sealant surrounds at least an upper portion and side portions of the central area. The upper portion is oriented toward an upper side of the bottom with respect to the slope of the roof. The junction box includes a plurality of anchor openings in the bottom located between the central area and the sealant. Each anchor opening is configured for an anchor. Securing an anchor through an anchor opening of the plurality of anchor openings contributes to securing the housing to the roof.

In some embodiments, a perimeter of the central area includes an indicia on the bottom interior surface marking the central area. In other embodiments, the indicia of the perimeter of the central area includes a color different from surrounding surfaces, a line and/or a groove. In other embodiments, the bottom interior surface includes indicia within the central area marking the central area. In other embodiments, the indicia within the central area comprises a color different from surrounding surfaces, a pattern, grooves, and/or a hatching. In other embodiments, the junction box includes an indicia on the bottom exterior surface corresponding to a perimeter of the central area. In other embodiments, a lower portion opposite the upper portion of the central area is free from the sealant. The lower portion is oriented at a lowest part of the bottom with respect to the slope of the roof. In other embodiments, the junction box includes additional sealant positioned between the anchor openings and the central area.

In some embodiments, the junction box includes a flashing attached to the bottom of the housing and extending away from the bottom in a same plane as the bottom. In other embodiments, each anchor opening includes a boss. Each boss extends away from the bottom interior surface and surrounds a portion of each anchor above the bottom interior surface of the bottom. In other embodiments, each boss includes a thickened area surrounding the anchor opening. The thickened area is configured to be under a top of an anchor positioned in the anchor opening where the top is wider than a shaft portion of the anchor extending through the anchor opening. In other embodiments, the sealant is compressible and securing the anchors in the anchor openings compresses the sealant between the roof and the bottom exterior surface.

In some embodiments, an upper side of the housing is rounded and/or pointed in a direction towards an apex of the slope of a roof. In other embodiments, a sidewall of the housing includes indicia indicating a location suitable for a hole to permit a connector to be attached to the housing. In other embodiments, the junction box includes an inner ridge and/or an outer ridge disposed on the bottom exterior surface. The inner ridge is located interior to an edge of the sealant towards the central area and the outer ridge is located in a zone between an exterior edge of the sealant and an exterior edge of the housing. The inner ridge and the outer ridge run a length of the sealant and the anchors securing the housing to the roof compress the sealant enough so that the inner ridge and/or the outer ridge contact the roof.

Another example of a junction box includes an enclosable housing that includes a bottom with a bottom interior surface and a bottom exterior surface opposing the bottom interior surface. The housing is configured to mount to a roof of a structure with a slope. The junction box includes a central area of the bottom. The central area is configured for penetrations into the roof. A perimeter of the central area includes an indicia on the bottom interior surface marking the central area. The junction box includes a sealant disposed on the bottom exterior surface. The sealant surrounds the central area of the bottom and the sealant surrounds at least an upper portion and side portions of the central area. The upper portion is oriented toward an upper side of the bottom with respect to the slope of the roof. The junction box includes a plurality of anchor openings in the bottom located between the central area and the sealant. Each anchor opening is configured for an anchor. Securing an anchor through an anchor opening of the plurality of anchor openings contributes to securing the housing to the roof. Each anchor opening includes a boss. Each boss extends away from the bottom interior surface and surrounds a portion of each anchor above the bottom interior surface of the bottom.

In some embodiments, the junction box includes indicia within the central area marking the central area. In other embodiments, the junction box includes an indicia on the bottom exterior surface corresponding to a perimeter of the central area. In other embodiments, a lower portion opposite the upper portion of the central area is free from the sealant and the lower portion is oriented at a lowest part of the bottom with respect to the slope of the roof. In other embodiments, the housing includes a flashing attached to the bottom of the housing and extending away from the bottom in a same plane as the bottom. In other embodiments, each boss includes a thickened area surrounding the anchor opening where the thickened area is configured to be under a top of an anchor positioned in the anchor opening. The top is wider than a shaft portion of the anchor extending through the anchor opening. In other embodiments, the sealant is compressible and securing the anchors in the anchor openings compresses the sealant between the roof and the bottom exterior surface. In other embodiments, an upper side of the housing is rounded and/or pointed in a direction towards an apex of the slope of a roof. In other embodiments, a sidewall of the housing includes indicia indicating a location suitable for a hole to permit a connector to be attached to the housing.

Yet another example of a junction box includes an enclosable housing that includes a bottom with a bottom interior surface and a bottom exterior surface opposing the bottom interior surface. The housing is configured to mount to a roof of a structure with a slope. The junction box includes a central area of the bottom. The central area is configured for penetrations into the roof. A perimeter of the central area includes an indicia on the bottom interior surface marking the central area. The junction box includes a sealant disposed on the bottom exterior surface. The sealant surrounds the central area of the bottom and the sealant surrounds at least an upper portion and side portions of the central area. The upper portion is oriented toward an upper side of the bottom with respect to the slope of the roof. The junction box includes a plurality of anchor openings in the bottom located between the central area and the sealant. Each anchor opening is configured for an anchor. Securing an anchor through an anchor opening of the plurality of anchor openings contributes to securing the housing to the roof. Each anchor opening includes a boss. Each boss extends away from the bottom interior surface and surrounds a portion of each anchor above the bottom interior surface of the bottom. The junction box incudes a flashing attached to the bottom of the housing and extending away from the bottom in a same plane as the bottom. An upper side of the housing is rounded and/or pointed in a direction towards an apex of the slope of a roof.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 illustrates an example operating environment 100 in which a junction box 106 may be implemented. The operating environment 100 may include a structure 108 on which an external device 102 and the junction box 106 are installed. The external device 102 may be connected to the junction box 106 via a connection device 104. For example, the structure 108 may include an exterior surface. The exterior surface in the operating environment 100 of FIG. 1 includes a shingled roof. In other environments, the exterior surface may include, another type of roof, an exterior array, an angled wall, or another suitable exterior surface. The external device 102 and the junction box 106 may be attached to the exterior surface of the structure 108. In the embodiment of FIG. 1, the structure 108 includes a house. In other embodiments, the structure 108 may include another structure such as a shed, a garage, a solar array, or another suitable structure to which the external device 102 and/or the junction box 106 may be attached.

The external device 102 may include any device that includes cables, wires, and/or other devices that are to be routed from the external device 102 to an interior space of the structure 108. For example, the external device 102 may include a solar panel array, a satellite dish, or a battery system. The solar panel array may include photovoltaic wires that are to be routed through the junction box 106 into the interior space of the structure 108. In some embodiments, the cables, wires, and/or other devices may be routed through the exterior surface via the junction box 106. The cables, wires, and/or other devices may then electrically couple the external device 102 to an electrical device located in an interior space of the structure 108 or to a power grid. In some embodiments, the cables, wires, or other devices from multiple external devices (e.g., the external device 102) may be joined at the junction box 106.

In embodiments in which the exterior surface includes a shingled roof, when installed, a portion of the junction box 106 (e.g., a portion of a flashing) may be placed under a layer of shingles on the exterior surface. For example, one or more shingles may be raised away from the exterior surface and the portion of the flashing of the junction box 106 may be placed between the shingles and the exterior surface. The shingles may be shaped corresponding to a first joint, a first sidewall, and/or a second sidewall of a housing of the junction box 106. Some additional details of examples of the first joint, the first sidewall, the second sidewall, and the housing are provided elsewhere in the present disclosure. The shingles may be shaped using substantially straight lines corresponding to the first joint, the first sidewall, and/or the second sidewall of the junction box 106. The junction box 106 may be configured to be used with asphalt shingles, tile shingles, metal roofing, rolled asphalt surfaces, EPDM surfaces, or any other appropriate exterior surface material.

Additionally, the junction box 106 may be installed so that the first joint of the housing may be oriented towards an apex 107 of the exterior surface (e.g., a ridge line of the roof). The first joint may be oriented towards the apex 107 of the exterior surface (e.g., substantially parallel to the flow of a fluid 573 on the exterior surface). The junction box 106 may be installed below the apex 107 relative to gravity. Additionally, a first edge of the flashing may be installed substantially parallel to the apex 107 of the structure (e.g., substantially perpendicular to the flow of the fluid 573 on the exterior surface). The first sidewall and the second sidewall may be positioned at angles substantially not parallel relative to the apex 107 of the exterior surface.

The first joint, the first sidewall, and/or the second sidewall may prevent and/or reduce the fluid 573 from pooling on a surface of the junction box 106. For example, the flow of the fluid 573 may be in a direction away from the apex 107, relative to gravity, towards the junction box 106. The flow of the fluid 573 may cause at least a portion of the fluid 573 to contact the first joint of the housing, the first sidewall, and/or the second sidewall. The portion of the fluid 573 that contacts the first joint may contact the first joint then traverse along a surface of the first sidewall or the second sidewall. Additionally, the fluid 573 that contacts the first sidewall or the second sidewall may traverse the corresponding sidewall. The angles of the first sidewall and the second sidewall may direct the fluid 573 away from the housing. The angles of the first sidewall, the second sidewall, and the first joint may prevent the fluid 573 from pooling on a surface of the housing.

The cables, wires, and/or other devices may be routed from the external device 102 to the junction box 106 through the connection device 104. In some embodiments, the connection device 104 may include a conduit. In other embodiments, the connection device 104 may include the cables, wires, and/or other devices and a connector. In these and other embodiments, the connector may include multiple pieces configured to attach to each other and sandwich a portion of the housing surrounding a hole in a sidewall of the housing between the pieces. The connector may environmentally seal the hole in which the cables or wires are routed through. Although, the junction box 106 as illustrated includes a single connection point on a single sidewall of the junction box 106, multiple connection points may be used on multiple sidewalls and/or a single sidewall or a single connection point may be used on multiple sidewalls.

The junction box 106 may provide an environmentally sealed device for routing cables, wires, and/or other devices from the external device 102 to the interior space of the structure 108. In some embodiments, the junction box 106 may provide an environmentally sealed device for housing wire nuts, grounding lugs, split bolt splicing, Polaris connectors, fuses, breakers or any other appropriate device or component for routing the cables, wires, and other devices from the external device 102 to the interior space of the structure 108.

Figure 2A:
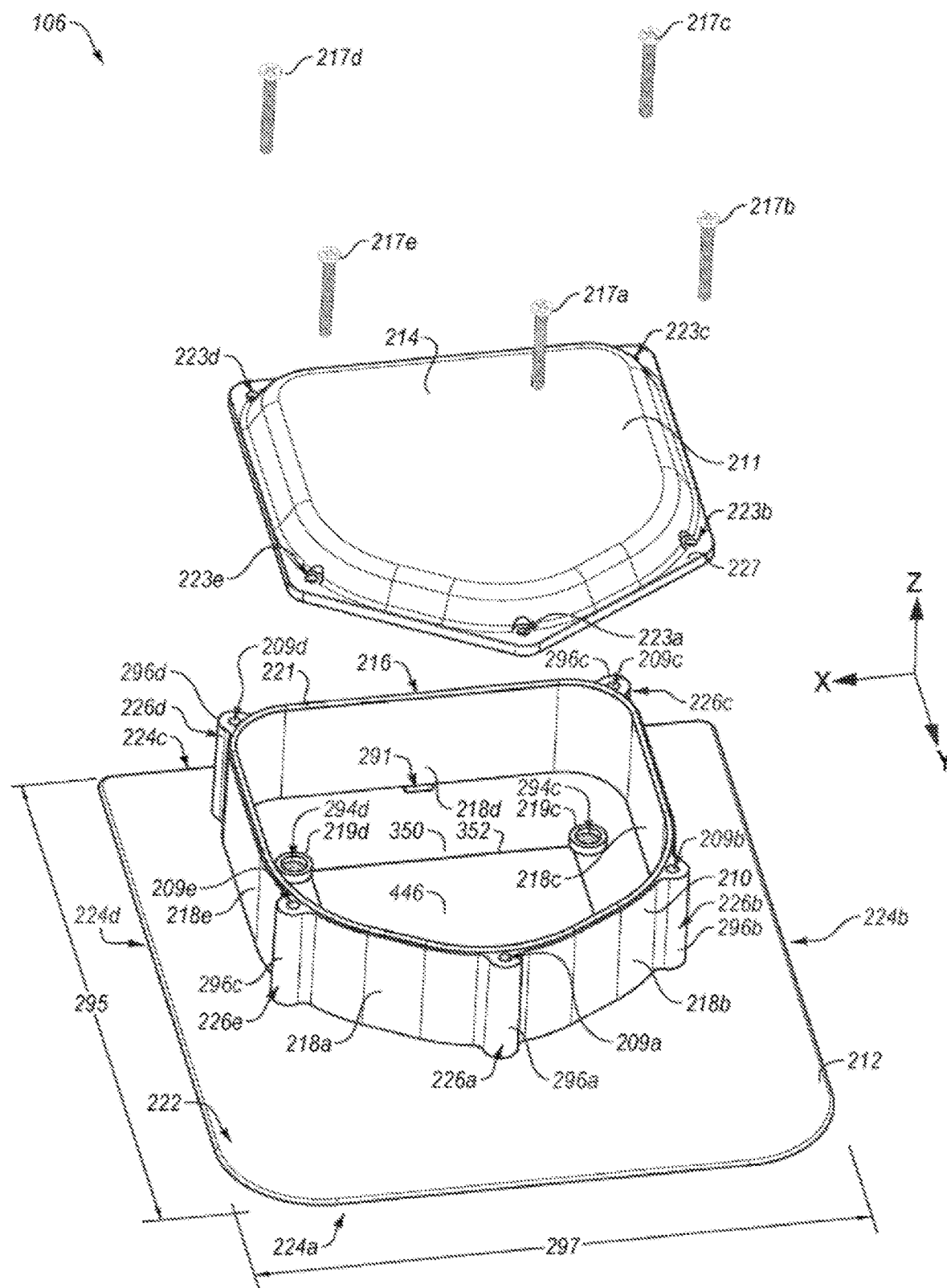
FIG. 2A illustrates a perspective view of the junction box of FIG. 1.
Figure 2B:
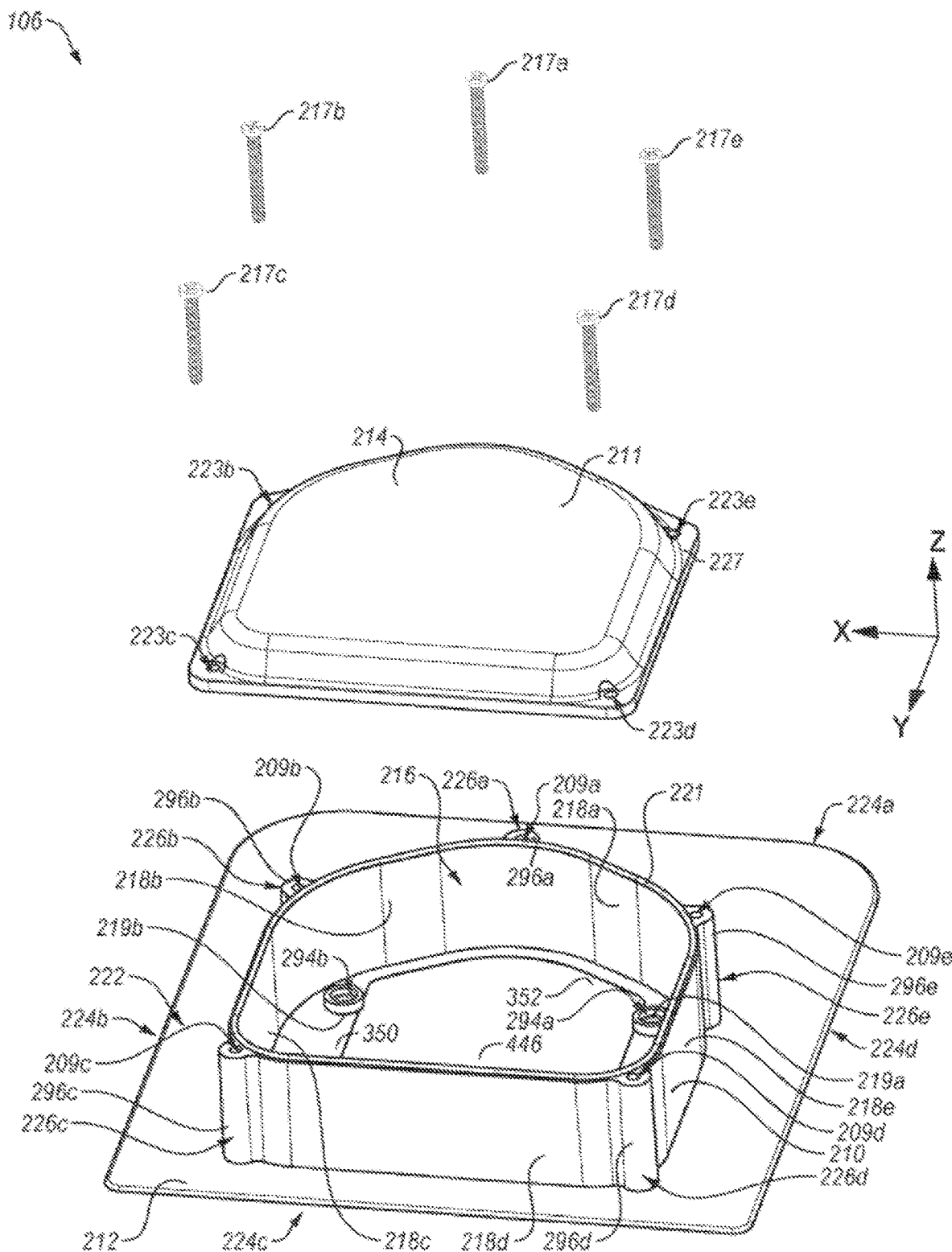
FIG. 2B illustrates another perspective view of the junction box of FIG. 1.
Figure 2C:
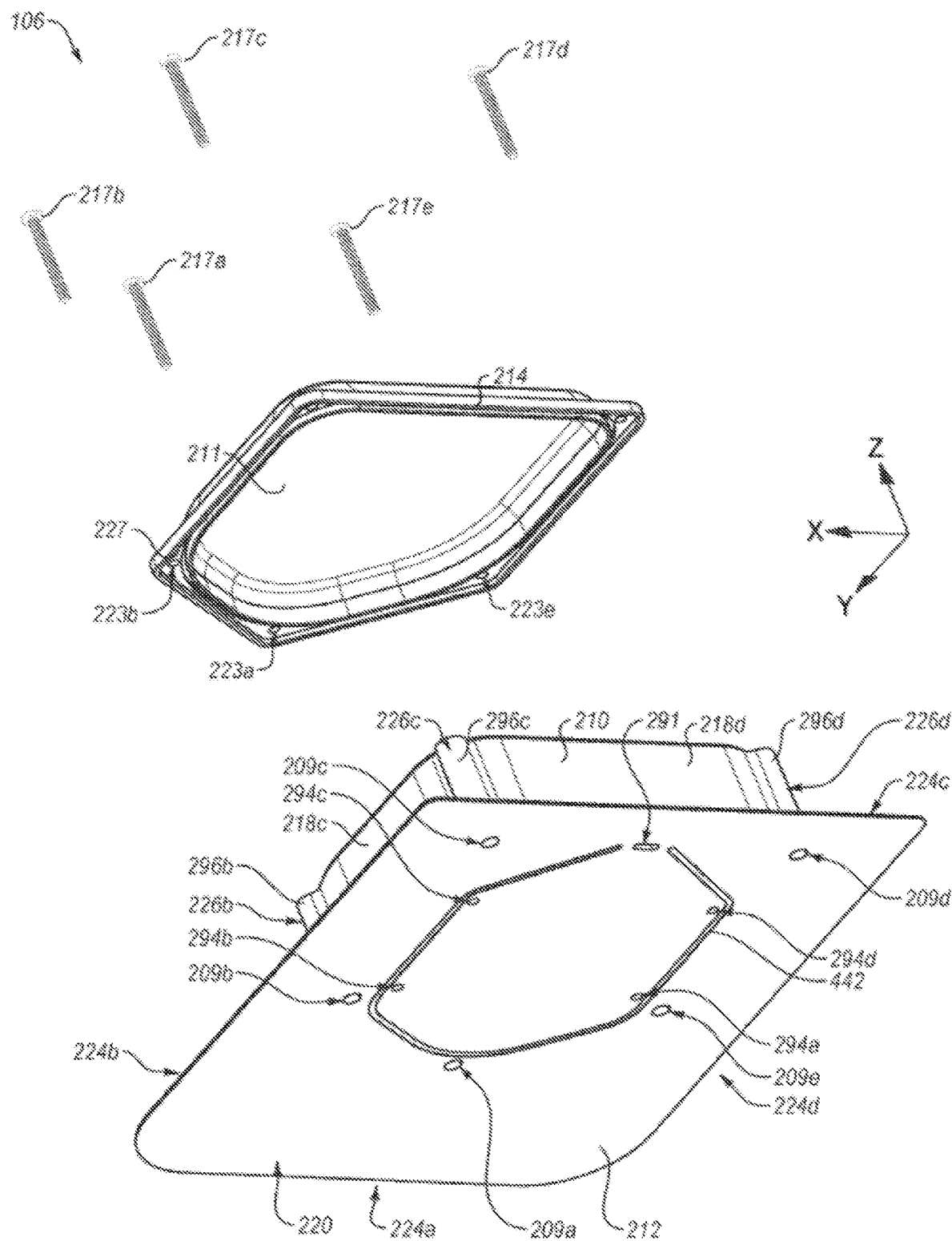
FIG. 2C illustrates another perspective view of the junction box of FIG. 1.

FIGS. 2A, 2B, and 2C illustrate perspective views of an embodiment of the junction box 106 of FIG. 1. The junction box 106 may be implemented on the exterior surface of the structure and may provide a structure through which cables, wires, and/or other devices may be routed.

With combined reference to FIGS. 2A-2C, the junction box 106 may include a flashing 212, a housing 210, and a lid 214. The flashing 212 may include at least one of a first edge 224a, a second edge 224b, a third edge 224c, and a fourth edge 224d (generally, edge 224 or edges 224). The edges 224 may define a perimeter of the flashing 212.

A portion of the flashing 212 may be placed under a portion of an exterior surface of the structure. For example, the portion of the flashing may be placed under a portion of the shingles. The portion of the exterior surface may contact a portion of a second surface 222 of the flashing 212 (illustrated in FIGS. 2A and 2B). The portion of the flashing 212 that may be placed under a portion of the exterior surface may extend from the first edge 224a up to a second joint 226b and a fifth joint 226c of the housing 210. For example, an end of the portion of the exterior surface may be coplanar with the second joint 226b and the fifth joint 226c. Additionally, at least a portion of a first surface 220 of the flashing 212 (e.g., illustrated in FIG. 2C) may contact the structure.

The first surface 220 of the flashing 212 may define a first groove 442 (e.g., illustrated in FIG. 2C). A size and a position of the first groove 442 may correspond to a size and/or a position of a second groove 352 (e.g., illustrated in FIGS. 2A and 2B). The first groove 442 may indicate suitable placement of sealant or other suitable adhesive on the first surface 220 of the flashing 212. Suitable placement of the sealant may be between the first groove 442 and the edges 224 of the flashing 212. The suitable placement may prevent a user from placing a hole in a bottom portion 350 of the housing 210 that corresponds to where the sealant may be placed. In some embodiments, the sealant may be placed in a semi-circle shape. The first groove 442 may provide a reference for a radius of the semi-circle shape. Alternatively, an adhesive material may be pre-attached to the first surface 220 of the flashing 212 as discussed below in relation to FIG. 6B.

Although, the first groove 442 as illustrated is substantially an open-ended hexagonal groove defined by the first surface 220 of the flashing 212, the first groove 442 may include another appropriate indicia for indication of suitable placement of the sealant on the first surface 220 of the flashing 212.

In some embodiments, an edge material (not illustrated) may be attached to one or more of the edges 224 of the flashing 212. In these and other embodiments, the flashing 212 may include a pliable material such as ethylene propylene diene monomer (EPDM) and the edge material may include an aluminum material. The edge material may be configured to be shaped to match a contour of the exterior surface. For example, the edge material may be configured to be shaped to match a contour of the tile shingles. The edge material, when shaped, may cause the flashing 212 to also be shaped to match a contour of the exterior surface of the structure.

The housing 210 may be attached to the flashing 212. Additionally, the housing 210 may be positioned a distance from the edges 224. The distance the housing 210 is positioned from the edges 224 may be such that the perimeter of the second groove 352 is at least a particular distance from the edges 224. Additionally or alternatively, the housing 210 may be positioned from the edges 224 such that a first boss 219a, a second boss 219b, a third boss 219c, and a fourth boss 219d (generally, boss 219 or bosses 219) are at least the particular distance from the edges 224. The particular distance is discussed in more detail with reference to FIGS. 3B and 4B.

Additionally, the housing 210 may be positioned such that a first joint 226a is oriented towards the first edge 224a. The first joint 226a may be formed such that, when the junction box 106 is installed, the first joint 226a is oriented towards the apex of the exterior surface of the structure, such as the apex of a roof. Additionally, a first sidewall 218a and a second sidewall 218b may be positioned such that an angle formed by the first sidewall 218a and the second sidewall 218b at the first joint 226a may be between five degrees and one hundred seventy degrees. For example, the angle may be between sixty-five degrees and one hundred twenty degrees. Furthermore, the first sidewall 218a and the second sidewall 218b may form the first joint 226a such that the first joint 226a is oriented towards the apex of a structure, which may permit the junction box 106 to be installed while reducing an amount of fluid that pools on surfaces of the housing 210.

An area on sidewalls 218 of the housing 210 may indicate suitable positions for creating holes in the housing 210 (e.g., suitable hole positions in the housing 210). The suitable positions for creating holes in the housing 210 may be configured for electrical metallic tubing (EMT) connectors, strain reliefs, polyvinyl (PVC) connectors, Rigid connectors, non-metallic liquid tight conduit, or any other appropriate connector type for routing the cables, wires, and/or other devices through a hole in the housing 210 and environmentally sealing the hole. For example, the suitable positions for creating holes in the housing 210 may permit connectors that include a diameter between about a quarter inch and about two inches to be used. The areas on the sidewalls 218 may permit connectors to be fitted to the housing 210 in more places and/or using more types of connectors. Additionally, the areas on the sidewalls 218 may permit connectors to be fitted on more sides of the housing 210, which may also permit the junction box 106 to be installed in a place on the exterior surface that reduces a number of connectors or a distance between the junction box 106 and an external device. The areas on the sidewalls 218 are discussed in more detail below in relation to FIGS. 5A and 5B.

The housing 210 may include the first sidewall 218a, the second sidewall 218b, the third sidewall 218c, the fourth sidewall 218d, and the fifth sidewall 218e (generally, sidewalls 218 or sidewall 218). The first sidewall 218a and the second sidewall 218b may form the first joint 226a. The second sidewall 218b and the third sidewall 218c may form the second joint 226b. The third sidewall 218c and the fourth sidewall 218d may form a third joint 226c. The fourth sidewall 218d and the fifth sidewall 218e may form a fourth joint 226d. The fifth sidewall 218e and the first sidewall 218a may form the fifth joint 226e. The first joint 226a, the second joint 226b, the third joint 226c, the fourth joint 226d, and the fifth joint 226e may be generally referred to as joints 226 or joint 226 in the present disclosure.

The joints 226 may be formed as a rounded surface. In other embodiments, the joints 226 may be formed to include a radius. The radius may be between about one-half inches and about three inches. In addition, the junction box 106 may include a first nodule 296a, a second nodule 296b, a third nodule 296c, a fourth nodule 296d, and a fifth nodule 296e (generally, nodules 296 or nodule 296). The nodules 296 may be formed as part of the joints 226. For example, the first nodule 296a may be formed as part of the first joint 226a; the second nodule 296b may be formed as part of the second joint 226b; the third nodule 296c may be formed as part of the third joint 226c; the fourth nodule 296d may be formed as part of the fourth joint 226d; and the fifth nodule 296e may be formed as part of the fifth joint 226e.

The nodules 296 may be formed so as to extend from the housing 210 towards the edges 224 of the flashing 212. For example, the first nodule 296a may extend from the housing 210 towards the first edge 224a; the second nodule 296b may extend from the housing 210 towards the second edge 224b; the third nodule 296c and the fourth nodule 296d may extend from the housing 210 towards the third edge 224c; and the fifth nodule 296e may extend from the housing 210 towards the fourth edge 224d.

The bottom portion 350 may be attached to the sidewalls 218. The second groove 352 may indicate suitable positions for creating a hole in the bottom portion 350 (e.g., suitable hole positions in the bottom portion 350). For example, a first portion 446 of the bottom portion 350 may be positioned within a perimeter of the second groove 352 and may be a suitable position for creating a hole in the bottom portion 350. Furthermore, placement of the second groove 352 may permit the junction box 106 to be installed in a place on the exterior surface that reduces a number of connectors or a distance between the junction box 106 and an external device rather than being installed to avoid rafters and/or other support structures.

In some embodiments, the second groove 352 may indicate suitable placement positions of fasteners for attaching the junction box 106 to the structure. Placement of the fasteners within the housing 210 rather than the second surface 222 of the flashing 212 may prevent the fasteners from falling and getting lost because the fasteners may remain within the housing 210 if dropped. Additionally or alternatively, the second groove 352 may indicate suitable placement of fasteners for attaching a din rail or any other appropriate device to the junction box 106.

Although, the second groove 352 as illustrated is a substantially pentagonal groove defined by the bottom portion 350, the second groove 352 may include any appropriate indicia for indicating suitable positions for creating a hole in the bottom portion 350. For example, the second groove 352 may include a different color than a color of the bottom portion 350, hatching, or any other appropriate indicia. Additionally, although, the second groove 352 as illustrated is a pentagonal shape, the second groove 352 may include a square, a rectangle, a triangle, or any other appropriate shape.

In some embodiments, the junction box 106 may include a din rail (not illustrated). In some embodiments, the din rail may be attached to the junction box 106 within the internal volume of the housing 210 via one or more of the bosses 219. Alternatively, in some embodiments, the din rail may be attached to the junction box 106 within the internal volume of the housing 210 via one or more holes created within the second groove 352. Additionally, the din rail may include one or more terminal blocks that are attached to the din rail. The din rail and the terminal blocks may be used for routing and/or connecting the cables, wires, and/or other devices from the external device to the internal volume of the structure. The terminal blocks may be connectors that electrically couple two or more cables, wires, and/or other devices to each other by coupling the two or more cables, wires, and/or other devices to one or more conductive portions of the terminal blocks.

In some embodiments, the bosses 219 define a first boss hole 294a, a second boss hole 294b, a third boss hole 294c, and a fourth boss hole 294d (generally, boss hole 294 or boss holes 294). The boss holes 294 may permit the din rail and/or terminal blocks to be mounted without having to use a self-tap fastener. In other embodiments, the boss holes 294 may be omitted and the bosses 219 may define a recess for receiving fasteners.

In some embodiments, the bottom portion 350 may include one or more stand-offs. The stand-offs may define a recess for receiving fasteners. The recess may be defined so as to prevent the fasteners from penetrating the bottom portion 350. The stand-offs may be used to attach grounding bars, grounding lugs, din rails, or any other appropriate device within the internal volume.

In some embodiments, the bottom portion 350 may define a weep hole 291. The weep hole 291 may be configured to permit fluid that is positioned within the internal volume defined by the lid 214, the sidewalls 218, and the bottom portion 350 to exit via the weep hole 291. In other embodiments, the weep hole 291 may be omitted.

In some embodiments, the sidewalls 218 may define a gasket groove (not illustrated) along an upper surface of the sidewalls 218. A gasket 221 (e.g., an O-ring, a formed in place (FIP) gasket, or a cure in place (CIP) gasket) may be placed, formed, or cured so as to at least partially be within the gasket groove. The gasket 221 may extend beyond the gasket groove in the z-direction when placed, formed, or cured in the gasket groove. In some embodiments, the gasket 221 may be pliable so as to conform to the shape of the gasket groove. For example, the gasket 221, when placed in the gasket groove, may form a shape that is substantially similar to the shape of the housing 210 (e.g., a pentagon as illustrated in FIGS. 2A-2C). In other embodiments, the gasket 221 may be pre-formed to the shape of the gasket groove. Alternatively, the gasket 221 may be formed or cured within the gasket groove so as to take the shape of the housing 210. The gasket 221, when placed, formed, or cured in the gasket groove, may substantially surround an opening 216 on a plane substantially parallel to the second groove 352.

Alternatively, the lid 214 may define a gasket groove (not illustrated) along a bottom surface of the lid 214. The gasket 221 (e.g., an O-ring, a FIP gasket, or a CIP gasket) may be placed, formed, or cured so as to at least partially be within the gasket groove defined by the lid 214. The gasket 221 may extend beyond the gasket groove in the z-direction when placed, formed, or cured in the gasket groove.

The junction box 106 may include at least one of a first fastener 217a, a second fastener 217b, a third fastener 217c, a fourth fastener 217d, and a fifth fastener 217e (generally, fasteners 217 or fastener 217). The lid 214 may selectively attach to the housing 210 via the fasteners 217. In some embodiments, the fasteners 217 may include snap on fasteners, friction fit fasteners, or any other appropriate fastener type for attaching the lid 214 to the housing 210. The lid 214 when attached to the housing 210 may environmentally seal the internal volume of the housing 210 (e.g., a volume defined by the lid 214, the bottom portion 350, and the sidewalls 218). The internal volume is discussed in more detail below in relation to FIG. 3A.

The lid 214 may define at least one of a first opening 223a, a second opening 223b, a third opening 223c, a fourth opening 223d, and a fifth opening 223e (generally, openings 223 or opening 223). The openings 223 may be defined so as to permit the fasteners 217 to pass through.

In some embodiments, the housing 210 may define a first receiver opening 209a, a second receiver opening 209b, a third receiver opening 209c, a fourth receiver opening 209d, and a fifth receiver opening 209e (generally, receiver openings 209 or receiver opening 209). Each receiver opening 209 may be concentric with a corresponding opening 223. In some embodiments, the receiver openings 209 may be positioned proximate the joints 226 or the nodules 296. The receiver openings 209 may be configured to receive the fasteners 217 so as to attach the lid 214. In some embodiments, the fasteners 217 may include screws with threads that mate with a threaded portion of the receiver openings 209. In other embodiments, the housing 210 may not define the receiver openings 209 and the fasteners 217 may include self-tapper screws that are configured to create tapper openings (not illustrated) that operate the same as or similar to the receiver openings 209.

The receiver openings 209 may be defined such that the receiver openings 209 pass through the entire junction box 106 in the z-direction. In some embodiments, the junction box 106 may include a first press nut, a second press nut, a third press nut, a fourth press nut, and a fifth press nut (generally, press nut or press nuts). The press nuts may include a threaded portion, a snap on portion, a friction fit portion, or any other appropriate type of portion for receiving the fasteners 217 and attaching the lid 214 to the housing 210.

The press nuts may be configured to be pressed into the receiver openings 209. When pressed into the receiver openings 209, the press nuts may apply pressure on walls of the receiver openings 209. Friction caused by the pressure applied by the press nuts on the walls of the receiver openings 209 may cause the press nuts to stay in the receiver openings 209.

Alternatively, in some embodiments, the receiver openings 209 may include a threaded portion, a snap on portion, a friction fit portion, or any other appropriate type of portion for receiving the fasteners 217 and attaching the lid 214 to the housing 210.

Each of the fasteners 217 may include a head portion (e.g., a head) that is sized so as to be larger than the openings 223. The fasteners 217 being attached (e.g., fastened) to the housing 210 may cause the head portions to contact an area substantially surrounding the openings 223 and cause the lid 214 to move towards the housing 210. For example, the fasteners 217 may include countersunk screws and the openings 223 may be defined to include a countersunk portion, the head portion of the fasteners 217 may contact the countersunk portion of the openings 223 and move the lid 214 toward the housing 210. As another example, the fasteners 217 may include flange bolts that include a flange portion, the flange portions may contact an upper surface of the lid 214 and move the lid 214 toward the housing 210. As the lid 214 is moved towards the housing 210, the gasket 221 may be compressed between a portion of the lid 214 and the portion of the upper surface of the sidewalls 218 that defines the gasket groove. Alternatively, in some embodiments, as the lid 214 is moved towards the housing 210, the gasket 221 may be compressed between the portion of the lid 214 that defines the gasket groove and a portion of the upper surface of the sidewalls 218. The lid 214, when attached to the housing 210, may apply pressure on the gasket 221 and force the gasket 221 toward the sidewalls 218 in the y-direction and the x-direction. Additionally or alternatively, the lid 214, when attached to the housing 210, may compress the gasket 221. In some embodiments, the gasket 221 may include an EPDM material or any other appropriate material.

The lid 214 compressing the gasket 221 may environmentally seal the internal volume defined by the lid 214, the bottom portion 350, and the sidewalls 218. The internal volume is discussed elsewhere in the present disclosure. The lid 214 compressing the gasket 221 may environmentally seal the internal volume defined by the lid 214, the bottom portion 350, and the sidewalls 218. The internal volume is discussed elsewhere in the present disclosure.

The lid 214 may be shaped substantially the same as the housing 210. Additionally, the lid 214 may be shaped such that at least a portion of an internal perimeter of the lid 214 may be in contact with a portion of exterior surfaces of the sidewalls 218.

Additionally, the lid 214 may include a raised portion 211 and a lower portion 227. When the lid 214 is attached to the housing 210, the raised portion 211 may be higher relative to the bottom portion 350 than the lower portion 227. In some embodiments, the raised portion 211 may increase the internal volume defined by the lid 214, the bottom portion 350, and the sidewalls 218 compared to junction boxes that include lids that do not include the raised portion 211. The raised portion 211 and the lower portion 227 are discussed in more detail below in relation to FIG. 3A.

In some embodiments, the housing 210 and the flashing 212 may be comprised of a single unibody piece of material. For example, the housing 210 and the flashing 212 may be formed using mold injection techniques as a single piece. In other embodiments, the housing 210 and the flashing 212 may comprise multiple pieces of material formed into a single device during manufacturing. For example, the housing 210 may comprise plastic and the flashing 212 may comprise metal (e.g., aluminum) that are formed together as a single device during manufacturing. As another example, the housing 210 may comprise metal and the flashing 212 may comprise plastic that are formed together as a single device during manufacturing. In some embodiments, the housing 210 and the flashing 212 may comprise multiple pieces of material that are attached to each other using sealant or any other appropriate device. Additionally, in some embodiments, the lid 214 may comprise plastic. Alternatively, in some embodiments, the lid 214 may comprise metal.

In some embodiments, the housing 210, the flashing 212, and the lid 214 may include a non-conductive material. In some embodiments, the housing 210, the flashing 212, and the lid 214 may include a plastic material, a polycarbonate material, a PVC material, an acrylonitrile butadiene styrene (ABS) material, acrylonitrile styrene and polycarbonate blend (ASA+PC) material, a polycarbonate and ABS blend (PC+ABS) material, or any other appropriate non-conductive material. In these and other embodiments, the housing 210, the flashing 212, and the lid 214 material may be infused with a non-conductive ultraviolet (UV) resistant material. For example, the housing 210, the flashing 212, and the lid 214 may be infused with a low molecular weight hydroxyphenyl-benzotriazole material, a high molecular weight hydroxyphenyl-benzotriazole material, or any other appropriate non-conductive UV resistant material. The housing 210, the flashing 212, and the lid 214 not comprising conductive material may limit a number of connections to the junction box 106 since the junction box 106 will not need to be grounded. Alternatively, in some embodiments, one or more of the housing 210, the flashing 212, and the lid 214 may include a metallic material.

The flashing 212 may include a width 297 (e.g., illustrated in FIG. 2A) defined between the second edge 224b and the fourth edge 224d and a length 295 (e.g., illustrated in FIG. 2A) defined between the first edge 224a and the third edge 224c. In some embodiments, the width 297 may be between about six inches and about fourteen inches. In these and other embodiments, the length 295 may be between about six inches and about eighteen inches. The flashing 212 may include a thickness defined in the z-direction between 0.06 inches and an inch. Additionally, the edges 224 may form corners of the flashing 212. In some embodiments, the corners may be formed to include a substantially ninety-degree angle. In other embodiments, the corners may be formed to include a radius. The radius may be between about one-half inches and about three inches.

The sidewalls 218 may include a thickness between about 0.06 inches and about one inch. The bottom portion 350 may include a thickness defined in the z-direction between about 0.06 inches and about one inch. The sidewalls 218 may extend a height above the second surface 222. In some embodiments, the height of the sidewalls 218 may be equal to or greater than about two and a half inches. In other embodiments, the height of the sidewalls 218 may be equal to or less than about fourteen inches.

Although, the sidewalls 218 as illustrated form a pentagonal or substantially pentagonal shape, the sidewalls 218 may form any appropriate shape for shedding fluid and attaching one or more connectors to the sidewalls 218.

Additionally, in some embodiments, the fourth joint 226d and the fifth joint 226e may be formed so as to form an angle equal to greater than ninety degrees (e.g., the fifth sidewall 218e may be positioned at an angle equal to greater than ninety degrees relative to the fourth sidewall 218d and the third sidewall 218c may be positioned at an angle equal to greater than ninety degrees relative to the fourth sidewall 218d).

In some embodiments the third sidewall 218c, the fourth sidewall 218d, and the fifth sidewall 218e may define one or more dimples (not illustrated). In these and other embodiments, the third sidewall 218c, the fourth sidewall 218d, and the fifth sidewall 218e may define a center dimple that may be aligned with a center portion of the sidewalls 218. The center portion may be equidistant from the joints 226 partially formed by the sidewalls 218. In some embodiments, the third sidewall 218c, the fourth sidewall 218d, and the fifth sidewall 218e may define one or more weep holes (not illustrated). The weep holes may be configured to permit fluid that is positioned within the internal volume defined by the lid 214, the sidewalls 218, and the bottom portion 350 to exit the internal volume via the weep hole(s).

In some embodiments, the third sidewall 218c, the fourth sidewall 218d, and the fifth sidewall 218e may define multiple equidistant dimples. Equidistant dimples may be equally distanced from each other and/or from the joints 226 at least partially formed by the sidewalls 218. In some embodiments, the third sidewall 218c, the fourth sidewall 218d, and the fifth sidewall 218e may define the dimples to be equidistant from each other and may also define one of the dimples as a center dimple. The dimples may indicate suitable positions for creating a hole in the sidewalls 218 (e.g., suitable hole positions in the sidewalls 218).

Additionally, in some embodiments, the junction box 106 may include a retention system (not illustrated). The retention system may selectively attach the lid 214 to the flashing 212. The retention system may be employed to prevent the lid 214 from falling or becoming separated from the housing 210 and/or the flashing 212. In some embodiments, the flashing 212 may be omitted. In these and other embodiments, the retention system may selectively attach the lid 214 to a sidewall 218. The retention device may include a chord, a strap, a rope, a band, a bungee cord, a hinge or any other appropriate device for selectively attaching the lid 214 to the flashing 212.

Figure 3A:
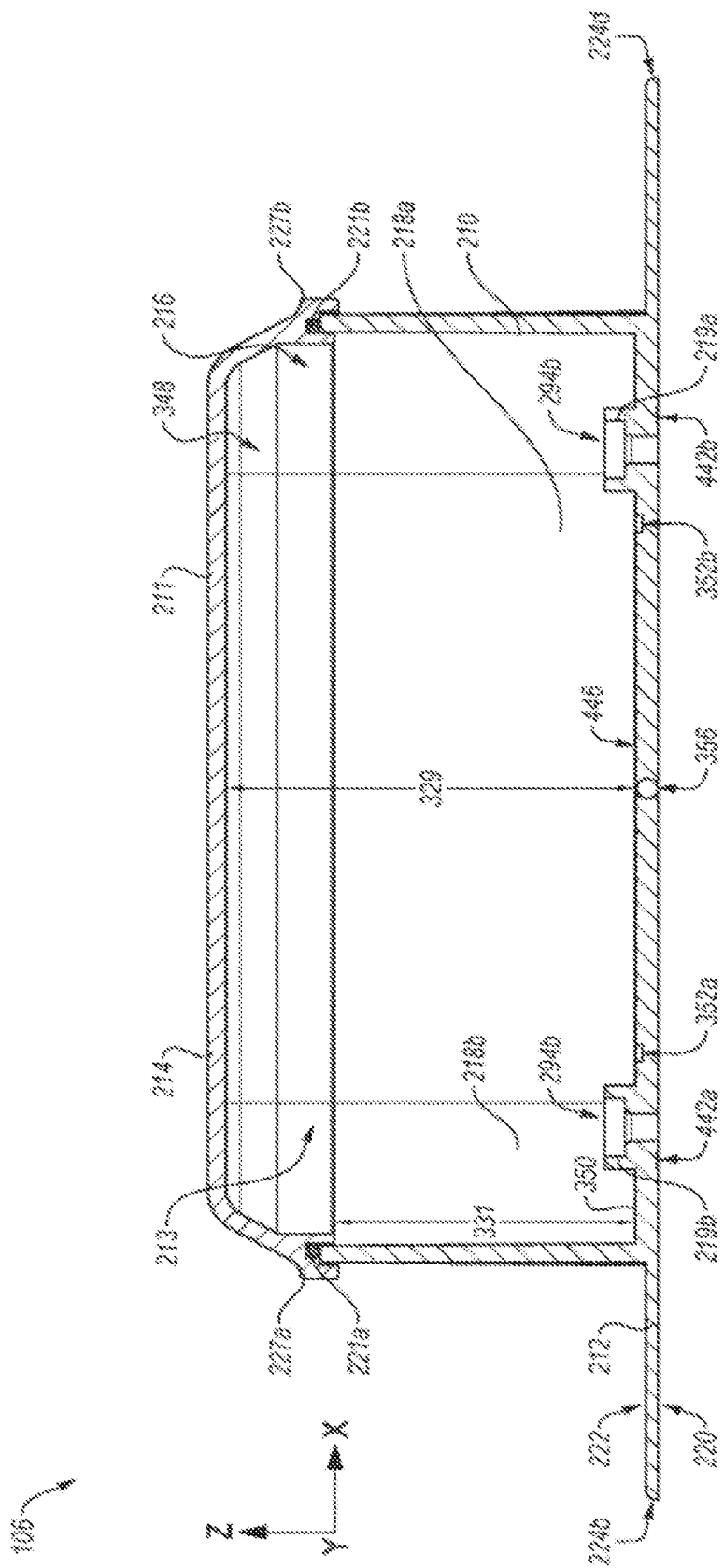
FIG. 3A illustrates a sectional view of the junction box of FIGS. 2A-2C.
Figure 3B:
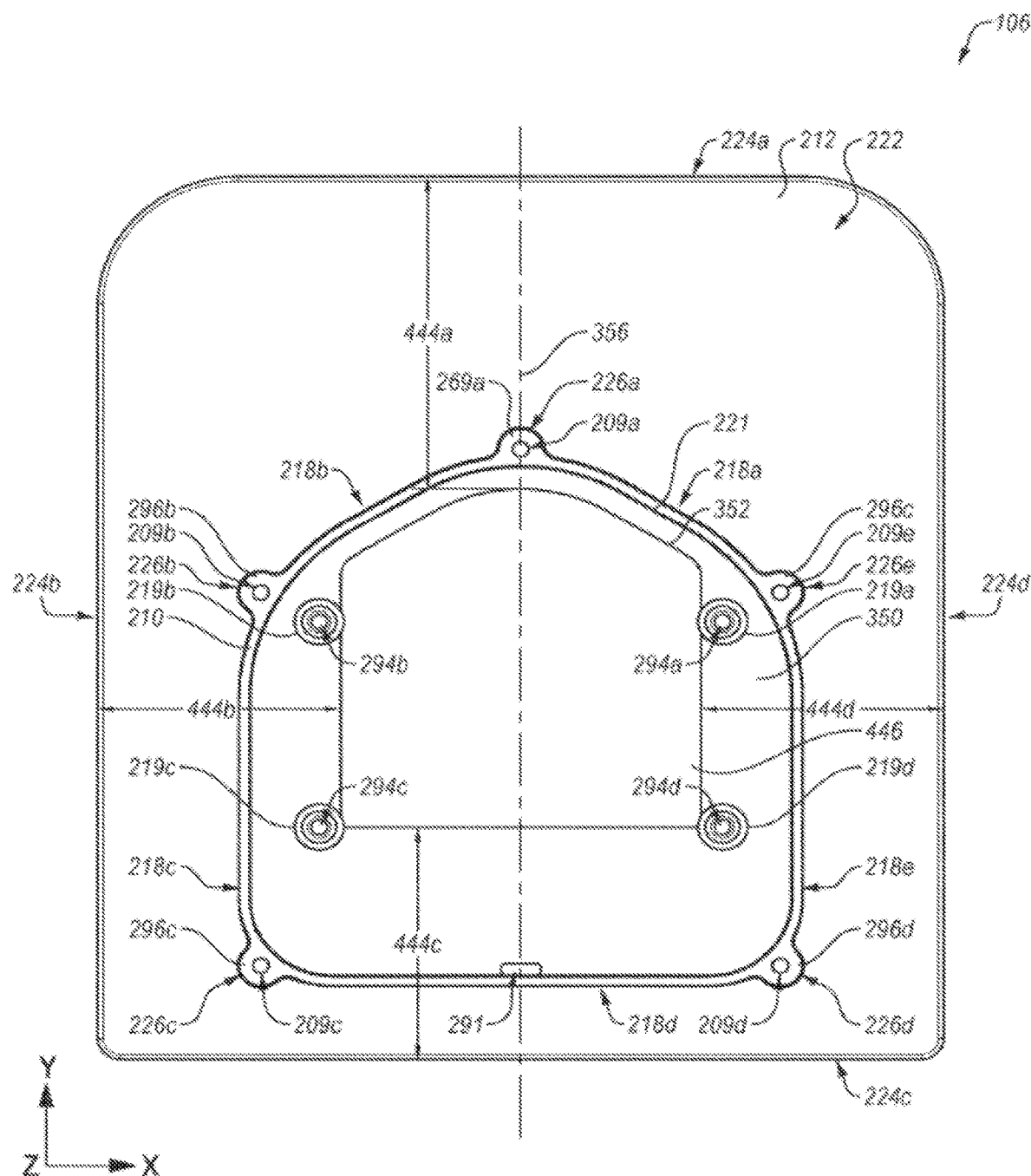
FIG. 3B illustrates a top view of the junction box of FIGS. 2A-2C.
Figure 4A:
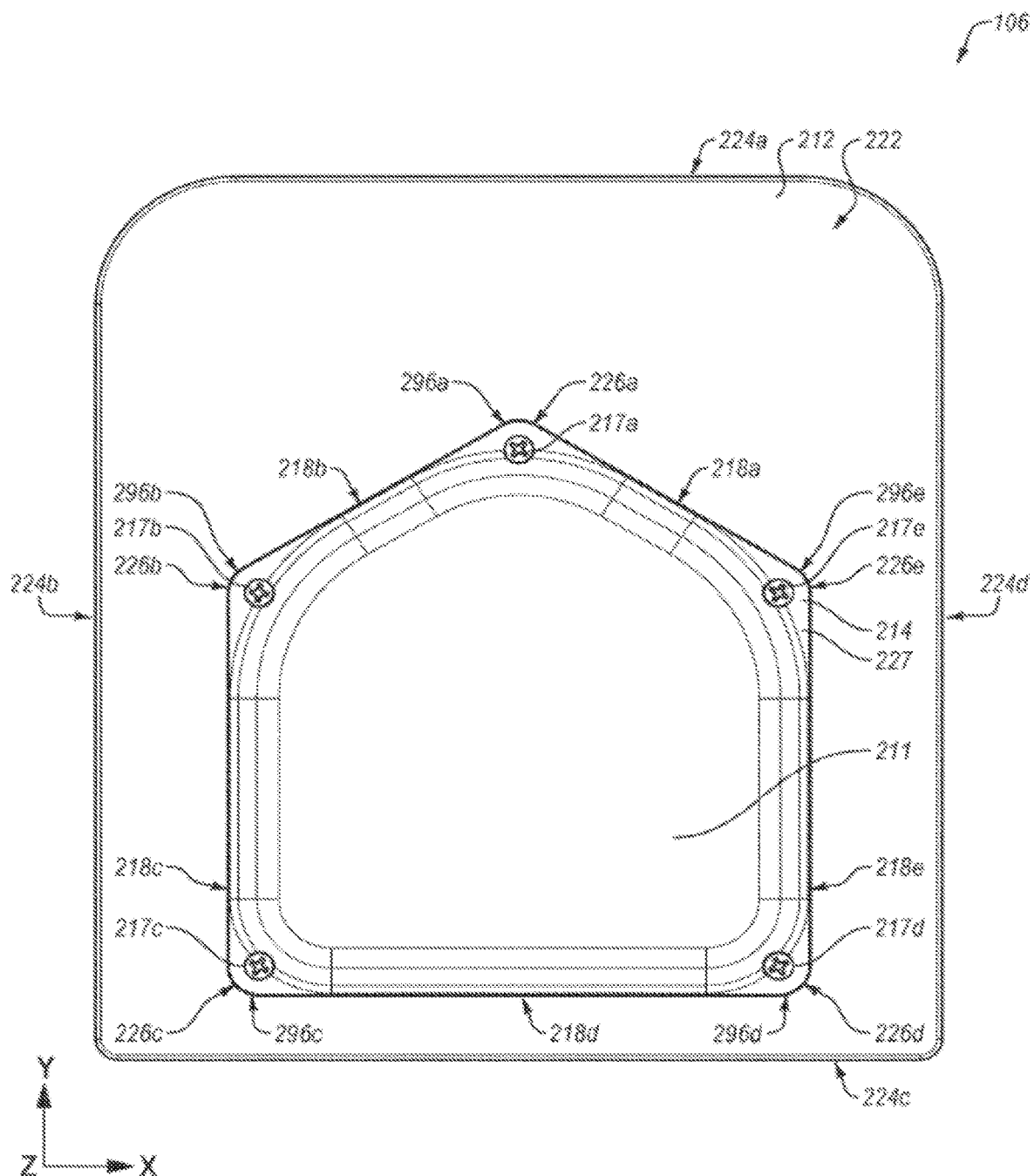
FIG. 4A illustrates a top view of the junction box of FIGS. 2A-2C.
Figure 4B:
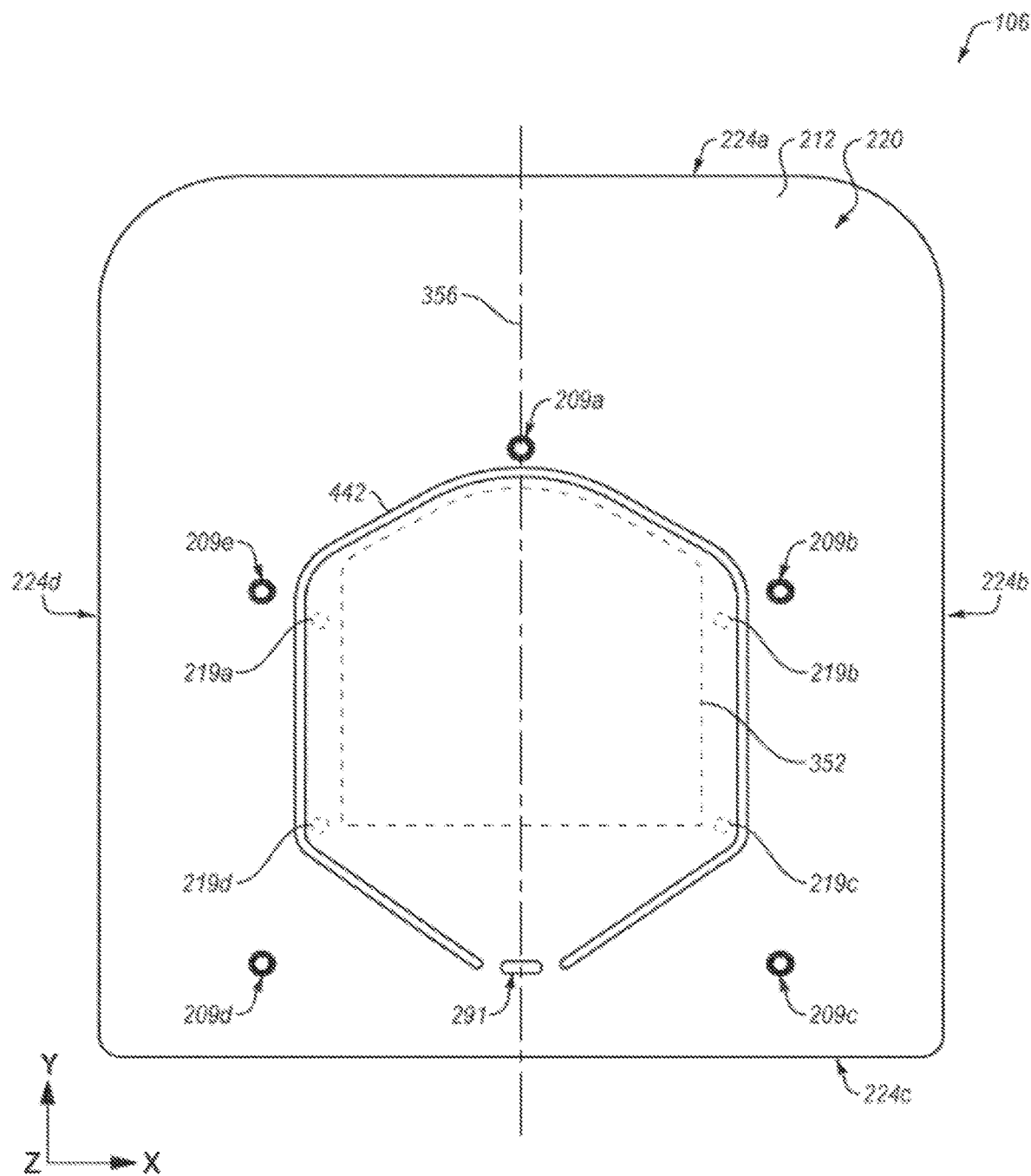
FIG. 4B illustrates a bottom view of the junction box of FIGS. 2A-2C.

FIG. 3A illustrates a sectional view of the junction box 106 of FIGS. 2A-2C. FIG. 3B illustrates a top view of the junction box 106 of FIGS. 2A-2C. FIG. 3A is a rear-sectional view across the housing 210 in a first direction. FIGS. 4A and 4B illustrate a top view and a bottom view, respectively of the junction box 106 of FIGS. 2A-2C with the lid 214 attached to the housing 210.

With combined reference to FIGS. 3A-4B, the opening 216 may provide access to an internal volume 348 of the housing 210 (e.g., illustrated in FIG. 3A). The internal volume 348 may be defined by the bottom portion 350, the sidewalls 218, and the lid 214 when the lid 214 is attached to the housing 210.

The first surface 220 of the flashing 212 may be on a substantially parallel plane to the second surface 222 of the flashing 212. In the depicted embodiment, the first groove 442 and the second groove 352 may be coincident around an axis 356. In some embodiments, the axis 356 may be positioned at a center axis of the housing 210 and the flashing 212 in the y-direction. In other embodiments, the axis 356 may be positioned at another point of the housing 210 and the center axis of the flashing 212 in the y-direction. In these and other embodiments, the axis 356 may be positioned at another point of the flashing 212 and the center axis of the housing 210 in the y-direction. In some embodiments, the first groove 442 and the second groove 352 may not be coincident around the axis 356.

In some embodiments, the first groove 442 may be disposed relative to a first center axis (not illustrated) on a first plane (e.g., a plane of the first surface 220 of the flashing 212). In these and other embodiments, the second groove 352 may be disposed relative to a second center axis (not illustrated) on a second plane (e.g., a plane of the bottom portion 350 of the housing 210) that is substantially parallel to the first plane. Additionally or alternatively, the second center axis may be coincident with the first center axis. The second center axis may be coincident with the first center axis on the second plane in a direction that is substantially parallel to the first plane. In some embodiments, the first center axis and the second center axis may correspond to the axis 356 illustrated in FIG. 3A.

The raised portion 211, when the lid 214 is attached to the housing 210, may be a first distance 329 away from the bottom portion 350 (e.g., illustrated in FIG. 3B). The lower portion 227a-b, when the lid 214 is attached to the housing 210, may be a second distance 331 away from the bottom portion 350 (e.g., illustrated in FIG. 3B). The first distance 329 may be equal to or greater than the second distance 331. In some embodiments, the first distance 329 may be equal to or greater than substantially two inches. In these and other embodiments, the second distance 331 may be equal to or greater than substantially one inch. The raised portion 211, when the first distance 329 is greater than the second distance 331, may increase the internal volume 348 defined by the bottom portion 350, the sidewalls 218, and the lid 214 when the lid 214 is attached to the housing 210.

The perimeter of the second groove 352 may be a first distance 444a away from the first edge 224a (e.g., illustrated in FIG. 3B), a second distance 444b away from the second edge 224b (e.g., illustrated in FIG. 3B), a third distance 444c away from the third edge 224c (e.g., illustrated in FIG. 3B), and a fourth distance 444d away from the fourth edge 224d (e.g., illustrated in FIG. 3B). The first distance 444a, the second distance 444b, the third distance 444c, and the fourth distance 444d are collectively referred to as distances 444.

In some embodiments, each of the distances 444 may be equal to or greater than the particular distance. The particular distance may be selected to ensure that the fasteners and holes are implemented in an interior portion of the junction box 106. Additionally, in some embodiments, at least some of the distances 444 may be equal to one another. For example, the second distance 444b, the third distance 444c, and the fourth distance 444d may be equal to each other and the first distance 444a may be different. In other embodiments, the distances 444 may all be different from one another. In some embodiments, the particular distance may be equal to or greater than about one inch. For example, the particular distance may be equal to about one and a half inches. As another example, the particular distance may be equal to about two inches.

In some embodiments, a distance from a center axis of the second groove 352 in the y direction to a center axis of the first groove 442 in the y direction may be equal to or greater than substantially one quarter inch.

In some embodiments, the first portion 446 of the bottom portion 350 may include an EPDM rubber material. In other embodiments, the first portion 446 of the bottom portion 350 may include a thickness that is less than the thickness of the bottom portion 350 between the perimeter of the second groove 352 and the sidewalls 218. The first portion 446 of the bottom portion 350 may permit an EMT pipe or any other appropriate connector type to push through the first portion 446 of the bottom portion 350 so as to create an appropriately sized and positioned hole in the first portion 446 of the bottom portion 350. In some embodiments, the first portion 446 may not be included (e.g., the first portion 446 may be pre-cut) so that no material is cut during installation of the junction box 106 on a structure.

In some embodiments, the bosses 219 may be disposed within an internal perimeter of the first groove 442 and outside an external perimeter of the second groove 352 (e.g., illustrated in FIG. 4B). In these and other embodiments a distance between the internal perimeter of the first groove 442 and the external perimeter of the second groove 352 may be equal to or greater than one quarter inch.

In some embodiments, the second groove 352 may include indicia (not illustrated) indicating suitable placement of fasteners used for attaching the junction box 106 to a structure (e.g., 108 of FIG. 1). The indicia may indicate suitable fastener locations in the bottom portion 350. The indicia may indicate suitable zones for placement of the fasteners to balance a load associated with attachment of the junction box 106 to the structure.

Figure 5A:
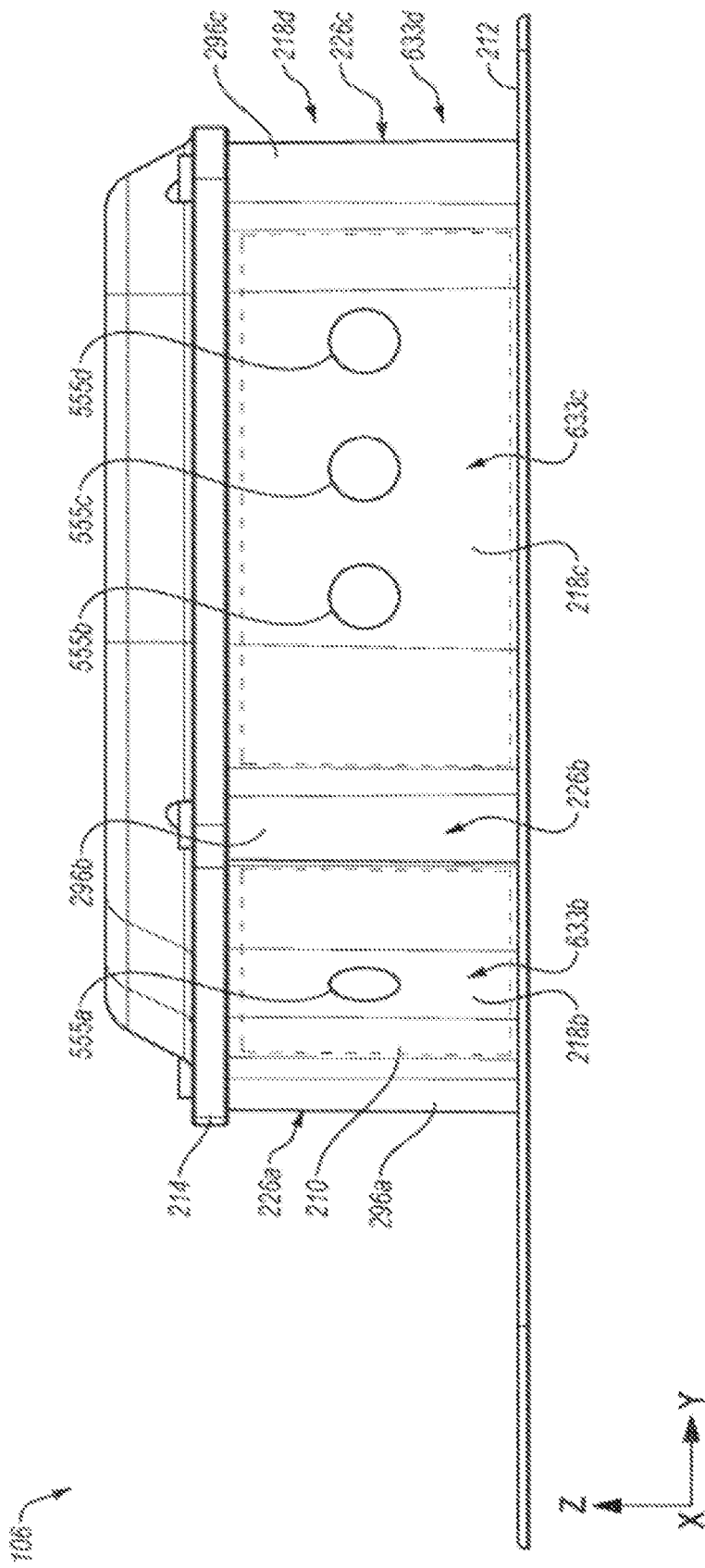
FIG. 5A illustrates a first side view of the junction box of FIGS. 2A-2C.
Figure 5B:
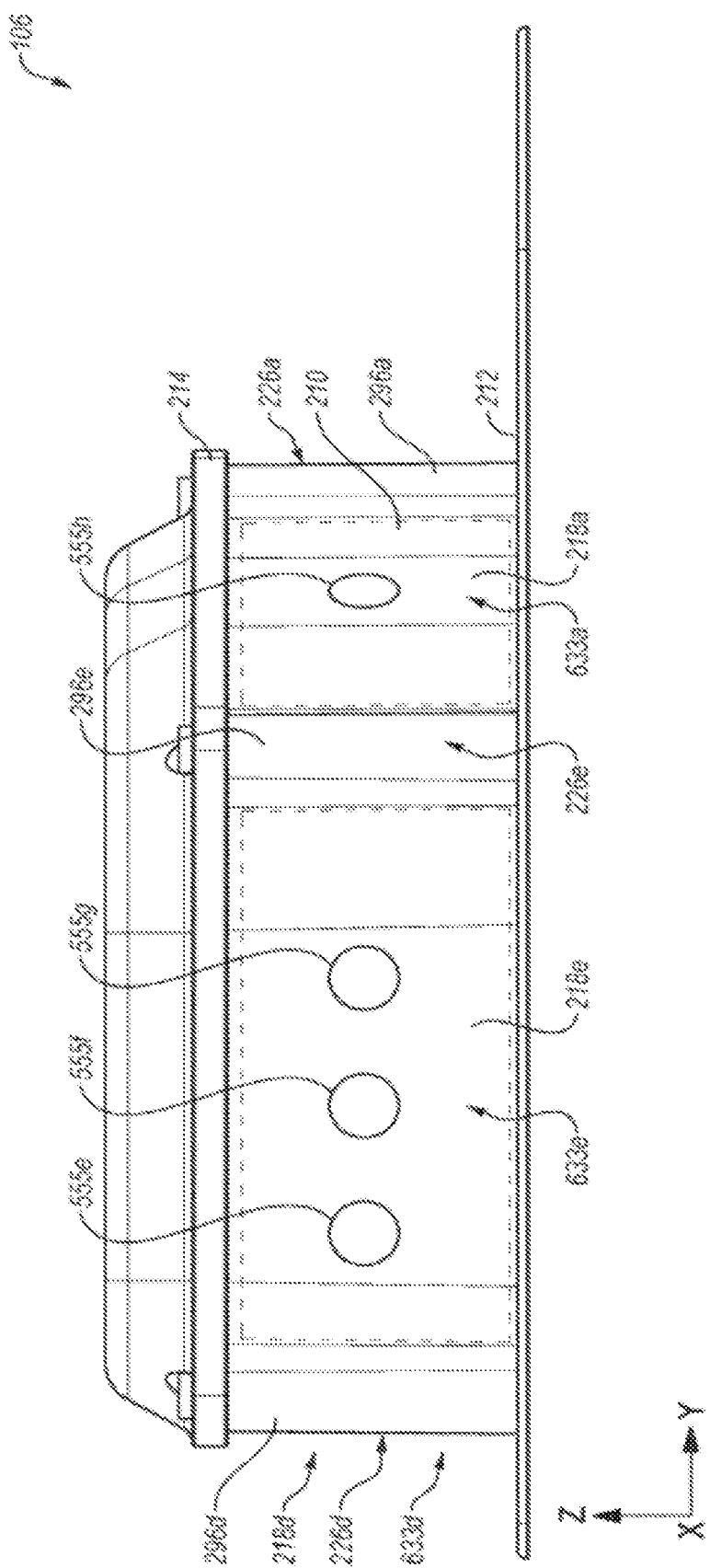
FIG. 5B illustrates a second side view of the junction box of FIGS. 2A-2C.

FIGS. 5A and 5B illustrate side views of the junction box 106 of FIGS. 2A-2C. With combined reference to FIGS. 5A and 5B, in some embodiments, when the lid 214 is attached to the housing 210, the lid 214, the flashing 212, and the joints 226 may define a first area 633a (e.g., illustrated in FIG. 5B), a second area 633b (e.g., illustrated in FIG. 5A), a third area 633c (e.g., illustrated in FIG. 5A), a fourth area 633d (not illustrated), and a fifth area 633e (e.g., illustrated in FIG. 5B). For example, the lid 214, the flashing 212, the first nodule 296a, and the second nodule 296b may define the second area 633b; the lid 214, the flashing 212, the second nodule 296b, and the third nodule 296c may define the third area 633c; the lid 214, the flashing 212, the first nodule 296a, and the fifth nodule 296e may define the first area 633a; the lid 214, the flashing 212, the third nodule 296c, and the fourth nodule 296d may define the fourth area 633d, and the lid 214, the flashing 212, the fourth nodule 296d, and the fifth nodule 296e may define the fifth area 633e. The first area 633a, the second area 633b, the third area 633c, the fourth area 633d, and the fifth area 633e may be generally referred to as areas 633 or area 633 in the present disclosure.

The areas 633 may indicate suitable positions for creating holes in the sidewalls 218 (e.g., suitable hole positions in the sidewalls 218). For example, the first area 633a may indicate suitable positions for creating a hole in the first sidewall 218a, the second area 633b may indicate suitable positions for creating a hole in the second sidewall 218b, the third area 633c may indicate suitable positions for creating a hole in the third sidewall 218c; the fourth area 633d may indicate suitable positions for creating a hole in the fourth sidewall 218d; and the fifth area 633e may indicate suitable positioned for creating a hole in the fifth sidewall 218c.

In some embodiments, the sidewalls 218 may include a first knockout 555a, a second knockout 555b, a third knockout 555c, a fourth knockout 555d, a fifth knockout 555e, a sixth knockout 555f, a seventh knockout 555g, and an eighth knockout 555h (referenced collectively in the present disclosure as "knockouts 555"). The knockouts 555 may indicate suitable hole positions for creating holes in the sidewalls 218.

In some embodiments, instead of the knockouts 555, the sidewalls 218 may define center lines along the exterior surface of the sidewalls 218. The center lines may be substantially parallel to the second surface 222. The center lines may indicate suitable positions for creating a hole in the sidewalls 218.

Figure 6A:
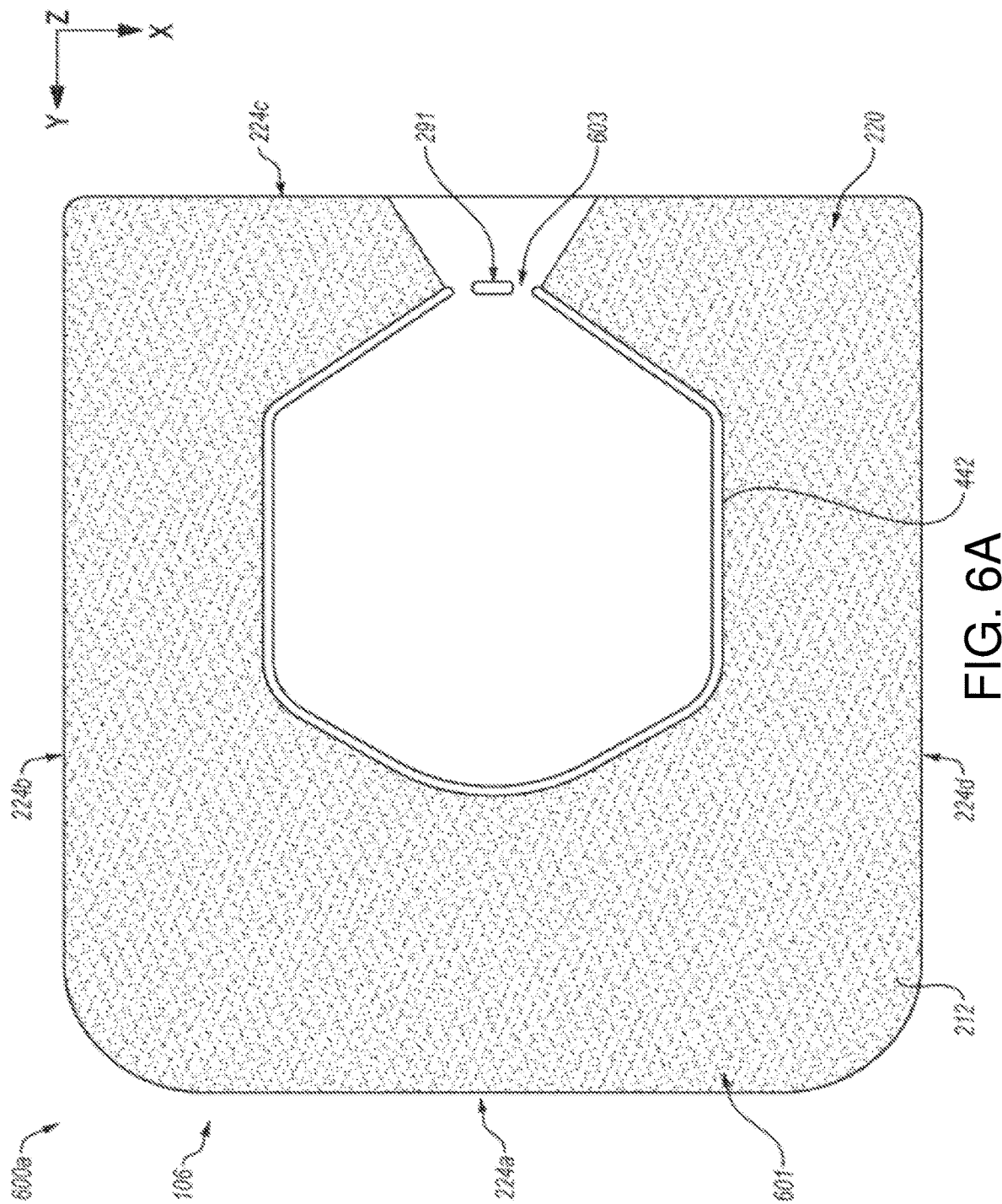
FIG. 6A illustrates a bottom view of the junction box 106 of FIGS. 2A-2C, with a first adhesive material attached to at least a portion of the first surface of the flashing.
Figure 6B:
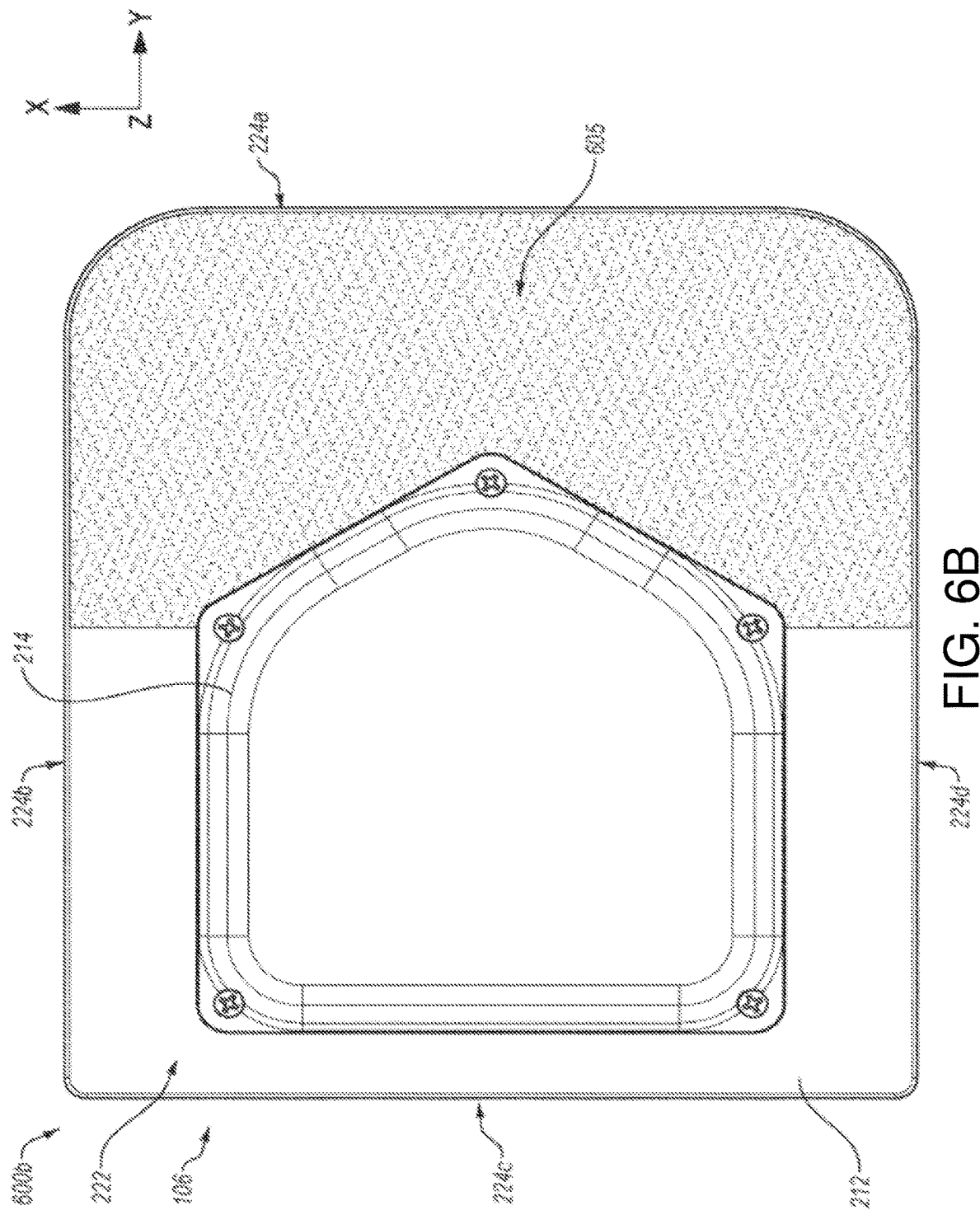
FIG. 6B illustrates a top view of the junction box of FIGS. 2A-2C with a second adhesive material attached to at least a portion of the second surface of the flashing.

FIGS. 6A and 6B illustrate a bottom view 600a and a top view 600b, respectively, of the junction box 106 of FIGS. 2A-2C. With combined reference to FIGS. 6A and 6B, in some embodiments, the junction box 106 may include a first adhesive material 601 (illustrated in FIG. 6A) and a second adhesive material 605 (illustrated in FIG. 6B). The first adhesive material 601 may be configured to adhere (e.g., mount) the junction box 106 to the exterior surface of the structure. Additionally, the second adhesive material 605 may be configured to adhere (e.g., attach) one or more shingles to the junction box 106.

In some embodiments, the first adhesive material 601 and the second adhesive material 605 may include a peel and stick material. In some embodiments, a cover (not illustrated) may be attached to a surface of the first adhesive material 601 opposite the first surface 220 of the flashing 212 (e.g., a first adhesive surface). In these and other embodiments, another cover (not illustrated) may be attached to a surface of the second adhesive material 605 opposite the second surface 222 of the flashing 212 (e.g., a second adhesive surface). The covers may be configured to be peeled away from the first adhesive material 601 and/or the second adhesive material 605 to expose the first adhesive surface and/or the second adhesive surface. The adhesive surfaces (e.g., the first adhesive surface and the second adhesive surface) may be used to mount the junction box 106 to the exterior surface of the structure and/or to attach the shingles to the junction box 106.

The first adhesive material 601 may be attached to at least a portion of the first surface 220 of the flashing 212. In some embodiments, the first adhesive material 601 may be positioned on the first surface 220 of the flashing 212 between a perimeter of the first groove 442 and the edges 224 of the flashing 212. In other embodiments, the first adhesive material 601 may be positioned on the first groove 442 only. In these and other embodiments, the first adhesive material 601 may indicate suitable placement of sealant on the first surface 220 of the flashing 212.

In some embodiments, the first adhesive material 601 may define an adhesive opening 603 that is adjacent to the third edge 224c of the flashing 212. The adhesive opening 603, when the junction box 106 is mounted to the structure, may be defined so as to permit fluid or moisture that builds up between the junction box 106 and the structure to exit via the adhesive opening 603. For example, fluid that is positioned in a volume defined by the first adhesive material 601, the first surface 220 of the flashing 212, and the structure may exit this volume via the adhesive opening 603. In addition, the adhesive opening 603 may be defined to permit fluid that exits the internal volume 348 of the housing 210 via the weep hole 291 to also exit the volume defined by the first adhesive material 601, the first surface 220 of the flashing 212, and the structure. In some embodiments in which the weep hole 291 is omitted, the first adhesive material 601 may be attached to the first surface 220 of the flashing 212 such that the adhesive opening 603 is omitted.

In some embodiments, the second adhesive material 605 may be attached to at least a portion of the second surface 222 of the flashing 212. In these and other embodiments, the second adhesive material 605 may be positioned anywhere on the second surface 222 of the flashing 212. For example, the second adhesive material 605 may be positioned on the second surface 222 of the flashing 212 between the first joint 226a (e.g., the first nodule 296a) and the first edge 224a of the flashing 212. As another example, the second adhesive material 605 may be positioned on the second surface 222 of the flashing 212 between the first edge 224a of the flashing 212, the second edge 224b of the flashing 212, and the fourth edge 224d of the flashing 212 and the first nodule 296a, the second nodule 296b, and the fifth nodule 296c.

Figure 7:
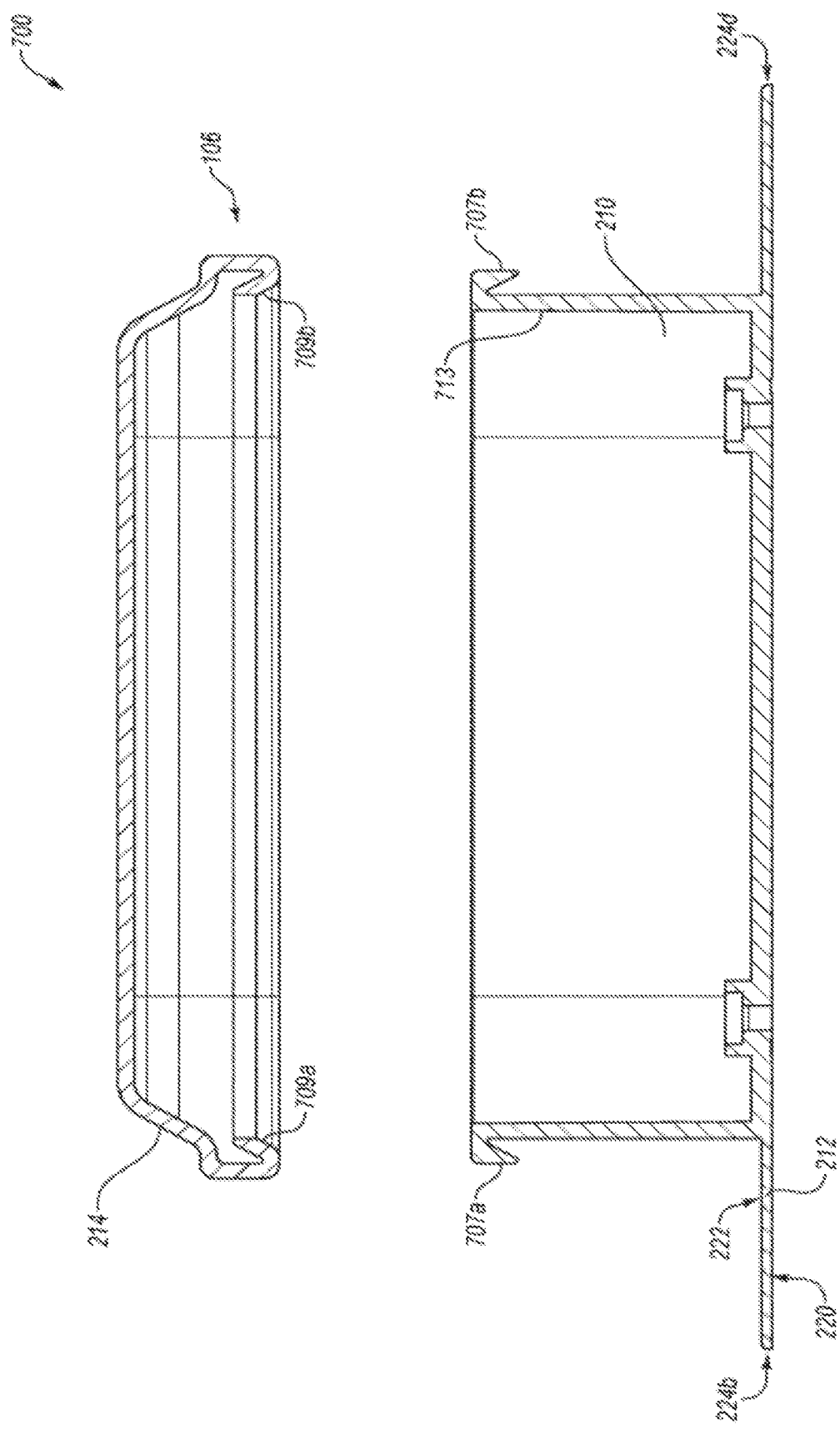
FIG. 7 illustrates a rear sectional view of an alternative sidewall and lid configuration that may be implemented in the junction box of FIG. 1.

FIG. 7 illustrates a rear sectional view 700 of an alternative sidewall and lid configuration that may be implemented in the junction box 106 of FIG. 1. The lid 214 may include a lid lip 709 and the housing 210 may include a housing lip 707. The lid lip 709 and the housing lip 707 may be configured to interface to cause the lid 214 to selectively attach to the housing 210 via the interface between the lid lip 709 and the housing lip 707. For example, the lid lip 709 and the housing lip 707 may be configured to permit the lid 214 to slide (e.g., a slide fit) onto the housing 210 to selectively attach the lid 214 to the housing 210. As another example, the lid lip 709 and the housing lip 707 may be configured to permit the lid 214 to press (e.g., a press fit) onto the housing 210 to selectively attach the lid 214 to the housing 210. As yet another example, the lid lip 709 and the housing lip 707 may be configured to permit the lid 214 to snap (e.g., a snap fit) onto the housing 210 to selectively attach the lid 214 to the housing 210.

Figure 8:
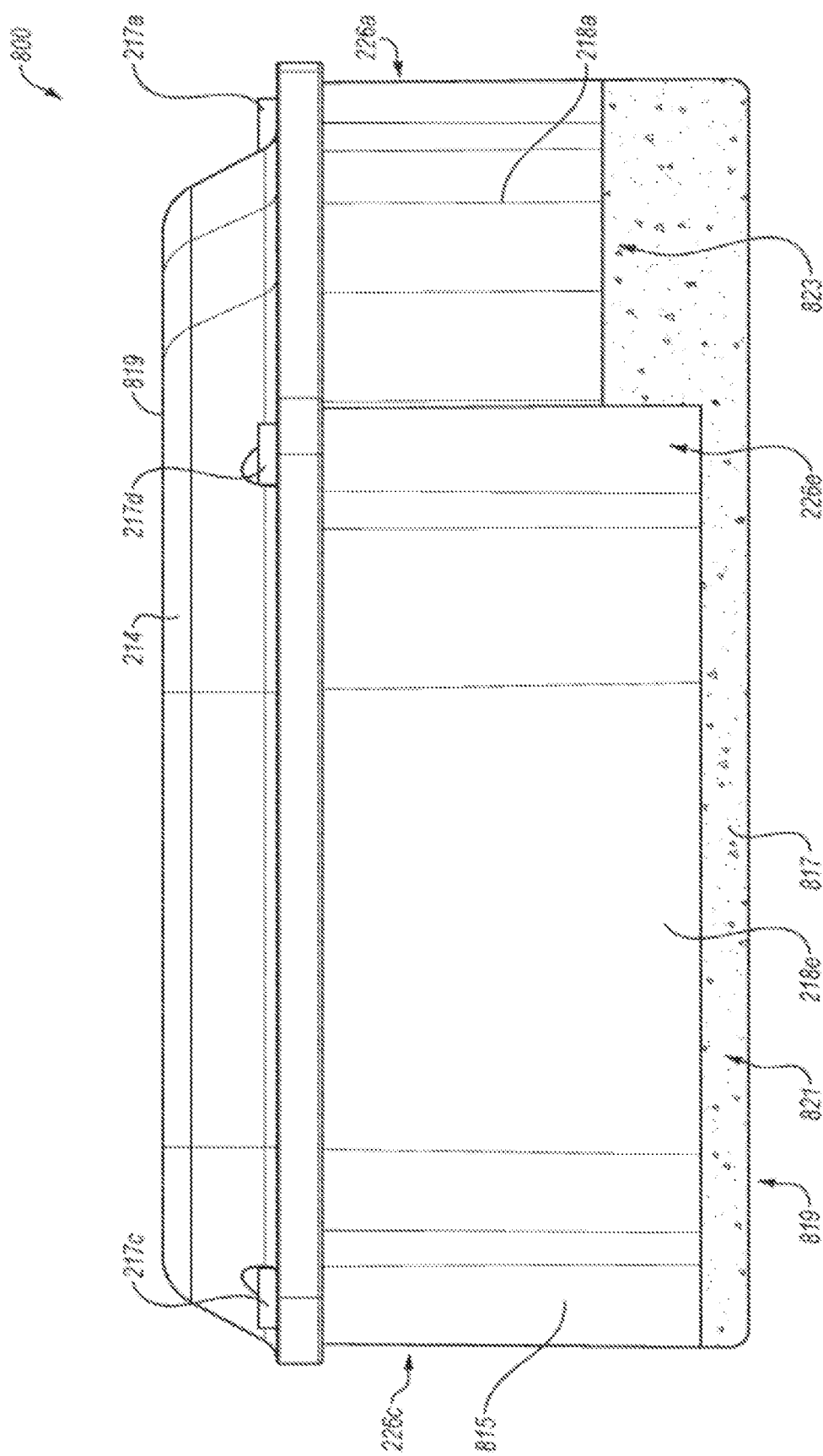
FIG. 8 illustrates a side view of an alternative junction box configuration that may be implemented in the environment of FIG. 1.

FIG. 8 illustrates a side view of an alternative junction box 800 configuration that may be implemented in the operating environment 100 of FIG. 1. The alternative junction box 800 may be substantially similar to the junction box 106 described elsewhere in the present disclosure. The alternative junction box 800 may include an alternative housing 815. The alternative housing 815 may include an external portion 819 and the bottom portion 350 (not illustrated in FIG. 8). The external portion 819 may define the first groove 442 (not illustrated in FIG. 8). The bottom portion 350 may define the second groove 352 on a lower surface 821 of the external portion 819. The second groove 352 may indicate suitable positions for creating a hole in the bottom portion 350 (e.g., suitable hole positions in the bottom portion 350).

In some embodiments, the first groove 442 may be disposed relative to the first center axis (not illustrated) on a first plane (e.g., the lower surface 821 of the external portion 819). In these and other embodiments, the second groove 352 may be disposed relative to the second center axis (not illustrated) on a second plane (e.g., a plane of the bottom portion 350 of the alternative housing 815 corresponding to the lower surface 821) that is substantially parallel to the first plane. Additionally or alternatively, the second center axis may be coincident with the first center axis. The second center axis may be coincident with the first center axis on the second plane in a direction that is substantially parallel to the first plane.

The external portion 819 may define a notch 823. The notch 823 may be defined to mate with an uneven exterior surface of the structure. For example, the notch 823 may be defined to mate with a shingle on the exterior surface of the structure. The lid 214 may selectively attach to the alternative housing 815 via the fasteners 217. The lid 214, when attached to the alternative housing 815, may seal an internal volume defined by the alternative housing 815 and the lid 214. In some embodiments, the alternative junction box may include a second piece 817. The second piece 817 may attach to the external portion 819. The second piece 817, when attached to the external portion 819, may permit the alternative junction box 800 to be attached substantially flush with a substantially flat profile of the exterior surface of the structure.

Figure 9:
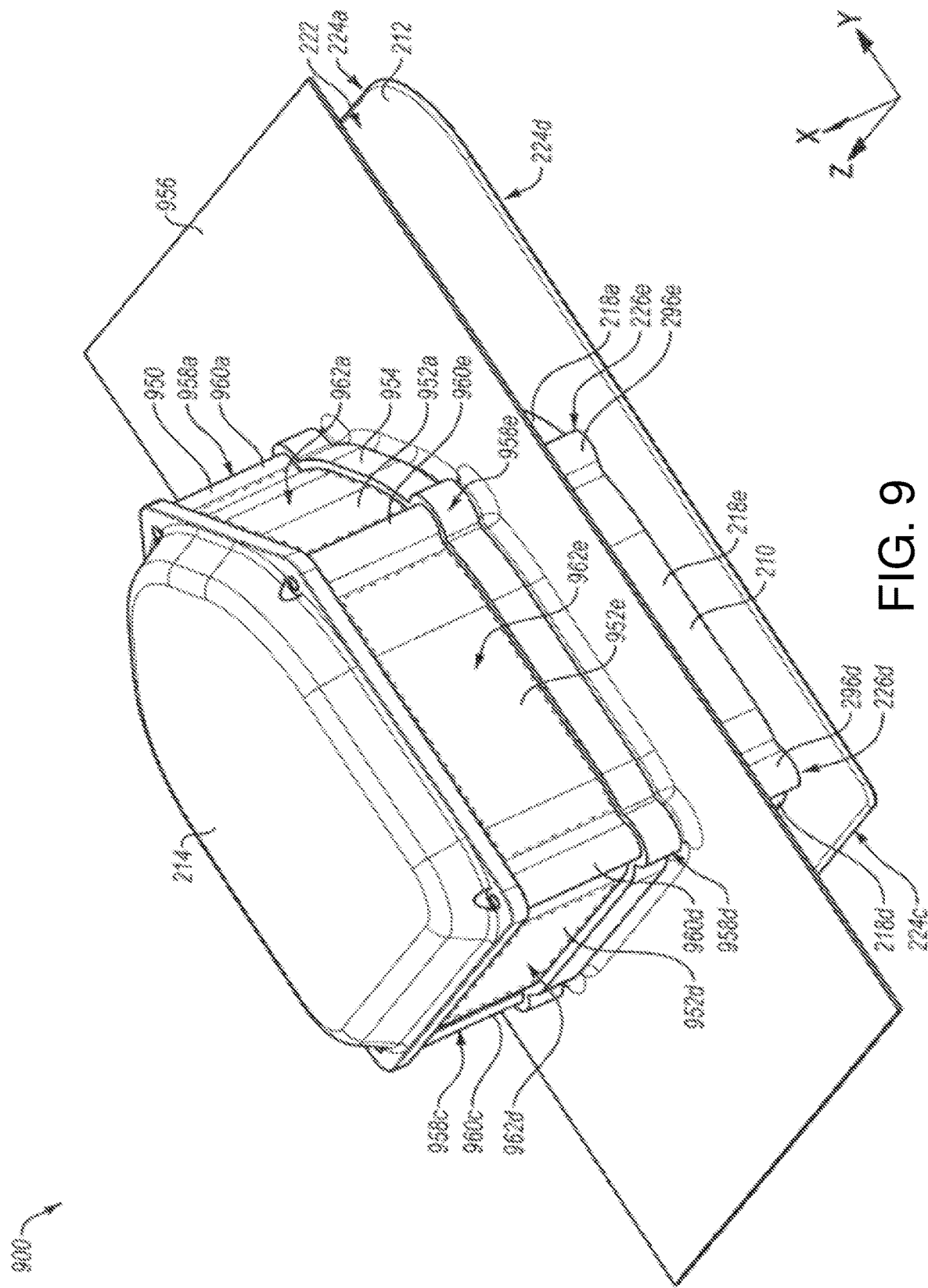
FIG. 9 illustrates a perspective view of an alternative junction box that includes an extension housing that may be implemented in the environment of FIG. 1.

FIG. 9 illustrates a perspective view of a junction box 900 that includes the housing 210, the flashing 212, and an extension housing 950 that may be implemented in the environment of FIG. 1. The junction box 900 may be configured to environmentally seal a volume in a similar manner as the junction box 106 discussed elsewhere in the present disclosure.

The junction box 900 may be configured to be used with tile shingles that extend above the exterior surface of the structure. For example, the junction box 900 may include a second flashing 956 (e.g., a tile flashing) that is pliable. The second flashing 956 may be configured to contact a portion of the exterior surface of the tile shingles. The second flashing 956 may be pliable so as to conform to a shape of the exterior surface of the tile shingles. The second flashing 956 may include an aluminum material, a rubber material, a rubber material with an aluminum mesh, a plastic material, a lead material, a metal material, or any other appropriate pliable material. In some embodiments, the second flashing 956 may include a second portion (not illustrated) attached to one or more edges of the second flashing 956. In these and other embodiments, the second portion may be configured to be shaped and maintain the shape of the exterior surface of the tile shingles. In addition, the extension housing 950 may be configured to increase a height in the y-direction of junction box 900 so as to extend above the tile shingles relative to the exterior surface of the structure. In some embodiments, the height of the sidewalls 218 in the junction box 900 may be between 0.25 inches and three inches.

In some embodiments, the second flashing 956 may include an adhesive material (e.g., a peel and stick material) configured to attach the second flashing to the tile shingles.

The extension housing 950 may be shaped substantially the same as the housing 210. The housing 210 and the extension housing 950 may provide a durable and environmentally sealed device for routing cables, wires, and/or other devices from the external device mounted on the exterior surface of the structure to the internal space of the structure. In some embodiments, the extension housing 950 may be shaped such that at least a portion of an internal perimeter of the extension housing 950 (e.g., a drip edge 954) may be in contact with a portion of exterior surfaces of the sidewalls 218. In other embodiments, a portion of the second flashing 956 may be positioned between the drip edge 954 and the housing 210 when the extension housing 950 is attached to the housing 210. In these and other embodiments, the drip edge 954 may overlap a portion of the second flashing 956 in the z-direction to prevent fluid from traversing along a surface of the second flashing and entering the extended volume. Example configurations for attaching the second flashing 956, the extension housing 950, and the housing 210 are discussed in more detail below in relation to FIGS. 11A-11C.

The drip edge 954 may be configured to overhang where the housing 210 and the extension housing 950 attach and/or where the second flashing 956 attaches to the housing 210 and the extension housing 950. The drip edge 954 may prevent fluid from entering an extended internal volume defined by housing 210 and the extension housing 950.

The extension housing 950 may include a first extension sidewall 952a, a second extension sidewall 952b, a third extension sidewall 952c, a fourth extension sidewall 952d, and a fifth extension sidewall 952e (referenced collectively in the present disclosure as "extension sidewalls 952"). The extension sidewalls 952 may operate the same as or similar to the sidewalls 218 discussed above but with reference to the extension housing 950 instead of the housing 210.

The first extension sidewall 952a and the second extension sidewall 952b may form a first extension joint 958a. The first extension joint 958a may be positioned such that the first extension joint 958a is oriented towards the first edge 224a when the extension housing 950 is attached to the housing 210. The second extension sidewall 952b and the third extension sidewall 952c may form a second extension joint 958b. The third extension sidewall 952c and the fourth extension sidewall 952d may form a third extension joint 958c. The fourth extension sidewall 952d and the fifth extension sidewall 952c sidewall may form a fourth extension joint 958d. The fifth extension sidewall 952c and the first extension sidewall 952a form a fifth extension joint 958e. The first extension joint 958a, the second extension joint 958b, the third extension joint 958c, the fourth extension joint 958d, and the fifth extension joint 958e may be generally referred to as extension joints 958 or extension joint 958 in the present disclosure. The extension joints 958 may operate the same as or similar to the joints 226 discussed above but with reference to the extension housing 950 instead of the housing 210.

In addition, the junction box 900 may include a first extension nodule 960a, a second extension nodule 960b, a third extension nodule 960c, a fourth extension nodule 960d, and a fifth extension nodule 960c (generally, extension nodules 960 or extension nodules 960). The extension nodules 960 may be formed as part of the extension joints 958. For example, the first extension nodule 960a may be formed as part of the first extension joint 958a; the second extension nodule 960b may be formed as part of the second extension joint 958b; the third extension nodule 960c may be formed as part of the third extension joint 958c; the fourth extension nodule 960d may be formed as part of the fourth extension joint 958d; and the fifth extension nodule 960e may be formed as part of the fifth extension joint 958e. The extension nodules 960 may operate the same as or similar to the nodules 296 discussed above but with reference to the extension housing 950 instead of the housing 210.

In some embodiments, the extension sidewalls 952 may define the gasket groove (not illustrated in FIG. 9) along an upper surface of the extension sidewalls 952. The gasket 221 (not illustrated in FIG. 9) may be placed, formed, or cured so as to at least partially be within the gasket groove.

In some embodiments, the junction box 900 may include multiple fasteners (not illustrated) that operate the same as or similar to the fasteners 217 of the junction box 106 discussed above. The lid 214 may selectively attach to the extension housing 950 via the fasteners. The lid 214 when attached to the extension housing 950 may environmentally seal the extended internal volume defined by the housing 210 and the extension housing 950 (e.g., a volume defined by the lid 214, the bottom portion 350, the sidewalls 218, and the extension sidewalls 952). The extended internal volume is discussed in more detail below in relation to FIG. 10.

In some embodiments, the junction box 900 may include multiple fasteners configured to attach the extension housing 950 to the housing 210. In these and other embodiments, the junction box 900 may also include multiple fasteners configured to attach the lid 214 to the extension housing 950.

In some embodiments, the extension housing 950 may define extension receiver openings that operate the same as or similar to the receiver openings 209 discussed above. In addition, the extension receiver openings may be concentric with the corresponding openings 223 of the lid 214 and the receiver openings 209 in the housing 210. The extension receiver openings may be configured to receive the fasteners so as to attach the lid 214 to the extension housing 950 and the extension housing 950 to the housing 210.

The extension receiver openings may be defined such that the extension receiver openings pass through the entire extension housing 950 in the z-direction. In some embodiments, the junction box 900 may include multiple press nuts (not illustrated) that operate the same as or similar to the press nuts discussed above. In other embodiments, the fasteners may pass through the extension receiver openings and attach to the housing 210 via the threaded portion, the snap on portion, the friction fit portion, the press nuts, or the any other appropriate type of portion for receiving the fasteners and attaching the lid 214 to the extension housing 950.

In some embodiments, as the lid 214 is moved towards the extension housing 950, the gasket 221 may be compressed between the portion of the lid 214 that defines the gasket groove and a portion of an upper surface of the extension sidewalls 952. The lid 214, when attached to the extension housing 950, may apply pressure on the gasket 221 and force the gasket 221 toward the extension sidewalls 952 in the y-direction and the x-direction. Additionally or alternatively, the lid 214, when attached to the extension housing 950, may compress the gasket 221. The lid 214 compressing the gasket 221 may environmentally seal the extended internal volume defined by the lid 214, the bottom portion 350, the sidewalls 218, and the extension sidewalls 952.

In some embodiments, when the lid 214 is attached to the extension housing 950, the lid 214, the drip edge 954, and the extension joints 958 may define a first area 962*a*, a second area 962*b* (not illustrated in FIG. 9), a third area 962*c* (not illustrated in FIG. 9), a fourth area 962*d*, and a fifth area 962*e*. For example, the lid 214, the drip edge 954, the first extension nodule 960*a*, and the fifth extension nodule 960*c* may define the first area 962*a*; the lid 214, the drip edge 954, the fifth extension nodule 960*c*, and the fourth extension nodule 960*d* may define the fifth area 962*e*; the lid 214, the drip edge 954, the fourth extension nodule 960*d*, and the third extension nodule 960*c* may define the fourth area 962*d*; the lid 214, the drip edge 954, the third extension nodule 960*c*, and the second extension nodule 960*b* may define the third area 962*c*; and the lid 214, the drip edge 954, the second extension nodule 960*b*, and the first extension nodule 960*a* may define the second area 962*b*. The first area 962*a*, the second area 962*b*, the third area 962*c*, the fourth area 962*d*, and the fifth area 962*e* may be generally referred to as areas 962 or area 962 in the present disclosure.

The areas 962 may indicate suitable positions for creating a hole in the extension sidewalls 952 (e.g., suitable hole positions in the extension sidewalls 952). For example, the first area 962*a* may indicate suitable positions for creating a hole in the first extension sidewall 952*a*, the second area 962*b* may indicate suitable positions for creating a hole in the second extension sidewall 952*b*, the third area 962*c* may indicate suitable positions for creating a hole in the third extension sidewall 952*c*; the fourth area 962*d* may indicate suitable positions for creating a hole in the fourth extension sidewall 952*d*, and the fifth area 962*e* may indicate suitable positions for creating a hole in the fifth extension sidewall 952*e*.

In some embodiments, the extension housing 950 may include a non-conductive material the same as or similar to the housing 210 and the flashing 212 as discussed above. In these and other embodiments, the extension housing 950 material may be infused with a non-conductive ultraviolet (UV) resistant material such as a low molecular weight hydroxyphenyl-benzotriazole material, a high molecular weight hydroxyphenyl-benzotriazole material, or any other appropriate non-conductive UV resistant material. The extension housing 950 not comprising conductive material may limit a number of connections to the junction box 900 since the junction box 900 will not need to be grounded. Alternatively, in some embodiments, the extension housing 950 may include a metallic material.

Figure 10:
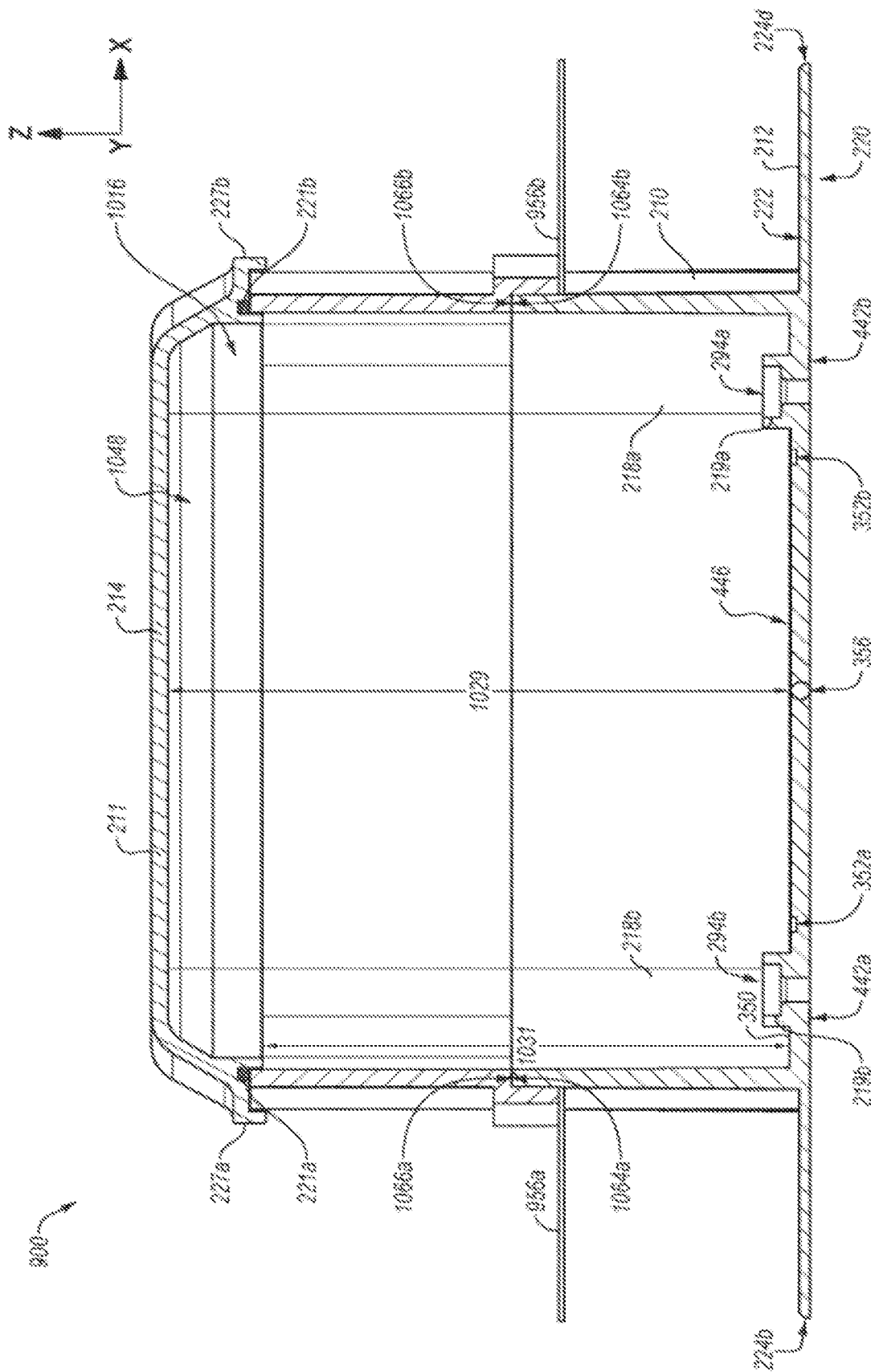
FIG. 10 illustrates a rear sectional view of the junction box of FIG. 9.

FIG. 10 illustrates a rear sectional view of the junction box 900 of FIG. 9. The gasket 221, when placed, formed, or cured in the gasket groove, may substantially surround an opening 1016 on a plane substantially parallel to the second groove 352. The opening 1016 may provide access to the extended internal volume 1048 of the housing 210 and the extension housing 950. The extended internal volume 1048 may be defined by the bottom portion 350, the sidewalls 218, the extension sidewalls 952, and the lid 214 when the lid 214 is attached to the extension housing 950.

Additionally, the lid 214 may include a raised portion 211 and a lower portion 227. When the lid 214 is attached to the extension housing 950, the raised portion 211 may be higher relative to the bottom portion 350 than the lower portion 227. In some embodiments, the raised portion 211 may increase the extended internal volume 1048 defined by the lid 214, the bottom portion 350, the sidewalls 218, and the extension sidewalls 952 compared to junction boxes that include lids that do not include the raised portion 211.

The raised portion 211, when the lid 214 is attached to the extension housing 950, may be a first distance 1029 away from the bottom portion 350. The lower portion 227*a-b*, when the lid 214 is attached to the extension housing 950, may be a second distance 1031 away from the bottom portion 350. The first distance 1029 may be equal to or greater than the second distance 1031. In some embodiments, the first distance 1029 may be equal to or greater than substantially four inches. In these and other embodiments, the second distance 1031 may be equal to or greater than substantially three inches. The raised portion 211, when the first distance 1029 is greater than the second distance 1031, may increase the extended internal volume 1048 defined by the bottom portion 350, the sidewalls 218, the extension sidewalls 952, and the lid 214 when the lid 214 is attached to the extension housing 950.

In some embodiments, when the extension housing 950 is attached to the housing 210, an upper surface 1066*a-b* of the sidewalls 218 may contact a lower surface 1064*a-b* of the extension sidewalls 952. In other embodiments, the second flashing 956 may be positioned between the extension housing 950 and the housing 210 such that the lower surface 1064*a-b* and the upper surface 1066*a-b* contact the second flashing 956. Various configurations of the second flashing are discussed in more detail below in relation to FIGS. 11A-11C. In some embodiments, the second flashing 956 may be attached to the housing 210 and/or the extension housing 950 using rivets, glue or other adhesive material, tension fit, or fasteners.

In some embodiments, the extension housing 950 may include an interior edge (not illustrated). An external perimeter of the interior edge may be in contact with a portion of internal surfaces of the sidewalls 218. The interior edge may be configured to properly position the extension housing 950 relative to the housing 210.

Figure 11A:
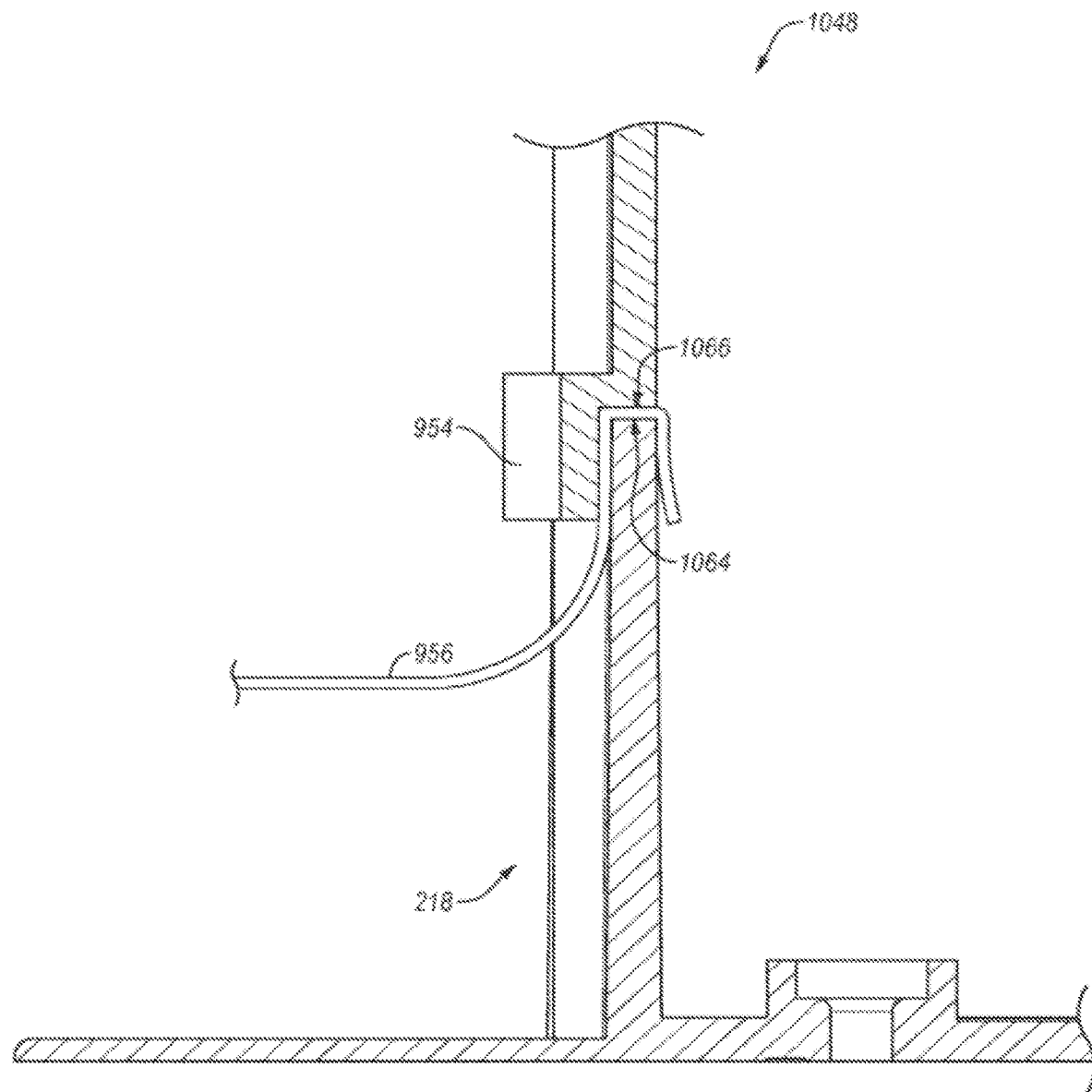
FIG. 11A illustrates an example configuration for attaching the second flashing to the junction box of FIG. 9.

FIG. 11A illustrates an example configuration for attaching the second flashing 956 to the junction box 900 of FIG. 9. The example configuration illustrated in FIG. 11A includes a portion of the second flashing 956 positioned between the drip edge 954 and the exterior surface of the sidewalls 218 and another portion of the second flashing 956 positioned between the upper surface 1066 and the lower surface 1064. The extension housing 950 when attached to the housing 210 may compress the second flashing 956 between the upper surface 1066 and the lower surface 1064. In some embodiments, as illustrated in FIG. 11A, the second flashing 956 may extend into the extended internal volume 1048. In other embodiments, the second flashing 956 may not extend into the extended internal volume 1048. For example, the edge of the second flashing 956 may be flush with internal surfaces of the sidewalls 218 and the extension sidewalls 952. As another example, the edge of the second flashing 956, the lower surface 1064, and the upper surface 1066 may define a recess.

Figure 11B:
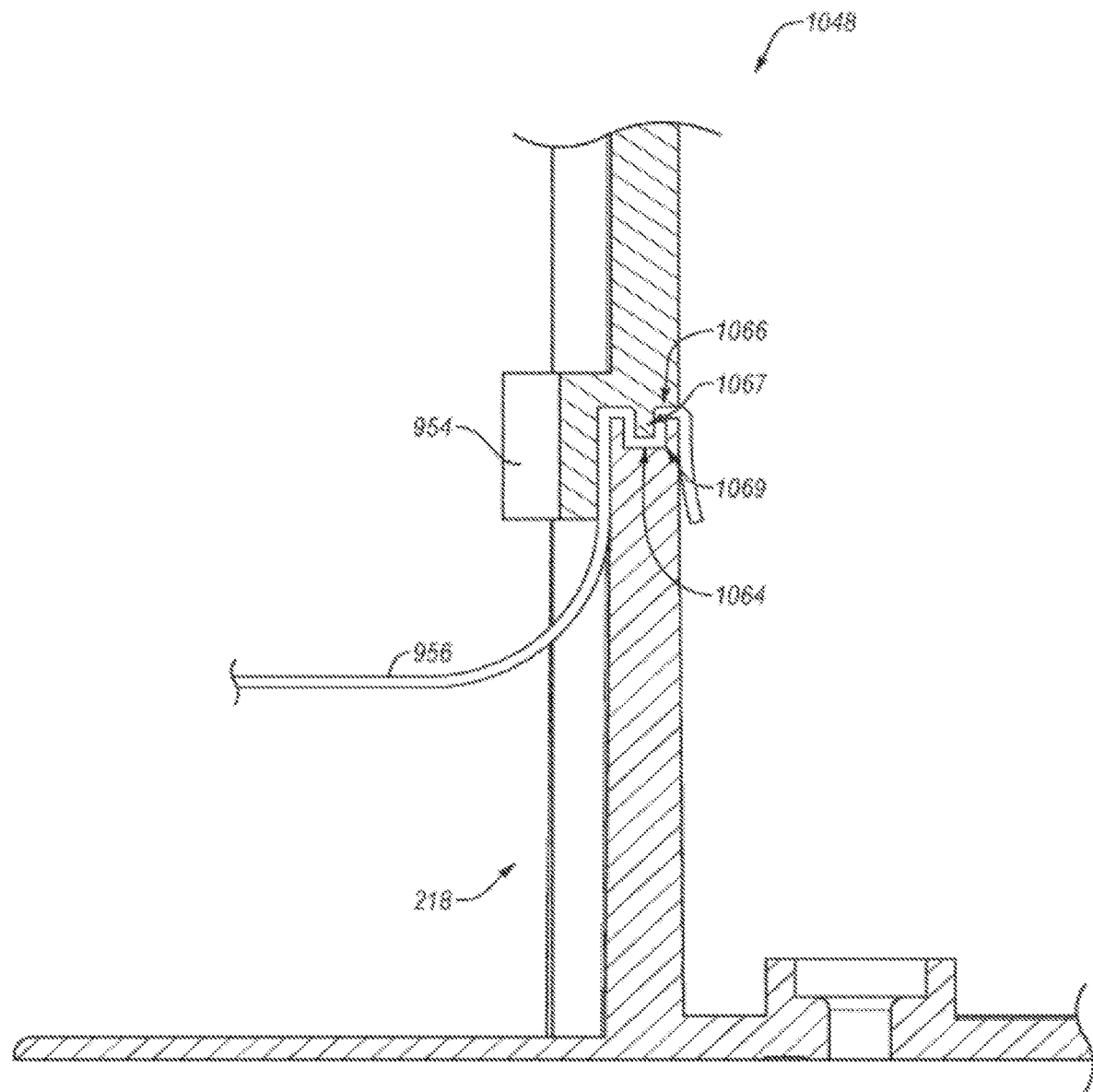
FIG. 11B illustrates another example configuration for attaching the second flashing to the junction box of FIG. 9.

FIG. 11B illustrates another example configuration for attaching the second flashing 956 to the junction box 900 of FIG. 9. The example configuration illustrated in FIG. 11B includes a portion of the second flashing 956 positioned between the drip edge 954 and the exterior surface of the sidewalls 218 and another portion of the second flashing 956 positioned between the upper surface 1066 and the lower surface 1064. In some embodiments, as illustrated in FIG. 11A, the upper surface 1066 may include a protrusion 1067 configured to mate with a recess 1069 defined by the lower surface 1064. The protrusion 1067 and the recess 1069 may be configured to "bite" the second flashing 956 when the extension housing 950 is attached to the housing 210 to prevent the second flashing 956 from moving. In some embodiments, the protrusion 1067 and the recess 1069 may be configured to properly position the extension housing 950 relative to the housing 210.

In some embodiments, as illustrated in FIG. 11B, the second flashing 956 may extend into the extended internal volume 1048. In other embodiments, the second flashing 956 may not extend into the extended internal volume 1048. For example, the edge of the second flashing 956 may be flush with internal surfaces of the sidewalls 218 and the extension sidewalls 952. As another example, the edge of the second flashing 956, the lower surface 1064, and the upper surface 1066 may define a recess.

Figure 11C:
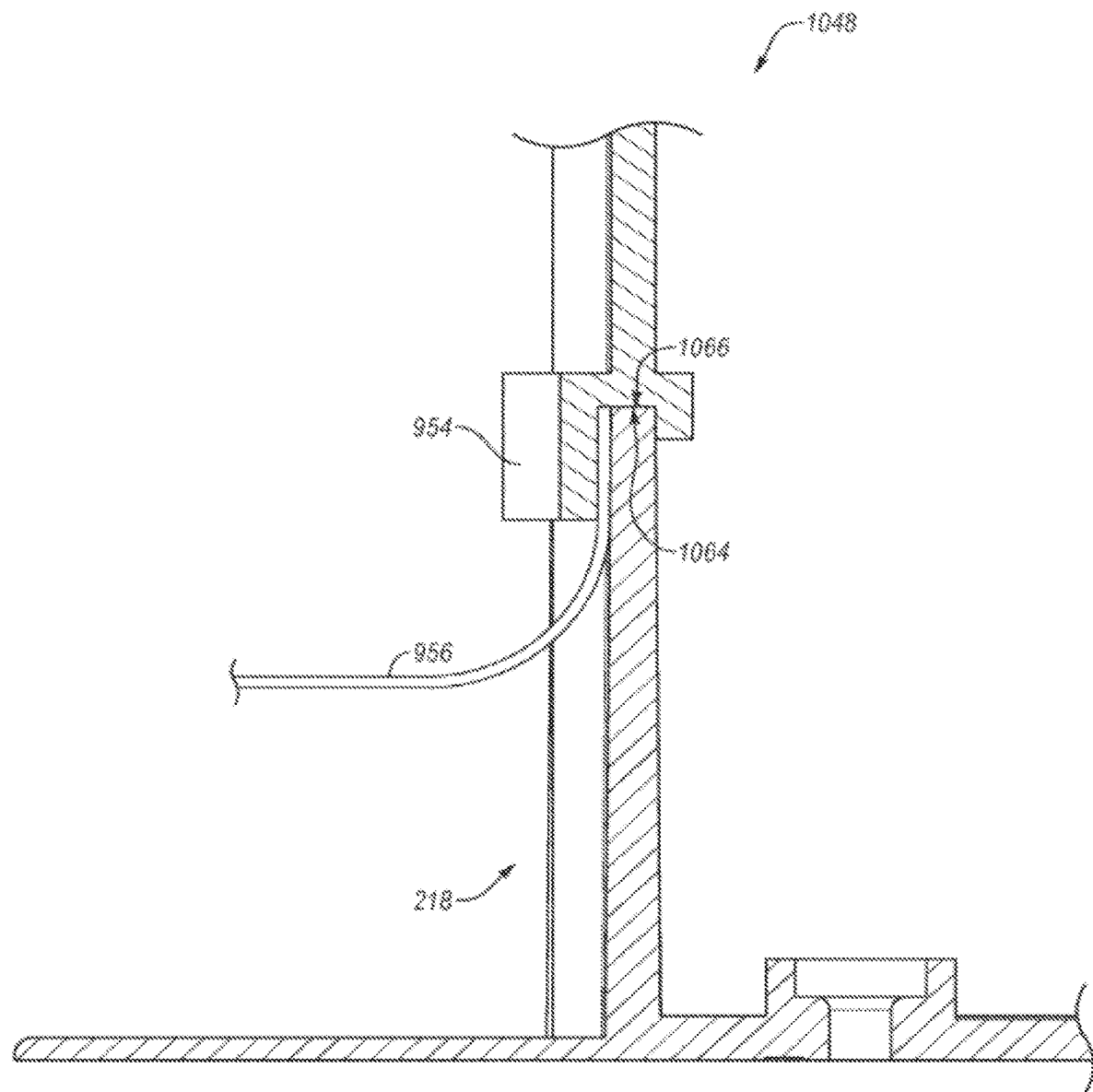
FIG. 11C illustrates yet another example configuration for attaching the second flashing to the junction box of FIG. 9.

FIG. 11C illustrates yet another example configuration for attaching the second flashing 956 to the junction box 900 of FIG. 9. The example configuration illustrated in FIG. 11C includes a portion of the second flashing 956 positioned between the drip edge 954 and the exterior surface of the sidewalls 218. In some embodiments, as illustrated in FIG. 11C, the upper surface 1066 may physically contact the lower surface 1064 when the extension housing 950 is attached to the housing 210.

Figure 12A:
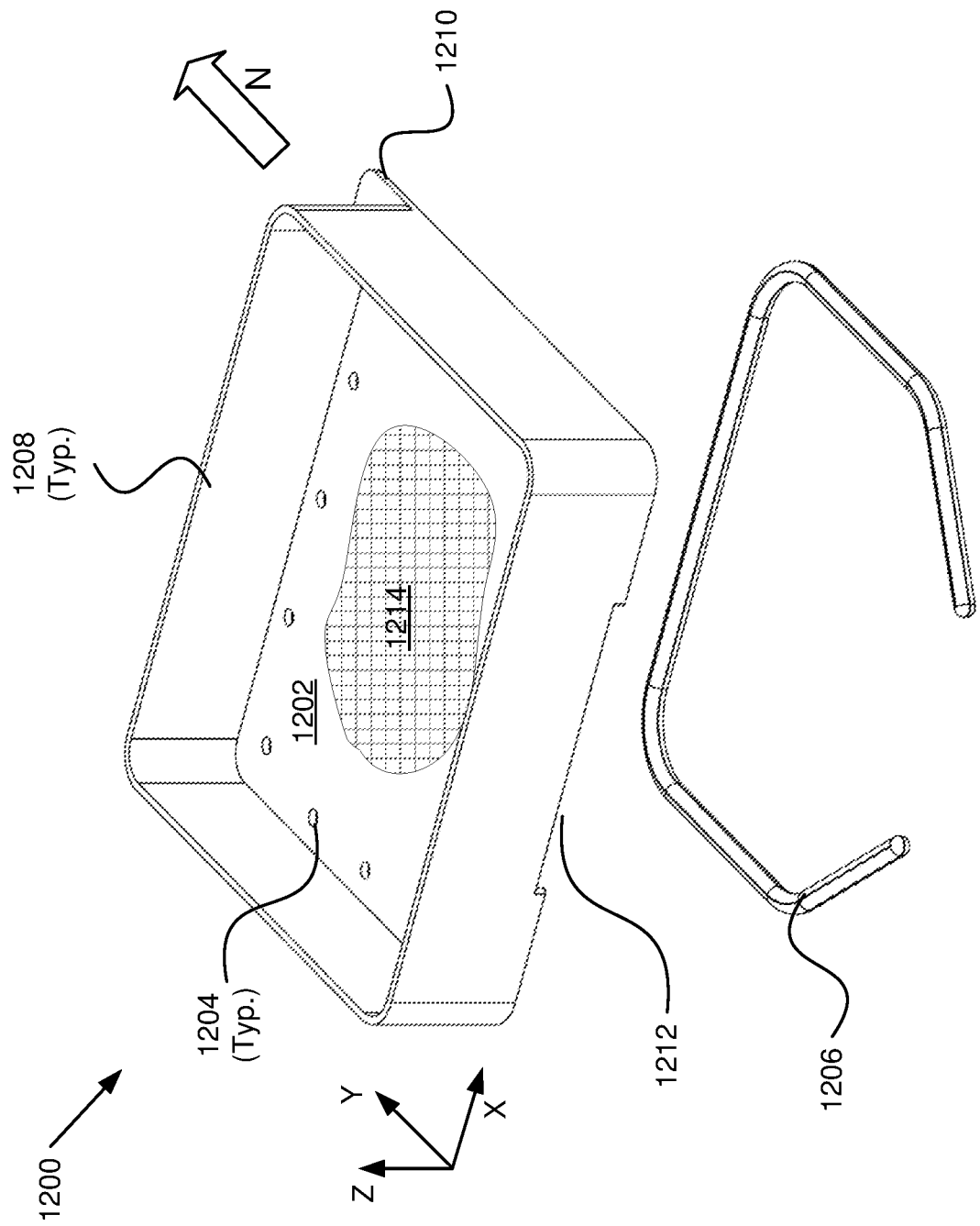
FIG. 12A illustrates a perspective view of a housing with anchor openings positioned for anchors to compress a sealant and the sealant shown below, according to various embodiments.
Figure 12B:
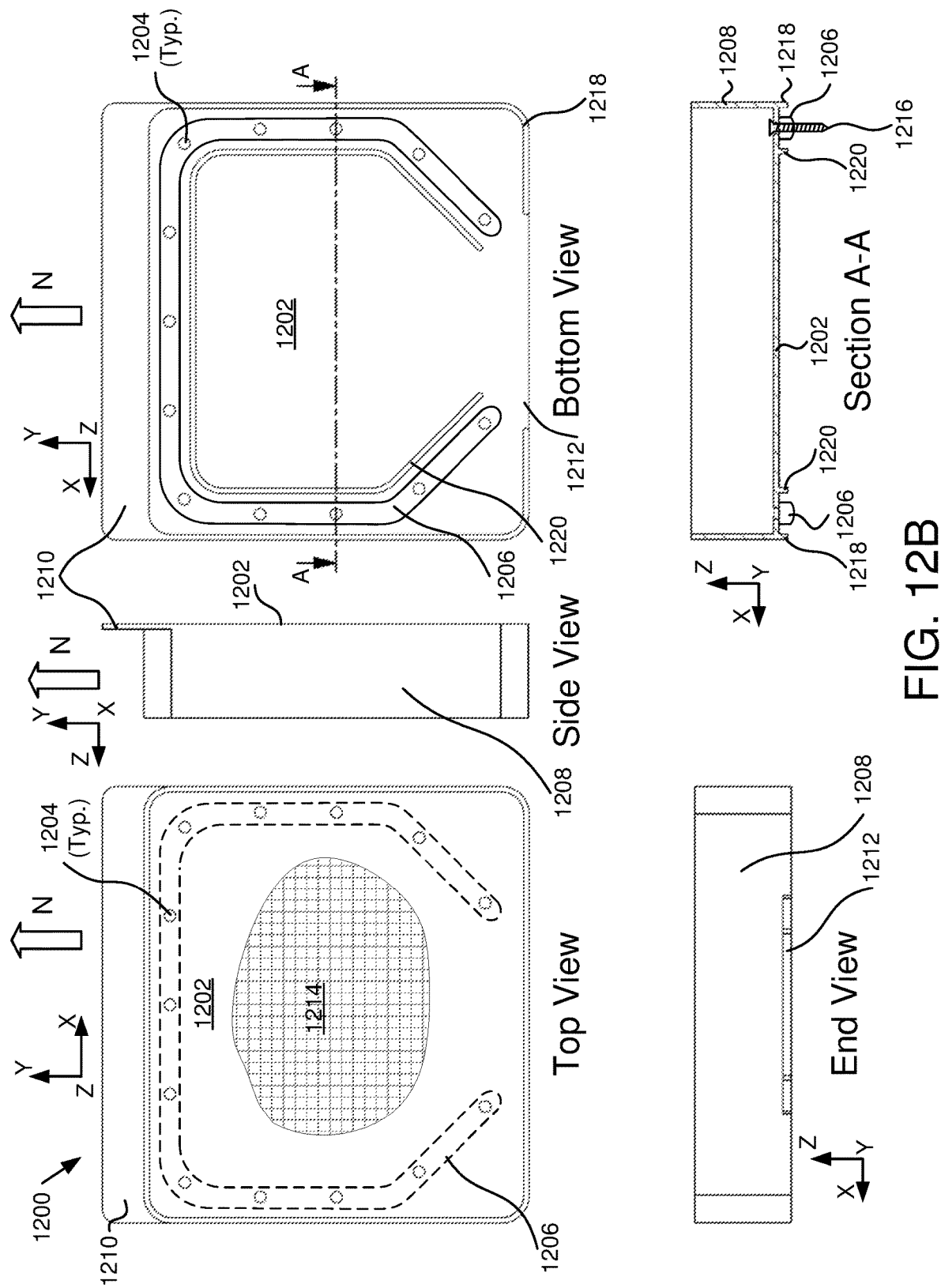
FIG. 12B illustrates a top view, an end view, a side view, a bottom view, and a section view of the housing of FIG. 12A, according to various embodiments.
Figure 12C:
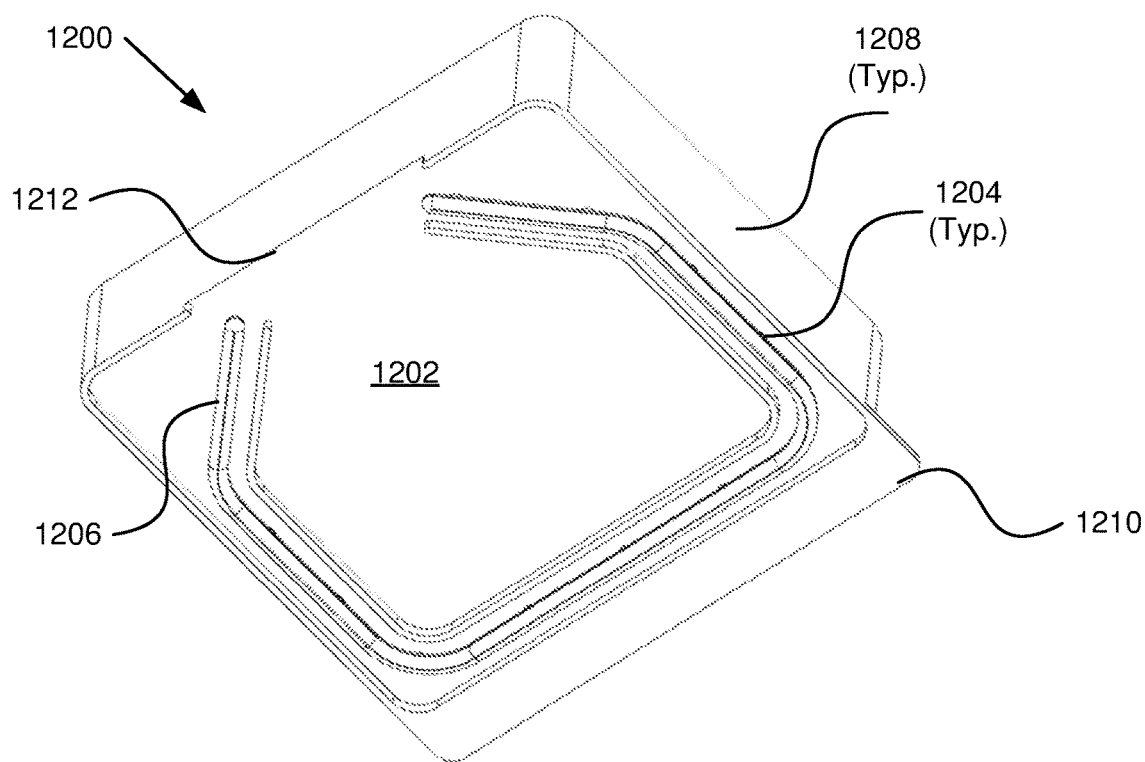
FIG. 12C illustrates a bottom perspective view of the housing of FIG. 12A with the sealant attached and without anchors, according to various embodiments.
Figure 12D:
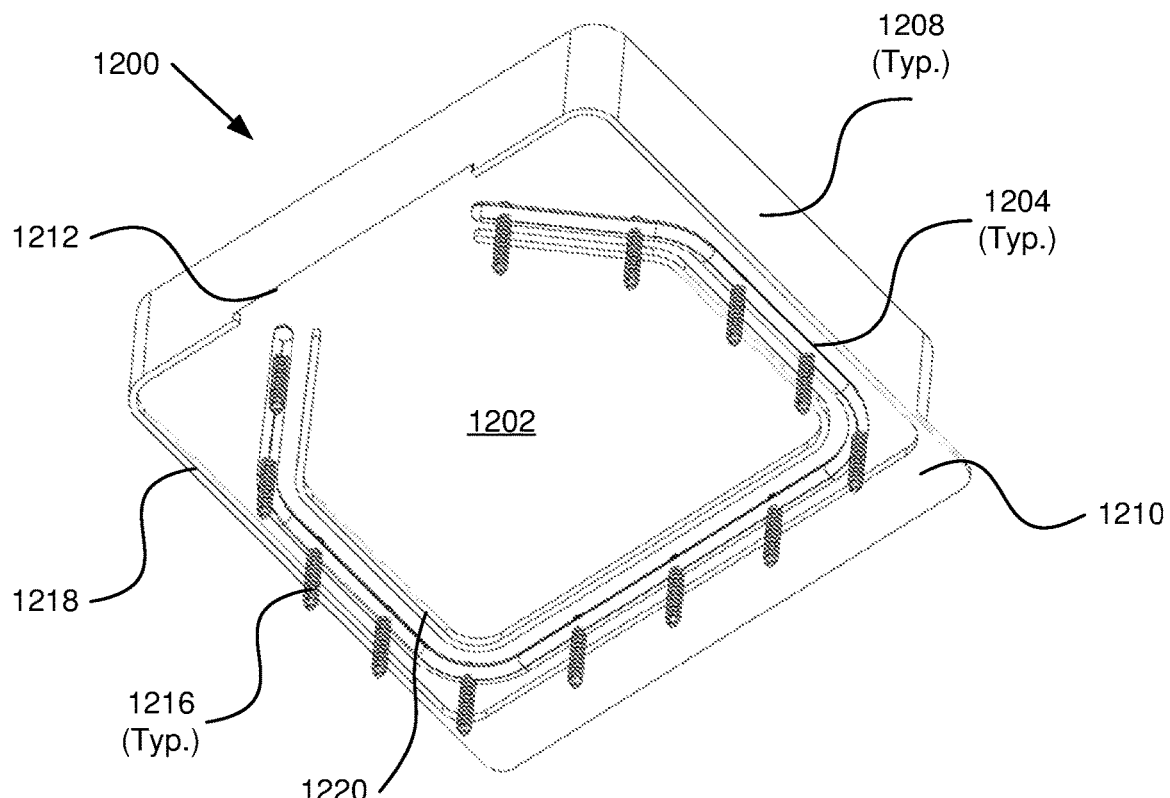
FIG. 12D illustrates a bottom perspective view of the housing of FIG. 12A with the sealant attached and with anchors, according to various embodiments.
Figure 12E:
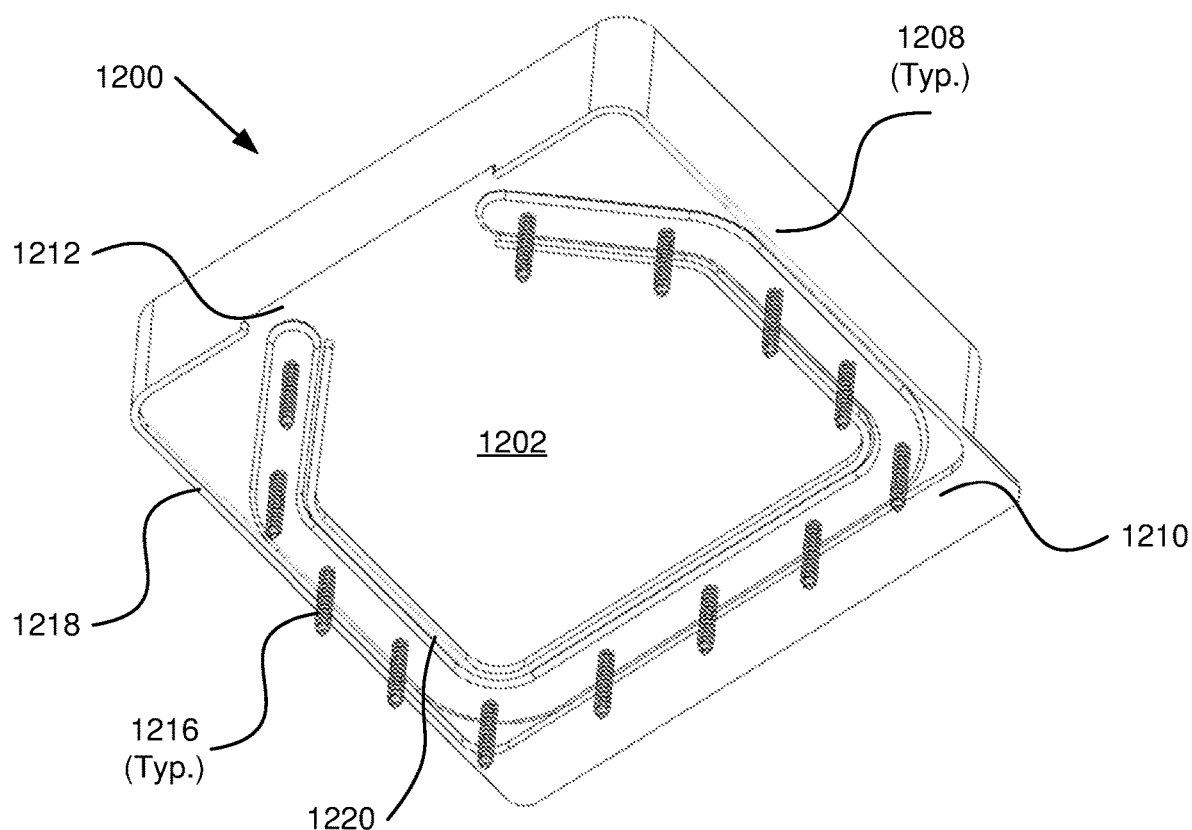
FIG. 12E illustrates a bottom perspective view of the housing of FIG. 12A with the sealant attached and with anchors and with the sealant flattened, according to various embodiments.

FIG. 12A illustrates a perspective view of an enclosable housing 1200 (e.g., housing 1200) with anchor openings positioned for anchors to compress a sealant 1206, according to various embodiments. FIG. 12B illustrates a top view, an end view, a side view, a bottom view, and a section view of the housing 1200 of FIG. 12A, according to various embodiments. FIG. 12C illustrates a bottom perspective view of the housing 1200 of FIG. 12A with the sealant 1206 attached and without anchors 1216, according to various embodiments. FIG. 12D illustrates a bottom perspective view of the housing 1200 of FIG. 12A with the sealant 1206 attached and with anchors 1216, according to various embodiments. FIG. 12E illustrates a bottom perspective view of the housing 1200 of FIG. 12A with the sealant 1206 attached and with anchors 1216 and with the sealant 1206 flattened, according to various embodiments.

The housing 1200, in some embodiments is a junction box, such as the junction box 106 of FIG. 1 that mounts to a sloped roof of a structure with wiring, cabling, etc. from an external device 102 and is enclosable by having a lid (not shown). The housing 1200 may include a lid, such as the lid 214 of FIG. 2A. The housing 1200 is configured to have penetrations through a bottom 1202 of the housing 1200 and through the roof into the structure, such as into an attic space of the structure. The housing 1200 is designed to keep liquid, such as water, from entering the structure through the penetrations.

The bottom 1202 includes a bottom interior surface (visible in FIG. 12A) and oriented on the Z-axis side of the bottom 1202, and a bottom exterior surface opposite the bottom interior surface. In FIGS. 12A-C, the bottom 1202 includes anchor openings 1204 positioned so that anchors (not shown) extending through the anchor openings 1204 and into the roof compress the sealant 1206. Each anchor opening 1204 is positioned so that securing an anchor through the anchor opening 1204 contributes to securing the housing 1200 to the roof and applies a force directed toward the roof that compresses a portion of the sealant 1206 adjacent to and/or surrounding the anchor opening 1204.

The sealant 1206 is disposed on the bottom exterior surface of the bottom 1202 and the sealant 1206 surrounding a central area 1214 of the bottom 1202. The central area 1214 is configured for penetrations into the roof. The central area 1214, in some embodiments, corresponds to a drill zone (not shown) where drilling will avoid the sealant 1206 and other important features of the housing 1200. Note that for convenience the central area 1214 is depicted as a hatched area and is not drawn to encompass all areas on the bottom 1202 where drilling would be allowed.

The housing 1200 includes sides 1208 and is typically configured to include a lid (not shown) to cover the enclosable housing 1200 to prevent liquid, such as rain, snow, sleet, etc. from entering the housing 1200. The housing 1200, in some embodiments, includes a flashing 1210 on an upper side of the housing 1200.

As used herein, a north arrow with an "N" next to the arrow points up slope of the roof toward an apex 107 of the roof. A direction opposite the north arrow is oriented toward a lowest side of the roof along a line from the apex 107 to a lowest section of the roof where the line runs through the housing 1200 and along a Y axis as depicted. A direction perpendicular to the north arrow and perpendicular to the Y axis is an X axis running perpendicular to a slope of the roof where the housing 1200 is mounted.

The flashing 1210 extends from the bottom 1202 of the housing 1200 on the north side of the housing 1200 and is intended to be inserted under a shingle or other similar structure. Water or other liquid falling on the shingle above flashing 1210 will flow toward an upper side 1208 of the housing 1200 instead of under the housing 1200.

The sealant 1206 surrounds at least an upper portion and side portions of the central area 1214. The upper portion is oriented toward an upper side (e.g., north side) of the bottom 1202 with respect to the slope of the roof. In some embodiments, a lower portion opposite the upper portion of the central area 1214 is free from the sealant 1206 where the lower portion oriented at a lowest part of the bottom 1202 with respect to the slope of the roof. The sealant 1206 is open on the lower side, in some embodiments, to allow water or another liquid to drain from an area enclosed by the sealant 1206 if any water/liquid happens to be in this area. In some embodiments, the lower side includes a weep hole 1212 to allow water/liquid to run out of the housing 1200.

In some embodiments, the plurality of anchor openings 1204 of the bottom 1202 are positioned to cause at least a portion of the sealant 1206 in a continuous band around the side portions and the upper portion of the central area 1214 when the plurality of anchor openings 1204 each have an anchor 1216 secured to the roof. The housing 1200 will have some amount of flexibility due the material used in the housing 1200, due to positioning of the sealant 1206, stiffness of the sealant 1206, and other factors. Having too few anchor openings 1204 and corresponding anchors 1216 would result in some areas of the sealant 1206 not making sufficient contact with the roof to prevent liquid from running into the central area 1214.

Placing anchor openings 1204 and corresponding anchors 1216 along a pathway of the from one side portion, along the upper section, and along the other side section surrounding the central area 1214 provides a way to create a continuous seal around the central area 1214 on sides where liquid may enter. Gravity will act on any liquid within the central area 1214 to run towards the lower portion and out a weep hole 1212 on a side 1208 of the housing 1200 oriented downslope of the roof.

Stiffness of the housing 1200 between anchor openings 1204, in addition to stiffness of the sealant 1206 and other factors dictate how many anchor openings 1204 are required to adequately create a seal between the roof and the sealant 1206 as well as between the bottom 1202 and the sealant 1206.

In some embodiments, the housing 1200 includes an inner ridge 1220 and/or an outer ridge 1218 disposed on the bottom exterior surface of the bottom 1202 where the inner ridge 1220 is located interior to an edge of the sealant 1206 towards the central area 1214 and the outer ridge 1218 is located in a zone between an exterior edge of the sealant 1206 and an exterior edge of the housing 1200. In some embodiments, the inner ridge 1220 and the outer ridge 1218 run a length of the sealant 1206. In some embodiments, The anchors 1216 securing the housing 1200 to the roof compress the sealant 1206 enough so that the inner ridge 1220 and/or the outer ridge 1218 contact the roof. Beneficially, the inner ridge 1220 and the outer ridge 1218 press against the roof to create an additional barrier to liquid entering the central area 1214. In some embodiments, the inner ridge 1220 and/or the outer ridge 1218 compress into roofing material to create another seal in addition to the sealant 1206.

In some embodiments, the sealant 1206 includes a compressible portion and a sealing portion. In some embodiments, the compressible portion is made from a compressible material while the sealing portion is made from a material that spreads and engages any irregularities of material on the surface of the roof. In various embodiments, the sealing portion is also compressible to some degree. In some examples, the roof is covered with asphalt shingles that often include small particles, such as sand, that create an irregular surface. The sealing portion spreads in and around the small particles or other irregularities of the roof to prevent liquid from passing through the sealing portion. In some embodiments, the sealing portion is a mastic, butyl, a resin, a caulk, or other material capable spreading in and around irregular surfaces of the roof. In some embodiments, the sealing portion remains pliable over time and is resistant to weather forces, such as heating, cooling, freezing, etc.

The compressible portion of the sealant 1206 compresses under load as anchors 1216 are secured through the anchor openings 1204 to the roof. In some embodiments, the compressible portion of the sealant 1206 is an ethylene propylene diene monomer ("EDPM") foam. In some examples, EDPM foam is a cellular EDPM rubber. In some embodiments, EDPM rubber is mixed with neoprene and styrene butadiene rubber ("SBR") to create the EDPM foam. In some embodiments, the compressible portion also remains pliable over time and is resistant to weather forces, such as heating, cooling, freezing, etc. In other embodiments, the compressible portion is another substance, such as neoprene, a silicone sponge, nitrile, or other suitable material. In other embodiments, the sealant 1206 is a single material that is compressible and seals against the roof, such as a butyl rubber or other substance. Typically, the compressible portion and the sealing portion are bonded to form a sealant 1206 that is available as a single unit to be applied to the bottom 1202. In other embodiments, the sealing portion and the compressible portion are separate.

In some embodiments, the sealant 1206 is uniform rather than having a separate compressible portion and a sealing portion. In the embodiments, the sealant 1206 is compressible and is able to form a seal with the roof and the bottom 1202 and has some or all of the properties described above with regards to the compressible portion and the sealing portion.

In some embodiments, the sealant 1206 is available as a uniform piece that is applied to the bottom 1202 of the housing 1200. In some examples, the sealant 1206 is affixed to the bottom exterior surface of the bottom 1202. In other embodiments, the sealant 1206 is a caulk or other similar substance that is applied to the bottom 1202. In some examples, the bottom 1202 includes a sealant recess, as discussed with regard to FIG. 19, and the sealant 1206 is applied to the sealant recess. In such embodiments, the sealant 1206 may initially flow and may then harden into a flexible, resilient form. One of skill in the art will recognize other materials suitable for the sealant 1206.

In some embodiments, the sealant 1206 is positioned in a band passing between and around each of the plurality of anchor openings 1204, as depicted in the bottom view and section view of FIG. 12B and in FIG. 12D and FIG. 12E. Note that the sealant 1206 is depicted as a dashed line in the top view of FIG. 12B, but is located on the bottom exterior surface.

Figure 13A:
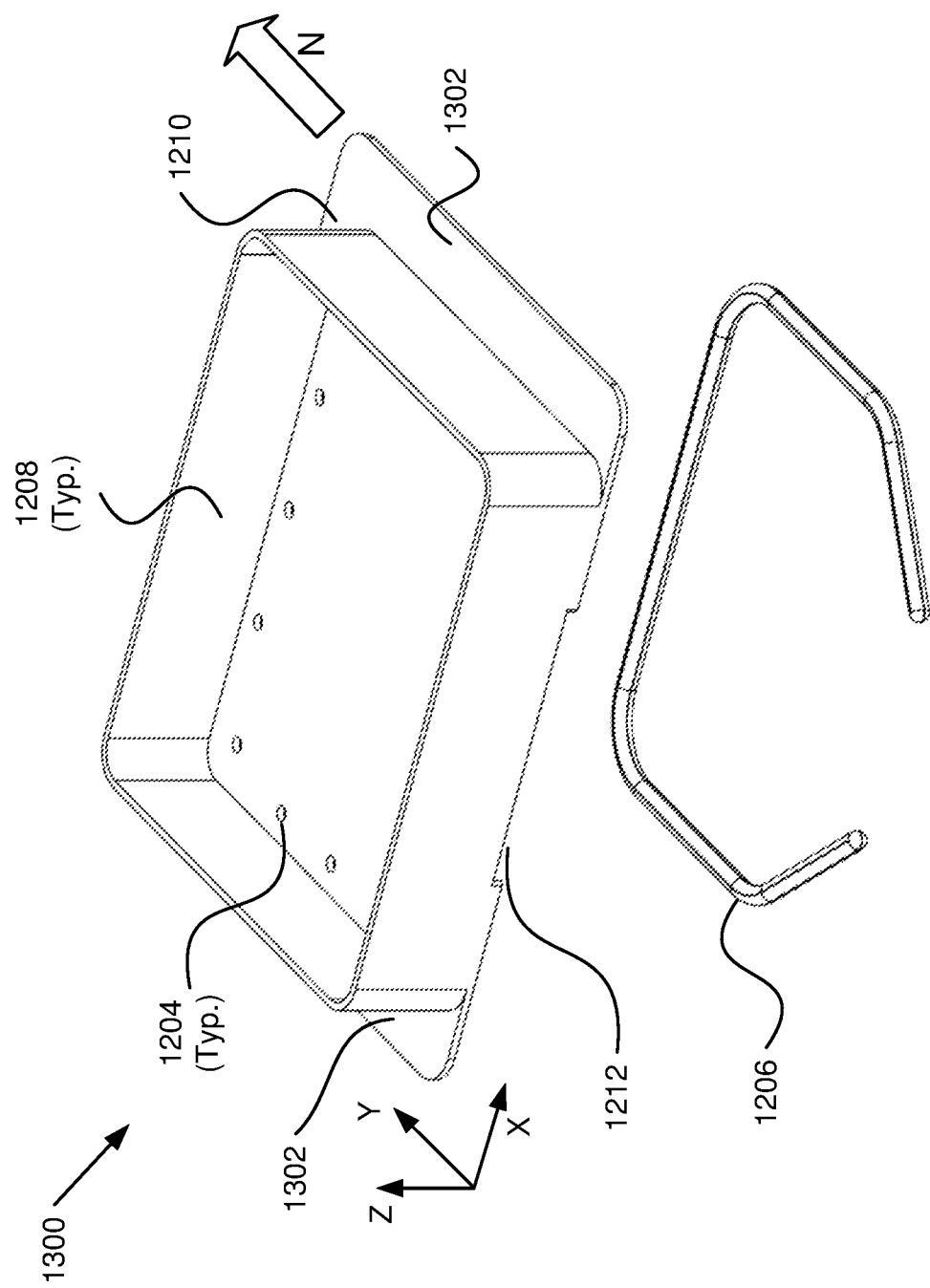
FIG. 13A illustrates a perspective view of a housing with side flashings and with anchor openings positioned for anchors to compress a sealant and the sealant shown below, according to various embodiments.
Figure 13B:
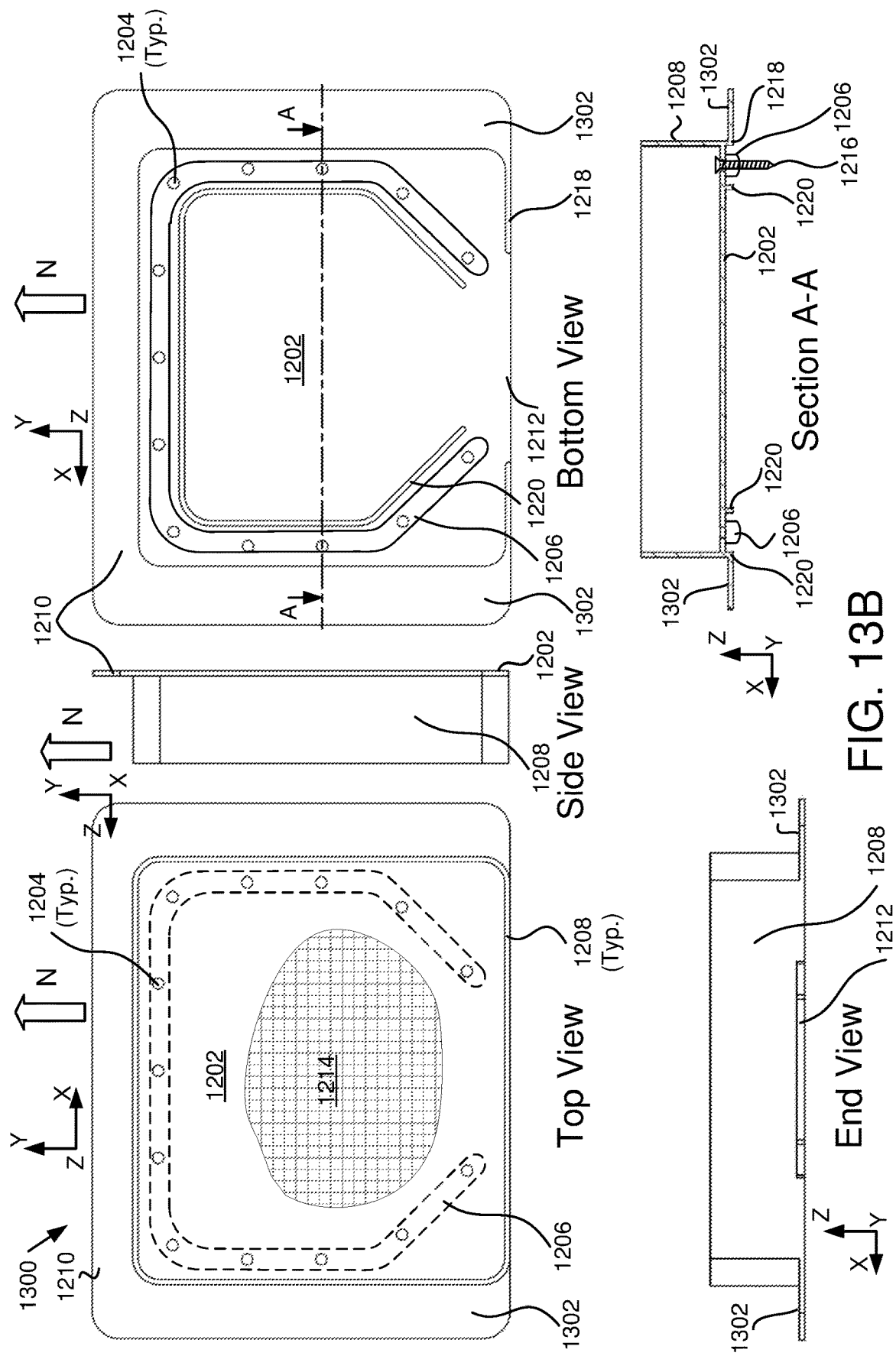
FIG. 13B illustrates a top view, an end view, a side view, a bottom view, and a section view of the housing of FIG. 13A, according to various embodiments.

FIG. 13A illustrates a perspective view of a housing 1300 with side flashings 1302 and with anchor openings 1204 positioned for anchors 1216 to compress a sealant 1206 and the sealant 1206 shown below, according to various embodiments. FIG. 13B illustrates a top view, an end view, a side view, a bottom view, and a section view of the housing 1300 of FIG. 13A, according to various embodiments. In some embodiments, the housing 1300 of FIG. 13A and FIG. 13B are substantially similar to the housing 1200 of FIGS. 12A-E except for the side flashings 1302. The side flashings 1302 are shaped to further keep liquid away from under the housing 1300.

Figure 14:
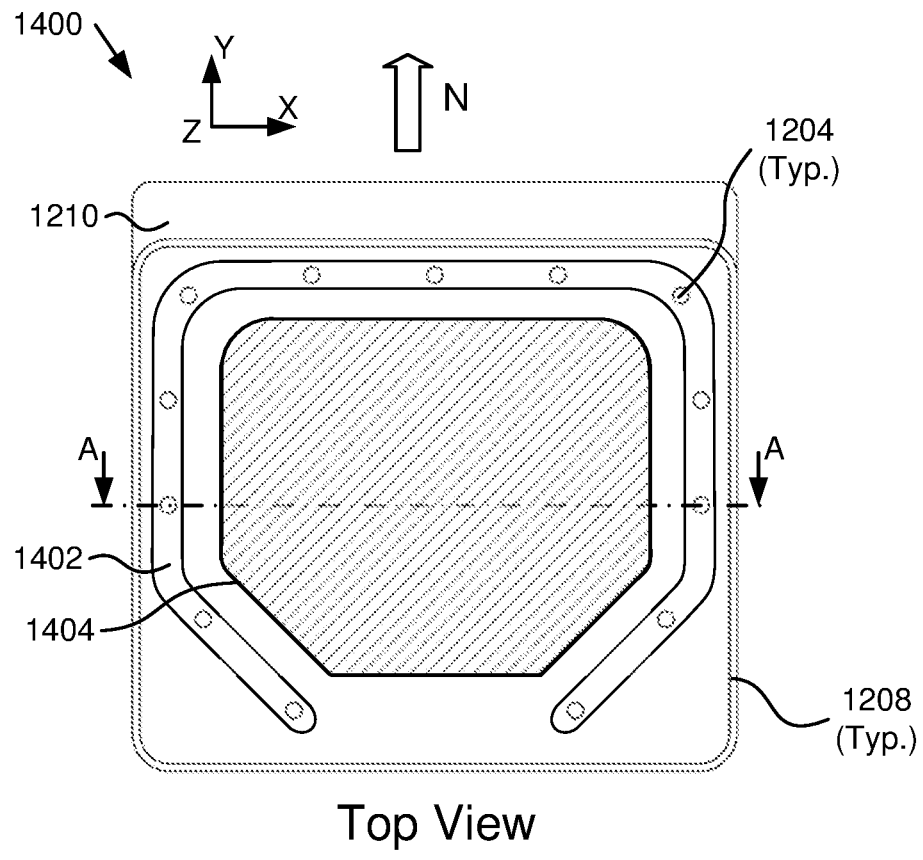
FIG. 14 illustrates a top view and a section view of a housing with a drill zone and with anchor openings positioned for anchors to compress a sealant, according to various embodiments.
Figure 14:
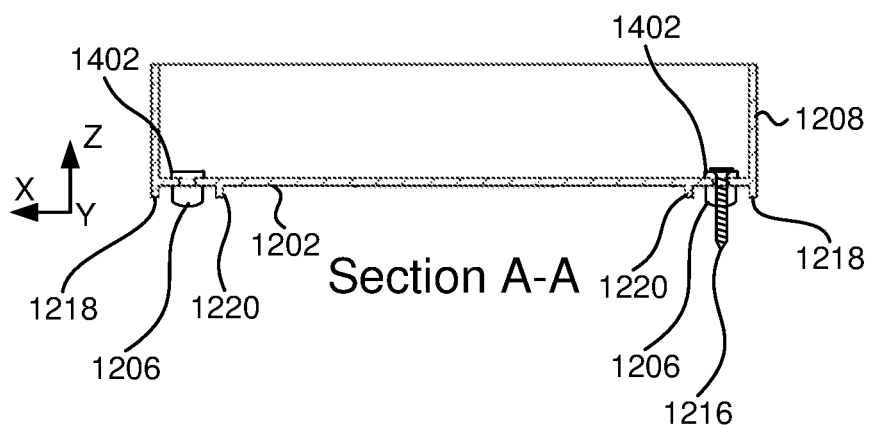

FIG. 14 illustrates a top view and a section view of a housing 1400 with a drill zone 1404 and with anchor openings 1204 positioned for anchors 1216 to compress a sealant 1206, according to various embodiments. The housing 1400 is substantially similar to the housing 1200 of FIGS. 12A-E but includes a compression ring 1402 and a drill zone 1404.

The drill zone 1404 is a marking on the bottom interior surface of the bottom 1202 and may include an outline, hatching or some other marking within the area of the drill zone 1404, or both. The drill zone 1404 depicted in FIG. 14 includes both an outline and hatching. The drill zone 1404 is an area within the central area 1214 where drilling through the bottom 1202 is allowed because drilling is sufficiently away from the anchors 1216, the sealant 1206, the inner ridge and other structures to prevent damage that may lead to allowing water or other liquid to be within the central area 1214, which may lead to the water/liquid penetrating the roof. Typically, drilling in the drill zone 1404 includes drilling through the roof under the drill zone 1404. The sealant 1206, compression of the sealant 1206 using anchors 1216, the inner ridge 1220, the outer ridge 1218, the flashing 1210 etc. are designed to prevent water/liquid from entering a space under the central area 1214 to avoid water/liquid from entering the structure under the roof. Thus, the outer edges of the drill zone 1404 are coordinated with the sealant 1206, any sealant recess for the sealant 1206, the anchors 1216, etc.

The housing 1400 also includes a compression ring 1402 positioned along the plurality of anchor openings 1204. The compression ring 1402 is configured to stiffen the bottom 1202 of the housing 1400. Anchors 1216 positioned through the plurality of anchor openings 1204 and secured to the roof provide a force between anchor openings 1204 sufficient to compress the sealant 1206 to create a seal to the roof continuously along the compression ring 1402. As used herein, the anchors 1216 positioned through the plurality of anchor openings 1204 and secured to the roof provide a force between anchor openings 1204 sufficient to compress the sealant 1206 to create a seal to the roof continuously along the compression ring 1402 means that locations between anchor openings 1204 are not bowed up enough to create a gap such that liquid is able to penetrate the sealant 1206 to enter the central area 1214. In some embodiments, the compression ring 1402 is included to provide extra stiffness between anchor openings 1204. Thus, the housing 1400 may be allowed to flex at other locations while maintaining sufficient stiffness between anchor openings 1204 to prevent flexing of the bottom 1202 of the housing sufficient so that the sealant 1206 between the openings fails to prevent water/liquid from seeping into the central area 1214 between the anchor openings 1204. Extra stiffening of the compression ring 1402 is thus beneficial and may allow for thinner sides 1208 and bottom 1202 of the housing 1400.

In some embodiments, the compression ring 1402 includes a thickened portion of material of the bottom 1202 of the housing 1400. In other embodiments, the compression ring 1402 is separate from the bottom 1202 of the housing 1400 and includes anchor openings positioned to align with the plurality of anchor openings 1204 in the bottom 1202 of the housing 1400 and the compression ring 1402 is positioned on the bottom interior surface of the bottom 1202 of the housing 1400. In some example, the separate compression ring 1402 is made of a material different than the housing 1400, such as metal, a stiffer polymer than the housing 1400, etc. In some embodiments, the compression ring 1402 is designed with a stiffness, in addition to the stiffness of the bottom 1202 between anchor openings 1204 to sufficiently compress the sealant 1206 between anchor openings 1204 to prevent gaps between the sealant 1206 and the roof in areas between anchor openings 1204.

Figure 15:
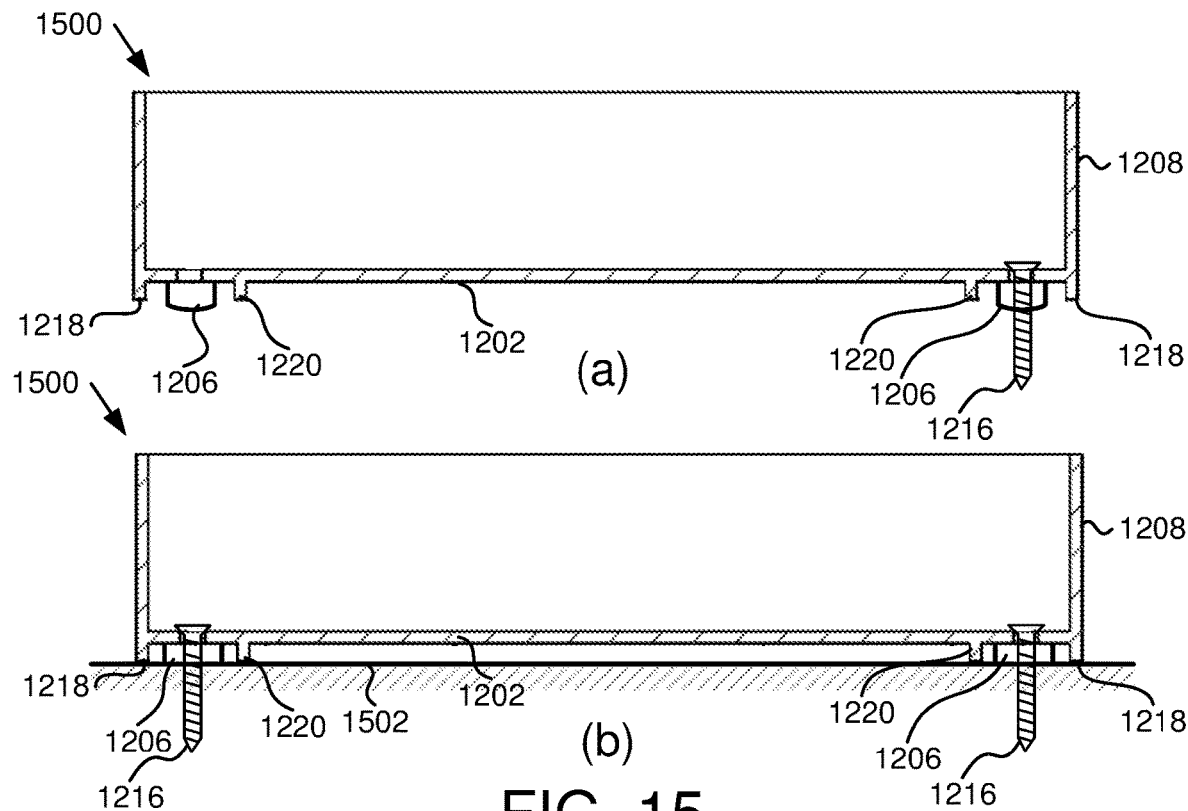
FIG. 15 illustrates a section view of a housing with bottom compression ridges and with anchor openings positioned for anchors to compress a sealant and a section view of the housing with anchors compressing the sealant, according to various embodiments.

FIG. 15 illustrates a section view (a) of a housing 1500 with bottom compression ridges (e.g., inner ridge 1220 and outer ridge 1218) and with anchor openings 1204 positioned for anchors 1216 to compress a sealant 1206 and a section view (b) of the housing 1500 with anchors 1216 compressing the sealant 1206, according to various embodiments. The top section view (a) depicts the housing 1500 prior to installation. A single anchor 1216 is included to provide perspective regarding placement of the anchor 1216. In the embodiments of FIG. 15, the housing 1500 includes an inner ridge 1220 and an outer ridge 1218 as depicted in FIGS. 12A-E. The housing 1500 includes a sealant 1206 in line with the anchors 1216 and anchor openings 1204 so that an anchor 1216 will extend through the sealant 1206.

The bottom section view (b) depicts the housing 1500 anchored to a roof 1502 where the inner ridge 1220 and outer ridge 1218 are in contact with the roof 1502. The sealant 1206, in some embodiments, compresses and expands horizontally. The sealant 1206, when compressed, is configured to form a barrier to keep liquid external to the housing 1500 on the roof 1502 from migrating into the area under the central area 1214 between the inner ridges 1220. Securing the anchors 1216 to the roof 1502 also presses the inner ridge 1220 and outer ridge 1218 into the roofing material, which also helps prevent liquid from moving into the space under the central area 1214.

Note that the inner ridges 1220 and outer ridges 1218 may have a length in a direction between the housing 1500 and the roof 1502 that varies depending upon how much the sealant 1206 is intended to compress, a desired distance between the roof 1502 and the bottom 1202 of the housing 1500, etc. While no compression ring 1402 is depicted, embodiments contemplated herein may include a compression ring 1402 on any of the housings, junction boxes, etc. described herein.

Figure 16:
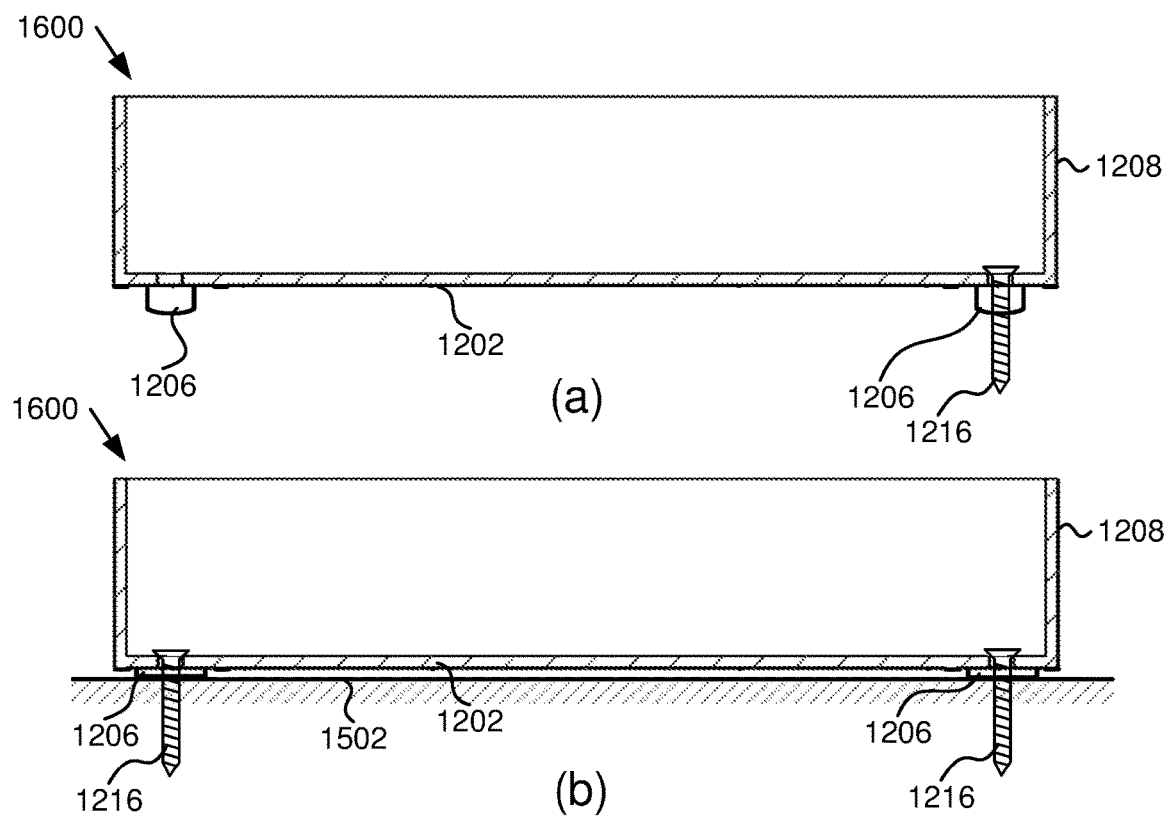
FIG. 16 illustrates a section view of a housing without bottom compression ridges and with anchor openings positioned for anchors to compress a sealant and a section view of the housing with anchors compressing the sealant, according to various embodiments.

FIG. 16 illustrates a section view of a housing 1600 without bottom compression ridges (e.g., inner ridge 1220 and outer ridge 1218) and with anchor openings 1204 positioned for anchors 1216 to compress a sealant 1206 and a section view of the housing 1600 with anchors 1216 compressing the sealant 1206, according to various embodiments. The top section view (a) depicts the housing 1600 prior to installation. In the embodiments of FIG. 16, the housing 1600 does not include an inner ridge 1220 or an outer ridge 1218. The housing 1600 includes a sealant 1206 in line with the anchors 1216 and anchor openings 1204 so that an anchor 1216 will extend through the sealant 1206.

The bottom section view (b) depicts the housing 1600 anchored to a roof 1502 where is compressed between the bottom 1202 of the housing 1600 and the roof 1502. The sealant 1206 compresses and expands horizontally more than in FIG. 15(*b*). Again, the sealant 1206, when compressed, is configured to form a barrier to keep liquid external to the housing 1600 on the roof 1502 from migrating into the area under the central area 1214 between the inner ridges 1220.

Figure 17:
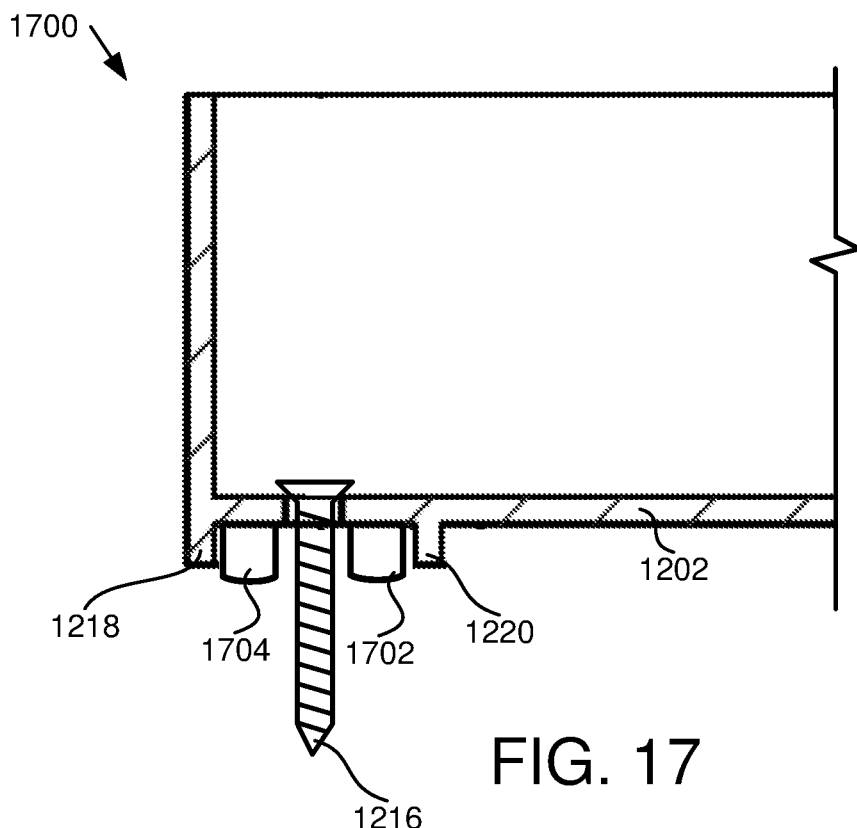
FIG. 17 illustrates a partial section view of a housing with bottom compression ridges and with anchor openings positioned for anchors to compress sealants where the sealants include two sealants with one on either side of an anchor, according to various embodiments.

FIG. 17 illustrates a partial section view of a housing 1700 with bottom compression ridges (e.g., inner ridge 1220 and outer ridge 1218) and with anchor openings 1204 positioned for anchors 1216 to compress sealants 1702, 1704 where the sealants 1702, 1704 include an inside sealant 1702 and an outside sealant 1704, according to various embodiments. The anchor 1216 does not extend through a sealant 1702, 1704, which may prevent leakage through a sealant (e.g., 1206). In the embodiment, the inner sealant 1702 may take a different path than the outer sealant 1704. For example, the outer sealant 1704 may follow an exterior outline of the upper side along a north edge and the two sides connected to the upper side, and possibly a portion of a lower side, which may exclude the weep hole 1212.

In other embodiments, the inner sealant 1702 and the outer sealant 1704 follow a pattern of the anchor openings 1204 within a certain distance from a line bisecting each anchor opening 1204. In some embodiments, the housing 1700 includes the inner sealant 1702 and not the outer sealant 1704. In other embodiments, the housing 1700 includes the outer sealant 1704 and not the inner sealant 1702. One of skill in the art will recognize other reasons to have one or more sealants 1702, 1704 on either side of the anchor openings 1204. In some embodiments, the housing 1700 may include a compression ring 1402 (not shown).

Figure 18:
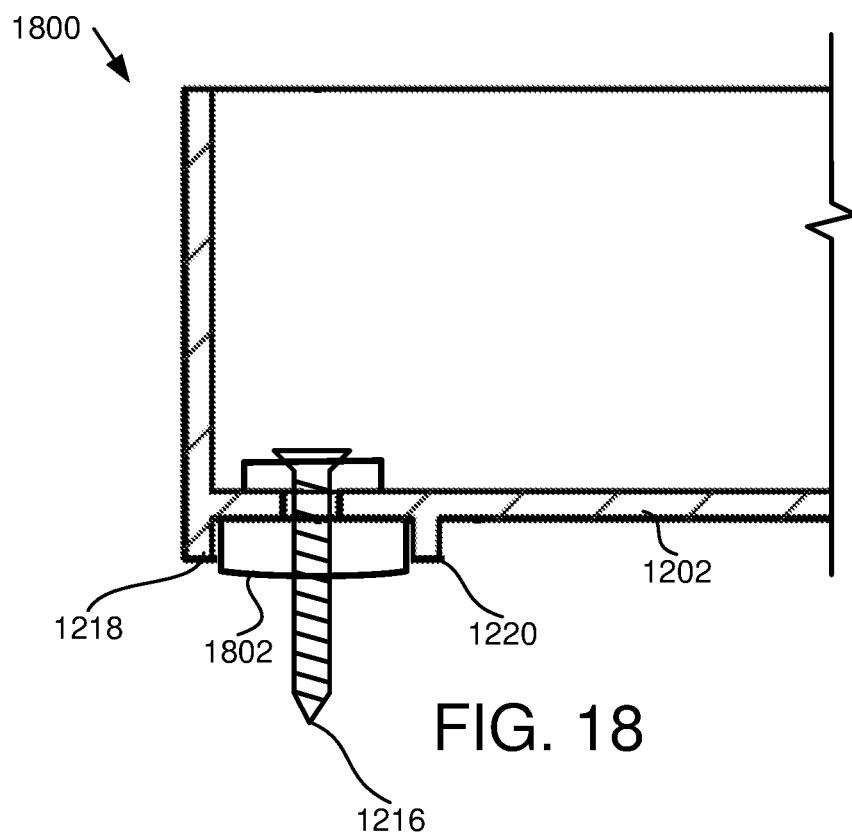
FIG. 18 illustrates a partial section view of a housing with a compression ring, with bottom compression ridges and with anchor openings positioned for anchors to compress a sealant where the sealant is widened to fill a space between the compression ridges, according to various embodiments.

FIG. 18 illustrates a partial section view of a housing 1800 with a compression ring 1402, with bottom compression ridges (e.g., inner ridge 1220 and outer ridge 1218) and with anchor openings 1204 positioned for anchors 1216 to compress a sealant 1802 where the sealant 1802 is widened to fill a space between the compression ridges 1218, 1220, according to various embodiments. In the embodiments, the sealant 1802 may follow all or a portion of the inner ridge 1220 and/or the outer ridge 1218, such as the sealant 2002 depicted in FIG. 20A. In some embodiments, the housing 1800 does not include a compression ring 1402.

Figure 19:
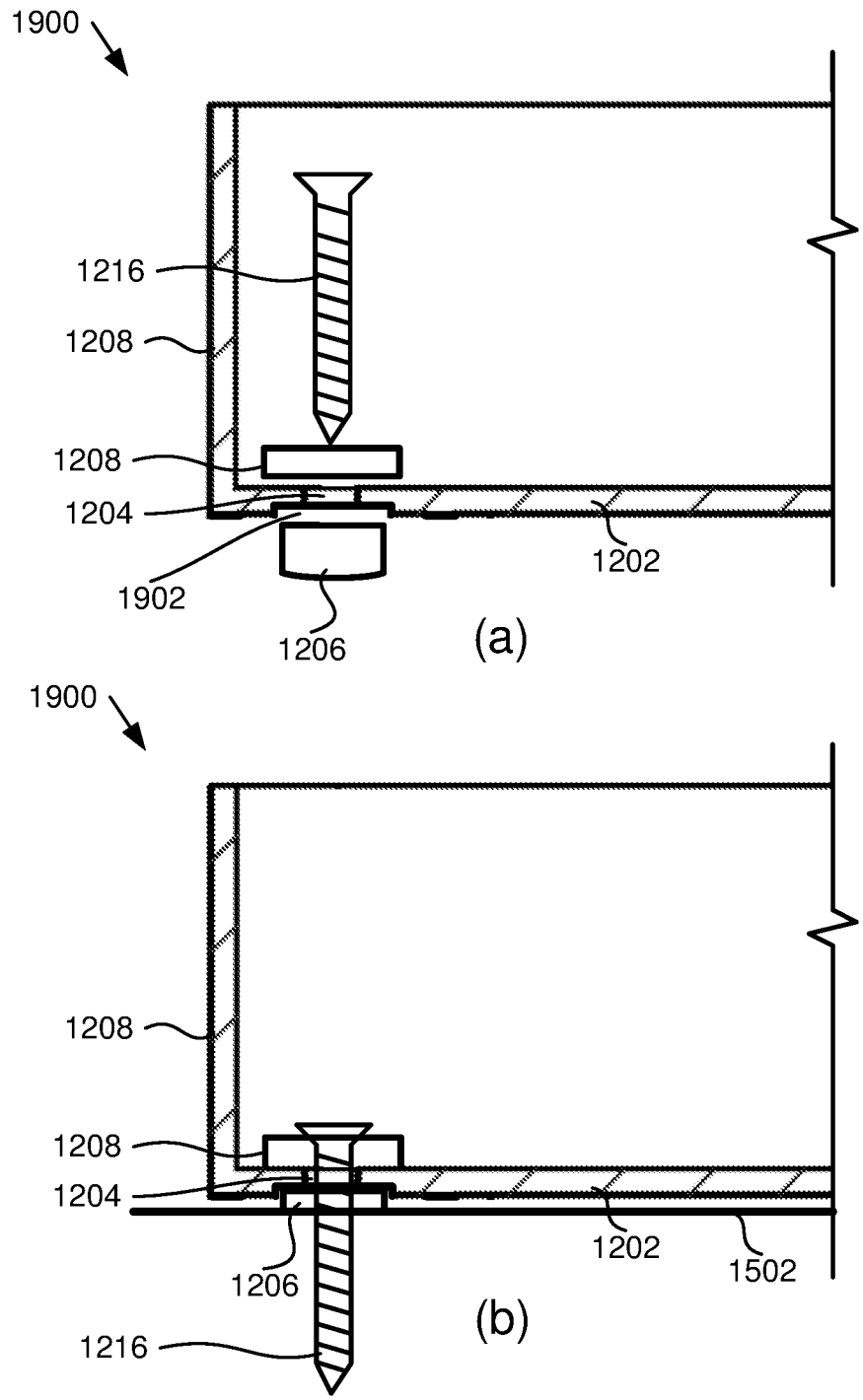
FIG. 19 illustrates a partial section view prior to mounting and after mounting of a housing with a compression ring, without bottom compression ridges and with anchor openings positioned for anchors to compress a sealant where the sealant fits in a groove, according to various embodiments.

FIG. 19 illustrates a partial section view prior to mounting and after mounting of a housing 1900 with a compression ring 1402, without bottom compression ridges and with anchor openings 1204 positioned for anchors 1216 to compress a sealant 1206 where the sealant 1206 fits in a recess 1902, according to various embodiments. In the embodiments, the compression ring 1402 is separate from the bottom 1202 of the housing 1900. In other embodiments, the compression ring 1402 is integrated with the bottom 1202 of the housing 1900.

The upper section view (a) depicts before installation where the anchor 1216 has not been inserted into the anchor opening 1204 and the sealant 1206 has not been applied to the recess 1902. In some embodiments, the recess 1902 is shaped specifically for the sealant 1206. In some examples, the sealant 1206 may include an upper side with an adhesive that allows the sealant 1206 to be retained in the recess 1902. The lower section view (b) depicts the anchor 1216 set into the anchor opening 1204 and through the roof 1502, which pulls the compression ring 1402 to the bottom 1202 of the housing 1900 and compresses the sealant 1206. In other embodiments, the housing 1900 does not have a compression ring 1402 or has a compression ring 1402 integrated with the bottom 1202 of the housing 1900. In other embodiments, the housing includes an inner ridge 1220 and/or an outer ridge 1218. In other embodiments, the housing 1900 includes multiple recesses 1902 for multiple sealants, such as the sealants 1702, 1704 of FIG. 17.

Figure 20A:
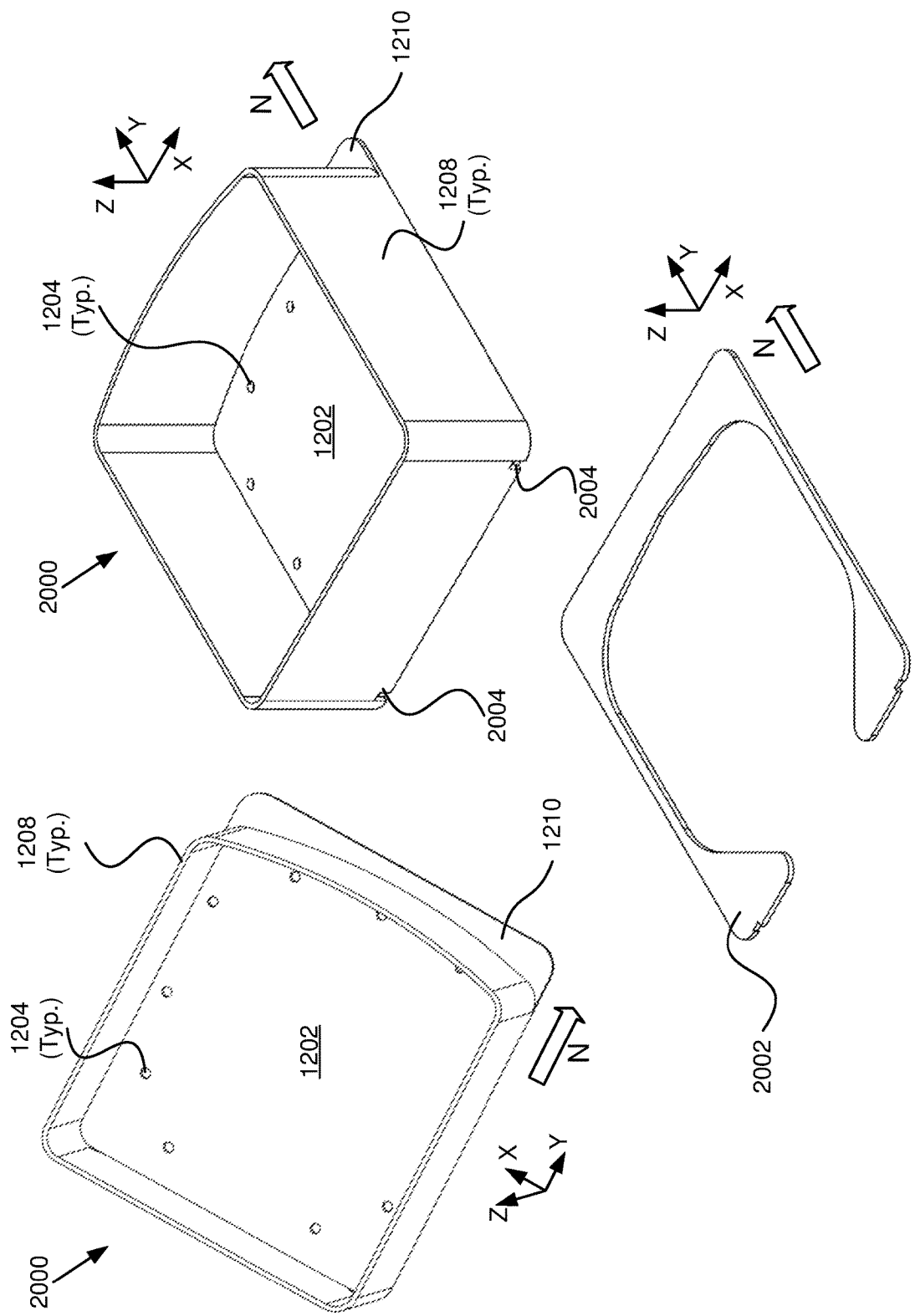
FIG. 20A illustrates two perspective views of a housing with anchor openings positioned for anchors to compress a sealant and the sealant shown below, according to various embodiments.
Figure 20B:
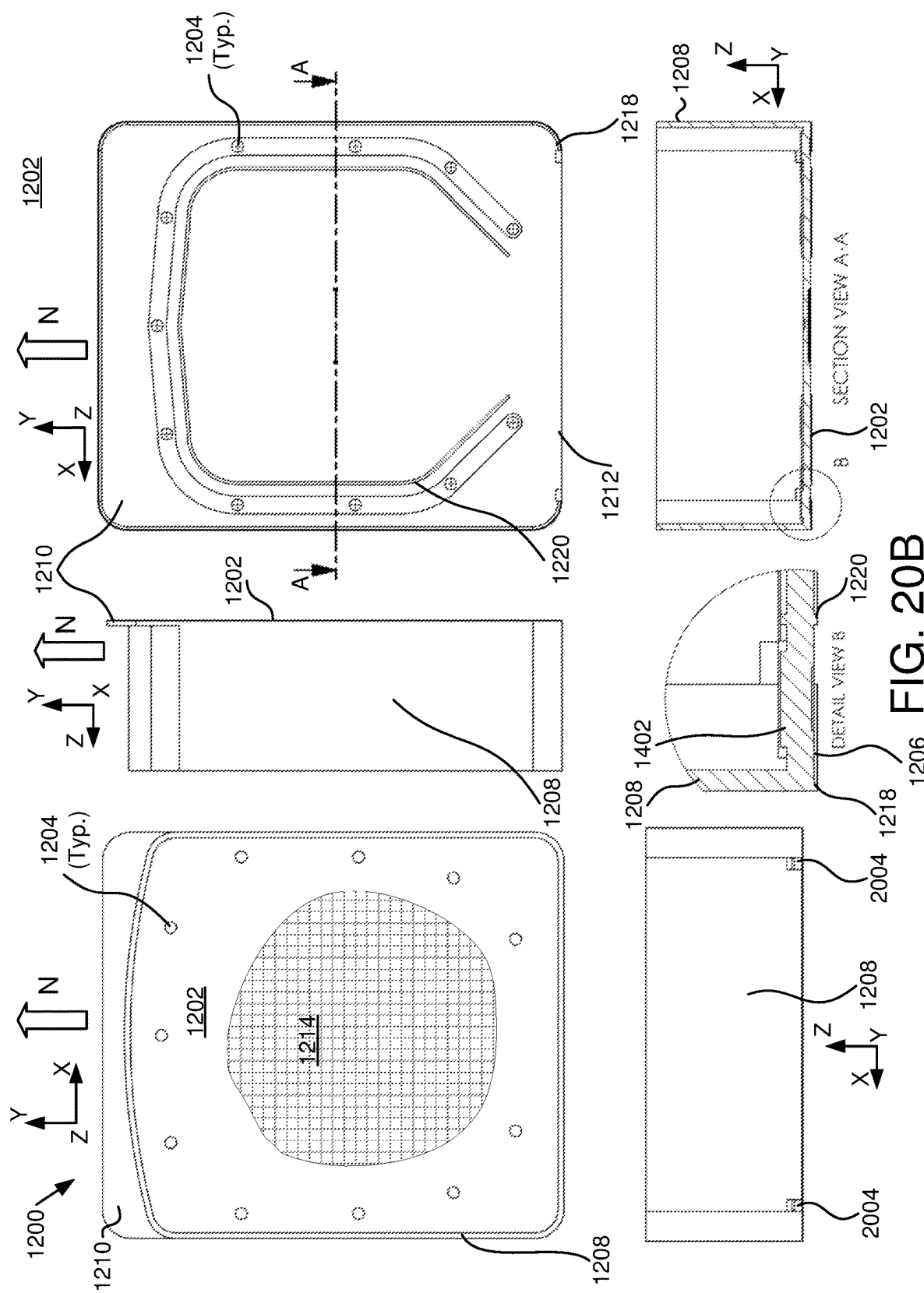
FIG. 20B illustrates a top view, an end view, a side view, a bottom view, a section view, and a detail view of the housing of FIG. 20A, according to various embodiments, all arranged in accordance with at least one embodiment described in the present disclosure.

FIG. 20A illustrates two perspective views of a housing 2000 with anchor openings 1204 positioned for anchors 1216 to compress a sealant 2002 and the sealant 2002 shown below, according to various embodiments. FIG. 20B illustrates a top view, an end view, a side view, a bottom view, a section view, and a detail view of the housing 2000 of FIG. 20A, according to various embodiments. In the embodiments, the sealant 2002 is shaped to fill a space between an outer ridge 1218 and an inner ridge 1220, which is depicted in Detail B, which is an expanded view of a corner of Section AA. In addition, the housing 2000 includes weep holes 2004 than are smaller than the weep hole 1212 depicted in FIGS. 12A-E. Having a sealant 2002 as depicted provides coverage over a greater area outside of the central area 1214 and a drill zone 1404.

In the depicted embodiments, the sealant 2002 extends past the anchor openings 1204 in a direction away from the central area 1214. In some embodiments, the compression ring 1402 and anchors 1216 apply pressure to the sealant 2002 that causes at least a portion of the sealant 2002 in a continuous band around the side portions and the upper portion of the central area 1214 when the plurality of anchor openings 1204 each have an anchor 1216 secured to the roof. In the embodiments, other portions of the sealant 2002 away from the anchor openings 1204 and compression ring 1402 may have less pressure.

The present disclosure is not to be limited in terms of the particular embodiments described in the present disclosure, which are intended as illustrations of various aspects. Many modifications and variations can be made without departing from its spirit and scope, as will be apparent to those skilled in the art. Functionally equivalent methods and apparatuses within the scope of the present disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from the scope of the present embodiment. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A junction box comprising:
   an enclosable housing comprising a bottom with a bottom interior surface and a bottom exterior surface opposing the bottom interior surface, the housing configured to mount to a roof of a structure with a slope;
   a central area of the bottom, the central area configured for penetrations into the roof; and
   a flashing integral to the bottom of the housing and extending away from the bottom in a direction away from the housing.

2. The junction box of claim 1, wherein the flashing and the housing are formed together as a continuous piece.

3. The junction box of claim 1, wherein a perimeter of the central area comprises an indicia on the bottom interior surface marking the central area.

4. The junction box of claim 2, wherein the indicia of the perimeter of the central area comprises a color different from surrounding surfaces, a line and/or a groove.

5. The junction box of claim 1, wherein the bottom interior surface further comprises indicia within the central area marking the central area.

6. The junction box of claim 4, wherein the indicia within the central area comprises a color different from surrounding surfaces, a pattern, grooves, and/or a hatching.

7. The junction box of claim 1, further comprising an indicia on the bottom exterior surface corresponding to a perimeter of the central area.

8. The junction box of claim 1, further comprising a sealant disposed on the bottom exterior surface, the sealant surrounding the central area of the bottom, the sealant surrounding at least an upper portion and side portions of the central area, wherein the upper portion is oriented toward an upper side of the bottom with respect to the slope of the roof.

9. The junction box of claim 8, wherein a lower portion opposite the upper portion of the central area is free from the sealant, the lower portion oriented at a lowest part of the bottom with respect to the slope of the roof.

10. The junction box of claim 8, further comprising a plurality of anchor openings in the bottom located external to the central area, each anchor opening configured for an anchor, wherein securing an anchor through an anchor opening of the plurality of anchor openings contributes to securing the housing to the roof.

11. The junction box of claim 10, wherein each anchor opening comprises a boss, each boss extending away from the bottom interior surface and surrounding a portion of each anchor above the bottom interior surface of the bottom.

12. The junction box of claim 11, wherein each boss comprises a thickened area surrounding the anchor opening, the thickened area configured to be under a top of an anchor positioned in the anchor opening, the top wider than a shaft portion of the anchor extending through the anchor opening.

13. The junction box of claim 10, wherein the sealant is compressible and wherein securing the anchors in the anchor openings compresses the sealant between the roof and the bottom exterior surface.

14. The junction box of claim 1, wherein an upper side of the housing is rounded and/or pointed in a direction towards an apex of the slope of a roof.

15. The junction box of claim 1, wherein a sidewall of the housing comprises indicia indicating a location suitable for a hole to permit a connector to be attached to the housing.

16. The junction box of claim 1, wherein an upper portion of the flashing extending from an upper side of the housing extends further from the housing than a lower portion of the flashing extending from a lower side of the housing, the upper side of the housing configured to be oriented in a direction towards an apex of the roof and the lower side of the housing is distal to the upper side of the housing.

17. A junction box comprising:
   an enclosable housing comprising a bottom with a bottom interior surface and a bottom exterior surface opposing the bottom interior surface, the housing configured to mount to a roof of a structure with a slope;
   a central area of the bottom, the central area configured for penetrations into the roof, wherein a perimeter of the central area comprises an indicia on the bottom interior surface marking the central area; and
   a flashing integral to the bottom of the housing and extending away from the bottom in a direction away from the housing, wherein the flashing and the housing are formed together as a continuous piece.

18. The junction box of claim 17, further comprising a sealant disposed on the bottom exterior surface, the sealant surrounding the central area of the bottom, the sealant surrounding at least an upper portion and side portions of the central area, wherein the upper portion is oriented toward an upper side of the bottom with respect to the slope of the roof.

19. The junction box of claim 18, further comprising a plurality of anchor openings in the bottom located exterior to the central area, each anchor opening configured for an anchor, wherein securing an anchor through an anchor opening of the plurality of anchor openings contributes to securing the housing to the roof, wherein each anchor opening comprises a boss, each boss extending away from the bottom interior surface and surrounding a portion of each anchor above the bottom interior surface of the bottom.

20. The junction box of claim 17, wherein:
   a lower portion opposite the upper portion of the central area is free from the sealant, the lower portion oriented at a lowest part of the bottom with respect to the slope of the roof;
   each boss comprises a thickened area surrounding the anchor opening, the thickened area configured to be under a top of an anchor positioned in the anchor opening, the top wider than a shaft portion of the anchor extending through the anchor opening;
   the sealant is compressible and wherein securing the anchors in the anchor openings compresses the sealant between the roof and the bottom exterior surface;
   an upper side of the housing is rounded and/or pointed in a direction towards an apex of the slope of a roof; and
   a sidewall of the housing comprises indicia indicating a location suitable for a hole to permit a connector to be attached to the housing.

21. A junction box comprising:
   an enclosable housing comprising a bottom with a bottom interior surface and a bottom exterior surface opposing the bottom interior surface, the housing configured to mount to a roof of a structure with a slope;
   a central area of the bottom, the central area configured for penetrations into the roof, wherein a perimeter of the central area comprises an indicia on the bottom interior surface marking the central area;
   a sealant disposed on the bottom exterior surface, the sealant surrounding the central area of the bottom, the sealant surrounding at least an upper portion and side portions of the central area, wherein the upper portion is oriented toward an upper side of the bottom with respect to the slope of the roof;
   a plurality of anchor openings in the bottom located exterior to the central area, each anchor opening configured for an anchor, wherein securing an anchor through an anchor opening of the plurality of anchor openings contributes to securing the housing to the roof, wherein each anchor opening comprises a boss, each boss extending away from the bottom interior surface and surrounding a portion of each anchor above the bottom interior surface of the bottom; and
   a flashing integral to the bottom of the housing and extending away from the bottom in a direction away from the housing, wherein the flashing and the housing are formed together as a continuous piece.

\* \* \* \* \*